US009285572B2

(12) United States Patent
Kawana

(10) Patent No.: US 9,285,572 B2
(45) Date of Patent: Mar. 15, 2016

(54) ZOOM LENS AND IMAGING DEVICE

(71) Applicant: FUJIFILM Corporation, Tokyo (JP)

(72) Inventor: Masanao Kawana, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/582,449

(22) Filed: Dec. 24, 2014

(65) Prior Publication Data
US 2015/0109670 A1 Apr. 23, 2015

Related U.S. Application Data

(63) Continuation of application No. PCT/JP2013/003922, filed on Jun. 24, 2013.

(30) Foreign Application Priority Data

Jul. 5, 2012 (JP) .................. 2012-151127

(51) Int. Cl.
*G02B 15/16* (2006.01)
*G02B 13/18* (2006.01)
*G02B 15/173* (2006.01)
(Continued)

(52) U.S. Cl.
CPC ............. *G02B 15/16* (2013.01); *G02B 13/18* (2013.01); *G02B 15/173* (2013.01); *G02B 27/646* (2013.01); *G03B 5/00* (2013.01)

(58) Field of Classification Search
CPC ........ G02B 13/18; G02B 15/00; G02B 15/14; G02B 15/15; G02B 15/155; G02B 15/16; G02B 15/173; G02B 27/64; G02B 27/66; G02B 7/02–7/16; G03B 5/00; G03B 2205/0007; G03B 2205/0015; G03B 2205/0046

USPC .......... 359/554, 557, 676, 683, 684, 686, 687
See application file for complete search history.

(56) References Cited

U.S. PATENT DOCUMENTS 7,227,699 B2 6/2007 Hamano et al.
7,466,496 B2 12/2008 Hoshi
(Continued)

FOREIGN PATENT DOCUMENTS

JP 2006-047771 2/2006
JP 2006-293012 10/2006
(Continued)

OTHER PUBLICATIONS

International Search Report PCT/JP2013/003922 dated Sep. 17, 2013.

*Primary Examiner* — Kimberly N Kakalec
(74) *Attorney, Agent, or Firm* — Young & Thompson

(57) ABSTRACT

A zoom lens substantially consists of, in order from the object side, a positive first lens group, a negative second lens group, a positive third lens group, and a positive fourth lens group. During magnification change from the wide-angle end to the telephoto end, the first and third lens groups are fixed in the optical axis direction, the second lens group is moved toward the image side, and the fourth lens group is moved along the optical axis. The second lens group includes an air space formed between a convex surface and a concave surface, and a cemented surface between a negative lens and a positive lens. The third lens group consists of, in order from the object side, a fixed front group, and a positive rear group being able to be shifted in directions intersecting with the optical axis to shift the image formed on the reduced side.

12 Claims, 45 Drawing Sheets

(51) Int. Cl.
*G02B 27/64* (2006.01)
*G03B 5/00* (2006.01)

(56) References Cited

U.S. PATENT DOCUMENTS

| | | |
|---|---|---|
| 2006/0227429 A1 | 10/2006 | Miyazawa |
| 2009/0316266 A1 | 12/2009 | Shinohara |
| 2012/0105693 A1 | 5/2012 | Hagiwara |
| 2012/0200923 A1* | 8/2012 | Mitsuki .................. 359/557 |
| 2014/0036138 A1* | 2/2014 | Komatsu .................. 348/345 |

FOREIGN PATENT DOCUMENTS

| | | |
|---|---|---|
| JP | 2007-033553 | 2/2007 |
| JP | 2007-212847 | 8/2007 |
| JP | 2007-322635 | 12/2007 |
| JP | 2010-026491 | 2/2010 |
| JP | 2012-098552 | 5/2010 |
| JP | 2010-266504 | 11/2010 |
| WO | WO 2012137496 A1 * | 10/2012 |

* cited by examiner

EXAMPLE 1

EXAMPLE 3

EXAMPLE 4

EXAMPLE 5

EXAMPLE 6

EXAMPLE 7

EXAMPLE 8

EXAMPLE 11

ZOOM LENS AND IMAGING DEVICE

CROSS-REFERENCE TO RELATED APPLICATIONS

This application is a Continuation of PCT International Application No. PCT/JP2013/003922 filed on Jun. 24, 2013, which claims priority under 35 U.S.C. §119(a) to Japanese Patent Application No. 2012-151127 filed on Jul. 5, 2012. Each of the above applications is hereby expressly incorporated by reference, in its entirety, into the present application.

BACKGROUND OF THE INVENTION

1. Technical Field

The present invention relates to a zoom lens and an imaging device, and in particular to a zoom lens which is preferably usable with a video camera, a broadcasting camera, a monitoring camera, etc., and an imaging device provided with the zoom lens.

2. Background Art

As a zoom lens usable in the above-described field, a lens system having a four-group configuration that includes, in order from the object side, a positive first lens group, a negative second lens group, a positive third lens group, and a positive fourth lens group is conventionally known. For example, each of Japanese Unexamined Patent Publication Nos. 2006-047771, 2007-033553, and 2007-322635 (hereinafter, Patent Documents 1, 2 and 3, respectively) presented below teaches a zoom lens having the above-described four-group configuration which is a rear focus type lens system where, during magnification change from the wide-angle end to the telephoto end, the first lens group and the third lens group are fixed, and the second lens group and the fourth lens group are moved, and focusing is effected using the fourth lens group. The lens system taught in each of the Patent Documents 1 to 3 is configured to correct for blur of a taken image by moving a part of the optical system in the third lens group such that the movement has a component in a direction perpendicular to the optical axis.

DISCLOSURE OF INVENTION

The mainstream of recent imaging devices is an electronic imaging device that includes a lens system combined with an image sensor, such as a CCD (Charge Coupled Device), for taking an image formed by the lens system and outputting an electric signal. Along with development of image sensors with higher pixel density and smaller size, it is desired for a zoom lens mounted on such an electronic imaging device to have higher performance, wider angle, and higher zoom ratio, and there are also strong demands for cost reduction.

However, the zoom lens taught in Patent Document 1 only has a zoom ratio of around 11 to 12, which is insufficient for meeting the recent demands for higher zoom ratio and wider angle. The zoom lens taught in Patent Document 2 has a zoom ratio of around 20, which can be considered as a high zoom ratio; however, it does not achieve wide angle. The zoom lens taught in Patent Document 3 has a high zoom ratio of around 20; however, it does not achieve wide angle.

In view of the above-described circumstances, the present invention is directed to providing a zoom lens that has high performance and high zoom ratio, achieves wide angle and cost reduction, and allows obtaining good images, and an imaging device provided with the zoom lens.

The zoom lens of the invention substantially consists of, in order from an object side: a first lens group having a positive refractive power; a second lens group having a negative refractive power; a third lens group having a positive refractive power; and a fourth lens group having a positive refractive power, wherein, during magnification change from a wide-angle end to a telephoto end, the first lens group and the third lens group are fixed in an optical axis direction relative to an image plane, the second lens group is moved toward an image side along the optical axis relative to the image plane, and the fourth lens group is moved in the optical axis direction relative to the image plane, the second lens group comprises an air space formed between a convex surface and a concave surface facing each other, and a cemented surface between a negative lens and a positive lens, the third lens group consists of, in order from the object side, a front group that is fixed, and a rear group that has a positive refractive power and is able to be shifted in directions intersecting with the optical axis to thereby shift an image formed on the image side, and the condition expressions (1) to (3) below are satisfied:

$$2.0 < |f12w/fw| < 3.0 \quad (1),$$

$$2.5 < |(Rz1+Rz2)/(Rz1-Rz2)| < 5.0 \quad (2), \text{ and}$$

$$8.6 < Mz/fw < 12.0 \quad (3),$$

where $f12w$ is a combined focal length of the first lens group and the second lens group at the wide-angle end, $fw$ is a focal length of the entire system at the wide-angle end, $Rz1$ and $Rz2$ are radii of curvature forming the air space in the second lens group, and $Mz$ is an amount of movement of the second lens group during magnification change from the wide-angle end to the telephoto end.

While the zoom lens of the invention substantially consists of four lens groups, the zoom lens of the invention may include, in addition to the four lens groups: lenses substantially without any power; optical elements other than lenses, such as a stop and a cover glass; mechanical components, such as a lens flange, a lens barrel, an image sensor, and a camera shake correcting mechanism; etc.

The "lens group" as used herein may not necessarily be formed by a plurality of lenses, and may include a lens group formed by one lens.

The surface shape, such as convex, concave, planar, biconcave, meniscus, biconvex, plano-convex, or plano-concave, and the sign, positive or negative, with respect to the refractive power of any lens including an aspheric surface in the invention are about the paraxial region, unless otherwise noted. The sign with respect to the radius of curvature is provided such that a positive radius of curvature indicates a surface that is convex toward the object side, and a negative radius of curvature indicates a surface that is convex toward the image side.

It is more preferred that the zoom lens of the invention satisfy at least one of the condition expressions (1-1), (2-1), and (3-1) below:

$$2.4 < |f12w/fw| < 3.0 \quad (1-1),$$

$$2.6 < |(Rz1+Rz2)/(Rz1-Rz2)| < 4.8 \quad (2-1), \text{ and}$$

$$8.8 < Mz/fw < 11.5 \quad (3-1).$$

It is preferred that the zoom lens of the invention satisfy the condition expression (4) below, and it is more preferred that the zoom lens satisfy the condition expression (4-1) below:

$$0.8 < f3r/f3 < 2.0 \quad (4),$$

$$0.9 < f3r/f3 < 1.8 \quad (4-1),$$

where f3r is a focal length of the rear group of the third lens group, and f3 is a focal length of the third lens group.

It is preferred that, in the zoom lens of the invention, the first lens group consist of, in order from the object side, a cemented lens formed by a negative lens and a positive lens cemented together, and two positive lenses.

It is preferred that, in the zoom lens of the invention, the front group of the third lens group comprise a cemented lens formed by a positive lens and a negative lens cemented together. It should be noted that the order from the object side of the positive lens and the negative lens forming the cemented lens of the front group may be either the positive lens and the negative lens, or the negative lens and the positive lens.

It is preferred that, in the zoom lens of the invention, the rear group of the third lens group consist of, in order from the object side, a positive lens, and a cemented lens formed by a positive lens and a negative lens cemented together, wherein the positive lens forming the cemented lens is made of a material having a greater Abbe number than that of a material of the negative lens forming the cemented lens. It should be noted that the order from the object side of the positive lens and the negative lens forming the cemented lens of the front group may be either the positive lens and the negative lens, or the negative lens and the positive lens.

It is preferred that, in the zoom lens of the invention, the fourth lens group comprise a cemented lens formed by a positive lens and a negative lens cemented together, wherein the positive lens forming the cemented lens is made of a material having a greater Abbe number than that of a material of the negative lens forming the cemented lens. It should be noted that the order from the object side of the positive lens and the negative lens forming the cemented lens of the fourth lens group may be either the positive lens and the negative lens, or the negative lens and the positive lens.

It is preferred that, in the zoom lens of the invention, the fourth lens group consist of, in order from the object side, a cemented lens formed by a positive lens and a negative lens cemented together, and a positive lens, wherein the positive lens on the most image side include an aspheric surface.

The imaging device of the invention comprises the above-described zoom lens of the invention.

In the zoom lens of the invention, which substantially consists of, in order from the object side: a first lens group having a positive refractive power; a second lens group having a negative refractive power; a third lens group having a positive refractive power; and a fourth lens group having a positive refractive power, wherein the second lens group and the fourth lens group are moved in the optical axis direction during magnification change, the lens configurations of the second lens group and the third lens group have preferably set, and the condition expressions (1) to (3) are satisfied. This allows accomplishing a zoom lens that has high performance and high zoom ratio, achieves wide angle and cost reduction, and allows obtaining good images.

The imaging device of the invention, which is provided with the zoom lens of the invention, can be configured inexpensively, and can obtain images having high image quality with high zoom ratio.

DESCRIPTION OF PREFERRED EMBODIMENTS

Figure 1:
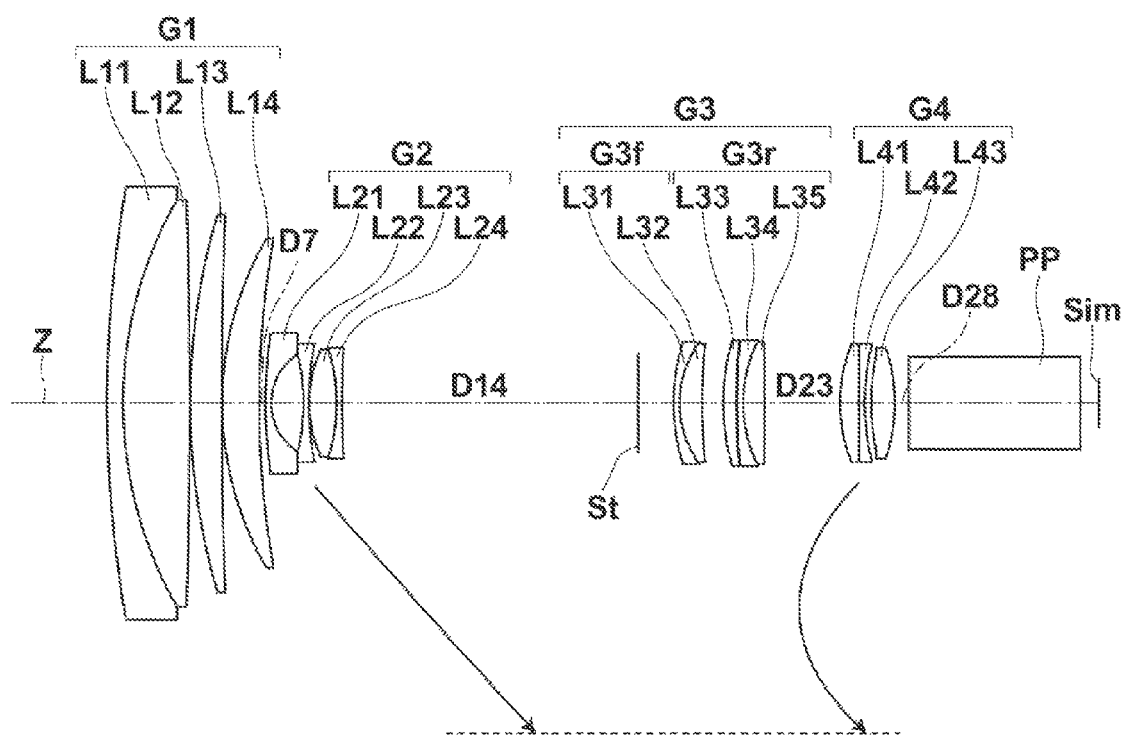
FIG. 1 is a sectional view illustrating the lens configuration of a zoom lens according to Example 1 of the invention.
Figure 2:
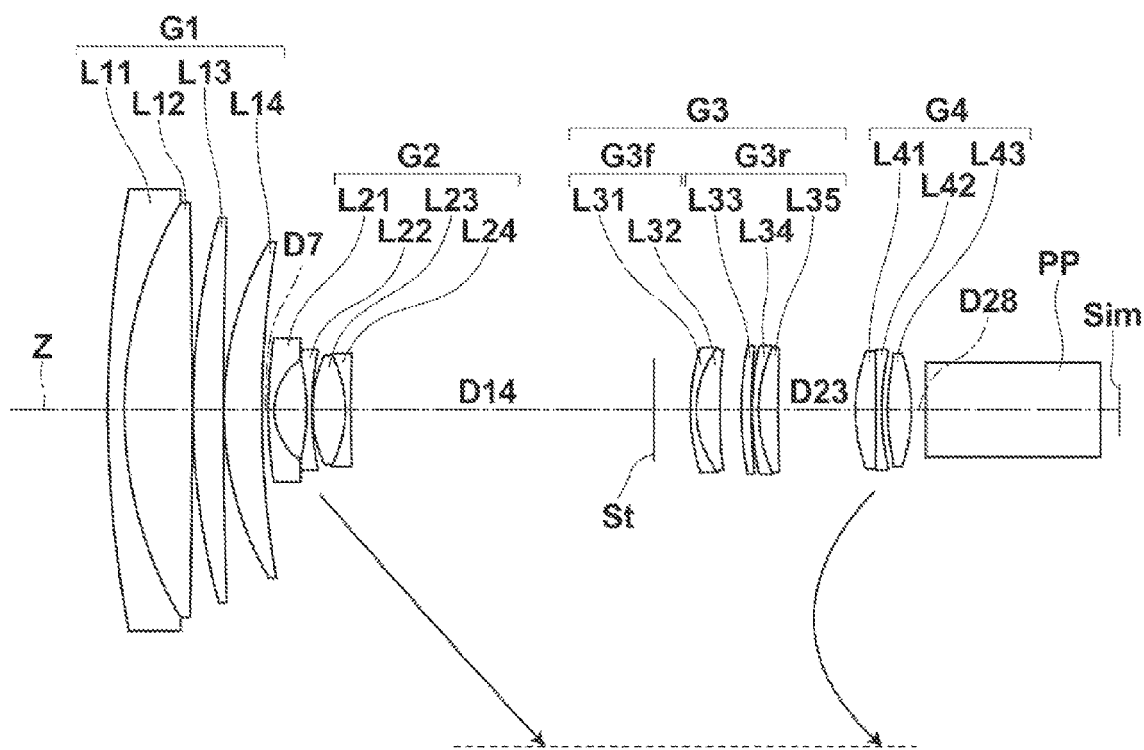
FIG. 2 is a sectional view illustrating the lens configuration of a zoom lens according to Example 2 of the invention.
Figure 3:
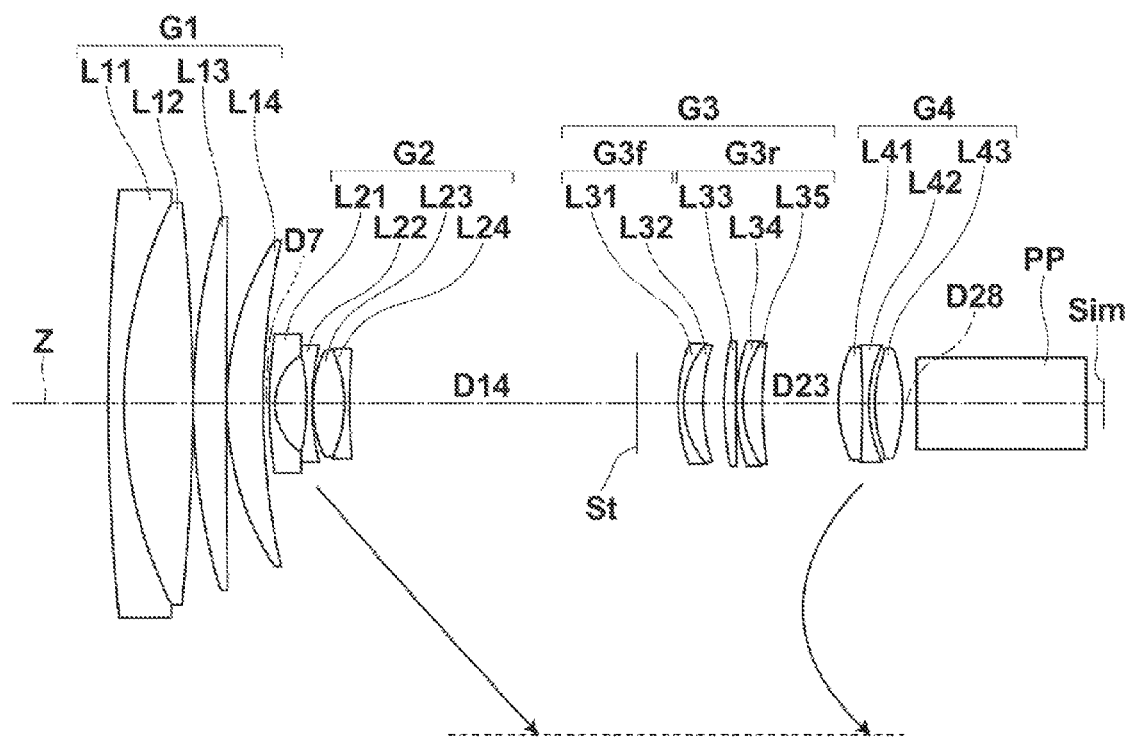
FIG. 3 is a sectional view illustrating the lens configuration of a zoom lens according to Example 3 of the invention.
Figure 4:
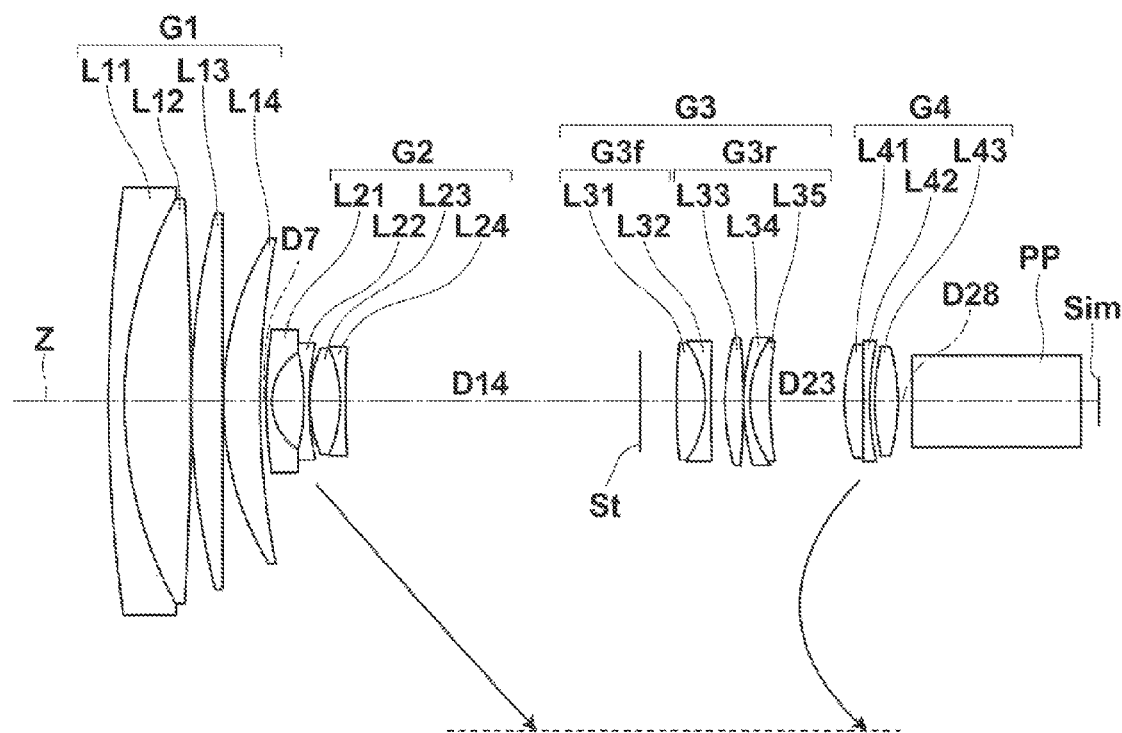
FIG. 4 is a sectional view illustrating the lens configuration of a zoom lens according to Example 4 of the invention.
Figure 5:
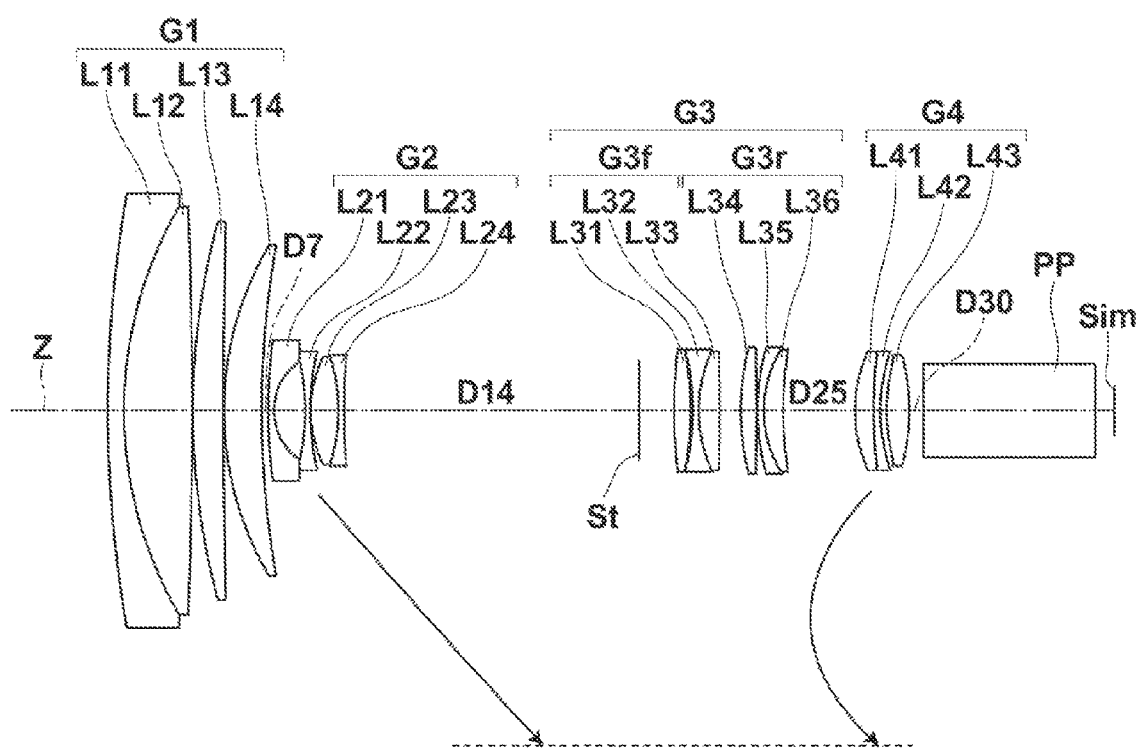
FIG. 5 is a sectional view illustrating the lens configuration of a zoom lens according to Example 5 of the invention.
Figure 6:
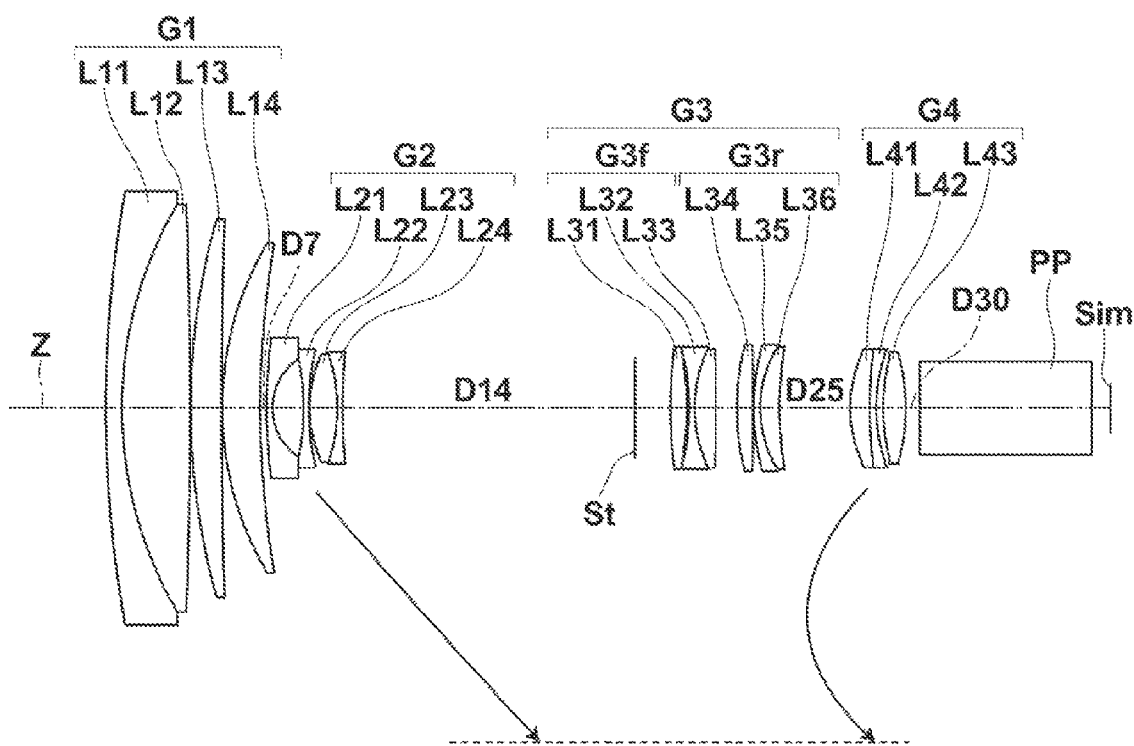
FIG. 6 is a sectional view illustrating the lens configuration of a zoom lens according to Example 6 of the invention.
Figure 7:
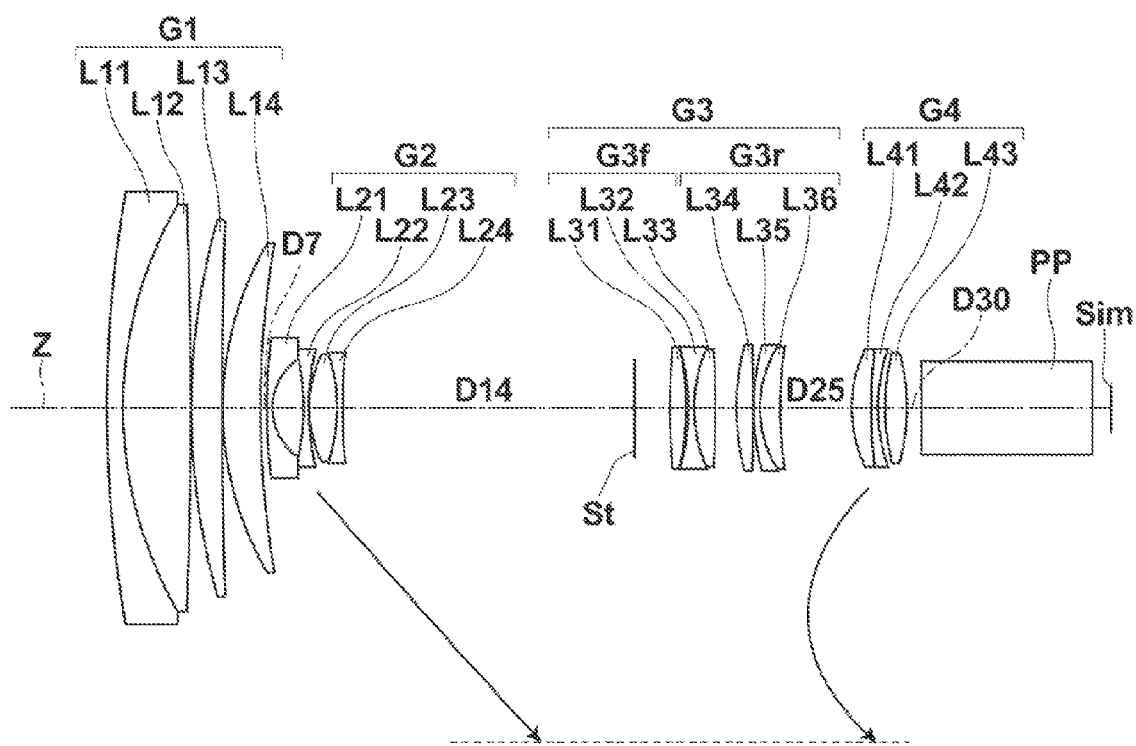
FIG. 7 is a sectional view illustrating the lens configuration of a zoom lens according to Example 7 of the invention.
Figure 8:
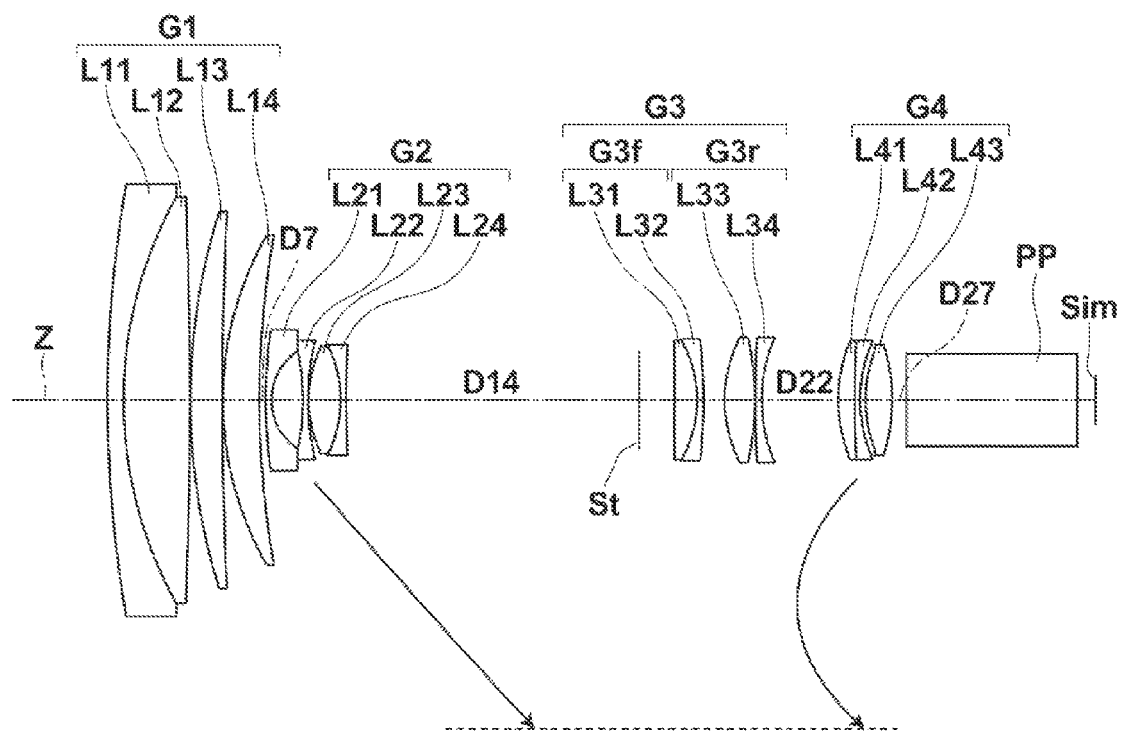
FIG. 8 is a sectional view illustrating the lens configuration of a zoom lens according to Example of the invention.
Figure 9:
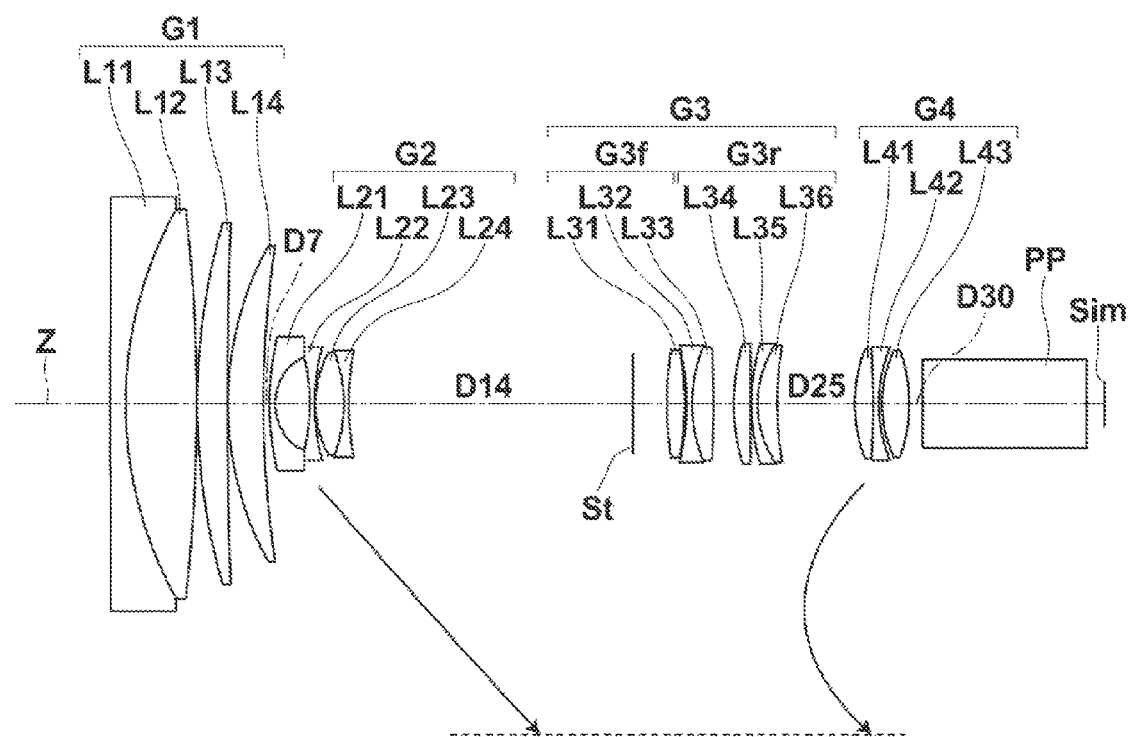
FIG. 9 is a sectional view illustrating the lens configuration of a zoom lens according to Example 9 of the invention.
Figure 10:
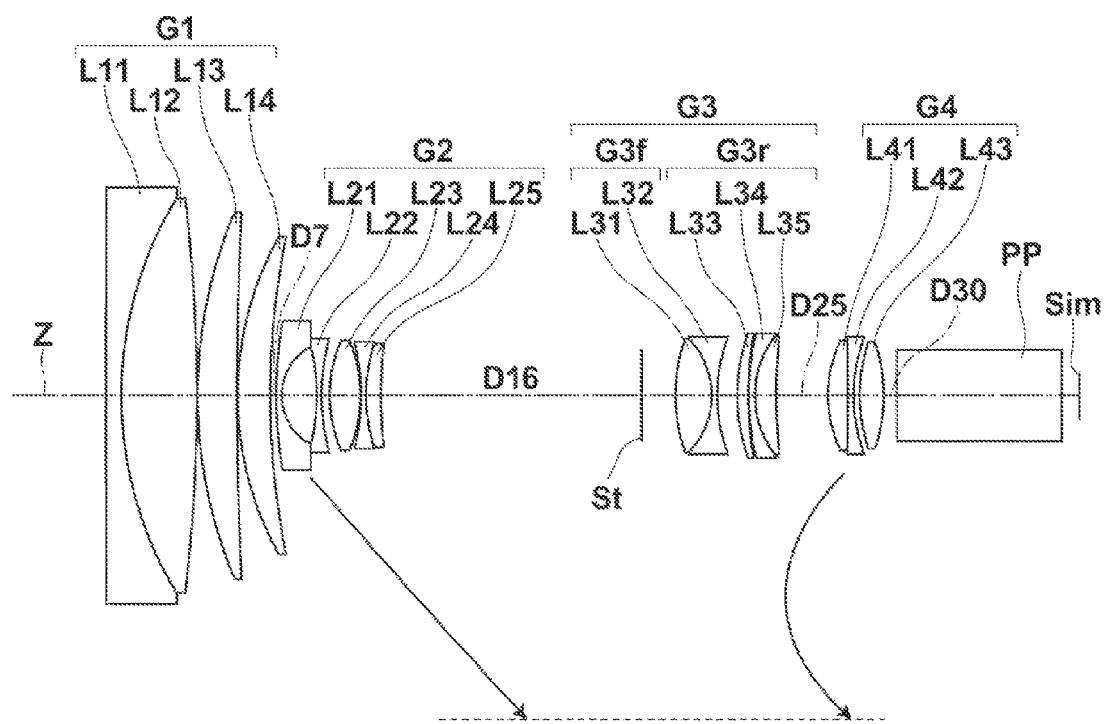
FIG. 10 is a sectional view illustrating the lens configuration of a zoom lens according to Example 10 of the invention.

Hereinafter, embodiments of the present invention will be described in detail with reference to the drawings. FIG. 1 is a sectional view illustrating a configuration example of a zoom lens according to an embodiment of the invention, which corresponds to a zoom lens of Example 1, which will be described later. Each of FIGS. 2 to 11 is a sectional view illustrating a configuration example of a different zoom lens according to the embodiment of the invention, which corresponds to a zoom lens of each of Examples 2 to 11, respectively, which will be described later. The examples shown in FIGS. 1 to 11 have the same basic configuration and are shown in the same manner in the drawings. Now, the zoom lens according to the embodiment of the invention is described with reference to mainly FIG. 1.

In FIG. 1, the left side is the object side and the right side is the image side. The zoom lens according to the embodiment of the invention substantially consists of a first lens group G1 having a positive refractive power, a second lens group G2 having a negative refractive power, a third lens group G3 having a positive refractive power, and a fourth lens group G4 having a positive refractive power, which are arranged in this order from the object side.

In the example shown in FIG. 1, an optical member PP in the form of a parallel plate is disposed between the fourth lens group G4 and an image plane Sim. Some of recent imaging devices employ a system using image sensors for individual colors, in order to provide high image quality. To accommodate this system, a color separation optical system, such as a color separation prism, is inserted between the lens system and the image plane Sim. Further, when the zoom lens is applied to an imaging device, it is preferred to provide a cover glass, various filters, such as an infrared cutoff filter and a low-pass filter, etc., between the optical system and the image plane Sim depending on the configuration of the camera on which the lens is mounted. The optical member PP is assumed to represent the color separation optical system, the cover glass, the various filters, etc.

The zoom lens of this embodiment is configured such that, during magnification change from the wide-angle end to the telephoto end, the first lens group G1 and the third lens group G3 are fixed in the optical axis direction relative to the image plane Sim, the second lens group G2 is moved toward the image side along the optical axis Z relative to the image plane Sim, and the fourth lens group G4 is moved in the optical axis direction relative to the image plane Sim. In the example shown in FIG. 1, an aperture stop St is fixed during magnification change. In FIG. 1, the movement locus of each of the second lens group G2 and the fourth lens group G4 during magnification change from the wide-angle end to the telephoto end is schematically shown by the arrow in the solid line below each lens group. With respect to the movement loci shown in FIG. 1, the position of the telephoto end is shown in the dashed line.

The zoom lens of this embodiment employs a rear focus system, where the fourth lens group G4 functions as a focus group for correcting for changes of the image plane during magnification change or when the object distance is changed.

In the example shown in FIG. 1, the aperture stop St is disposed between the second lens group G2 and the third lens group G3. In a zoom lens of the type like the zoom lens of this embodiment where a positive lens group, a negative lens group, a positive lens group and a positive lens group at arranged in this order from the object side, and where the second lens group G2 and the fourth lens group G4 are moved and the first lens group G1 and the third lens group G3 are fixed during magnification change, it is preferred, in order to achieve size reduction in the radial direction, that the aperture stop St be disposed at or around an intermediate position in the lens system, that is, on the object side of the third lens group G3, as in the example shown in FIG. 1. It should be noted that the aperture stop St shown in FIG. 1 does not necessarily represent the size and the shape thereof, but represents the position thereof along the optical axis Z.

The first lens group G1 consists of, in order from the object side, a lens L11 having a negative refractive power, a lens L12 having a positive refractive power and cemented to the lens L11, a lens L13 having a positive refractive power, and a lens L14 having a positive refractive power. To achieve a zoom lens having high performance and high zoom ratio, the first lens group G1 tends to need four or more lenses including three or more positive lenses. Forming the first lens group G1 to have the above-described three-group four-lens configuration consisting of the lenses L11 to L14 allows achieving a zoom lens having high performance and high zoom ratio while minimizing the number of lenses to achieve size reduction and cost reduction.

As in the example shown in FIG. 1, for example, the second lens group G2 may consist of, in order from the object side, a lens L21 having a negative meniscus shape, a lens L22 having a biconcave shape, a lens L23 having a biconvex shape, and a lens L24 having a negative refractive power and cemented to the lens L23. It should be noted that, in the second lens group G2, an air space is formed between the image-side surface of the biconcave lens L22 and the object-side surface of the biconvex lens L23 facing each other. Forming the second lens group G2, which mainly operates to effect magnification change, to have the above-described three-group four-lens configuration facilitates achieving high performance and high zoom ratio while achieving size reduction. Further, the air space between the lens L22 and the lens L23, and the cemented surface between the lens L23 and the lens L24 allow successful correction of chromatic aberration and field curvature.

The third lens group G3 consists of, in order from the object side, a front group G3f including a cemented lens and having a relatively weak positive or negative refractive power, and a rear group G3r having a relatively strong positive refractive power. The rear group G3r is used as an image stabilizing lens group, which is able to be shifted in directions perpendicular to the optical axis Z to thereby shift the image.

With an optical system having high zoom ratio, which is a target of the zoom lens of this embodiment, a small camera shake results in a large image shake, and it is desired to provide an image stabilizing function. To this end, it is preferred that the rear group G3r be configured to be shifted in directions perpendicular to the optical axis Z to correct for displacement of the image when the zoom lens shakes. Achieving image stabilization by decentering a part of the imaging lens system in directions perpendicular to the optical axis Z in this manner eliminates need of a special optical system for image stabilization.

Comparing to a lens system for a single-sensor system using a single image sensor, a lens system for a system using three image sensors needs to have a long back focus for allowing insertion of a color separation optical system. In order to provide a long back focus, the third lens group G3 of an optical system of the type like the zoom lens of this embodiment usually has a weak refractive power, and thus has small sensitivity to decentering in directions perpendicular to the optical axis. In a case where image stabilization is achieved by decentering the entire part of such a third lens group G3 in directions perpendicular to the optical axis, the third lens group G3 has to be moved by a large amount, resulting in a large effective diameter of the lenses of the third lens group G3. This results in size increase of the lens system and the device.

In order to address this problem, the third lens group G3 is separated into the negative front group G3f and the positive rear group G3r, where the rear group G3r has a strong positive refractive power, and only the rear group G3r is decentered in directions perpendicular to the optical axis to achieve image stabilization. In this case, the amount of movement of the rear group G3r and the sizes of the lens system and the device can be minimized. Then, a long back focus can be provided by appropriately setting the refractive power of the front group G3f such that it partially cancels the strong positive refractive power of the rear group G3r.

Further, in a case where the front group G3f of the third lens group G3 has a negative refractive power, the negative front group G3f and the positive rear group G3r are arranged in this order from the object side. In this case, rays of light outputted from the negative second lens group G2 can immediately be guided by the negative front group G3f in directions away from the optical axis, and this contributes to providing a long back focus.

In the case where the rear group G3r is used as the image stabilizing lens group, a space for a drive mechanism for driving the rear group G3r is necessary, and it is preferred that the rear group G3r be at a position apart from the aperture stop St. Since the aperture stop St tends to be positioned on the object side of the third lens group G3, as described above, it is preferred that the lens group contributing to image stabilization be positioned on the image side. The above-described arrangement of the third lens group G3 is also preferred in view of these circumstances.

As in the example shown in FIG. 1, for example, the cemented lens of the front group G3f may consist of a cemented lens formed by a lens L31 having a negative refractive power and a lens L32 having a positive refractive power cemented together in this order from the object side. This configuration is contributive to well-balanced correction of chromatic aberration and size reduction of the lens system. It should be noted that, while the cemented lens of the front group G3f in the example shown in FIG. 1 is formed by the negative lens and the positive lens which are arranged in this order from the object side, the order from the object side of the negative lens and the positive lens is not limited to the above-described order, and the cemented lens may be formed by a positive lens and a negative lens which are arranged in this order from the object side, as in the example shown in FIG. 4.

As in the example shown in FIG. 1, for example, it is preferred that the rear group G3r consist of, in order from the object side, a lens L33 having a positive refractive power, and a cemented lens formed by a lens L34 having a negative refractive power and a lens L35 having a positive refractive power cemented together, where the positive lens L35 forming the cemented lens is made of a material having a greater Abbe number than that of a material of the negative lens L34. This contributes to well-balanced correction of chromatic aberration and size reduction of the lens system.

Figure 11:
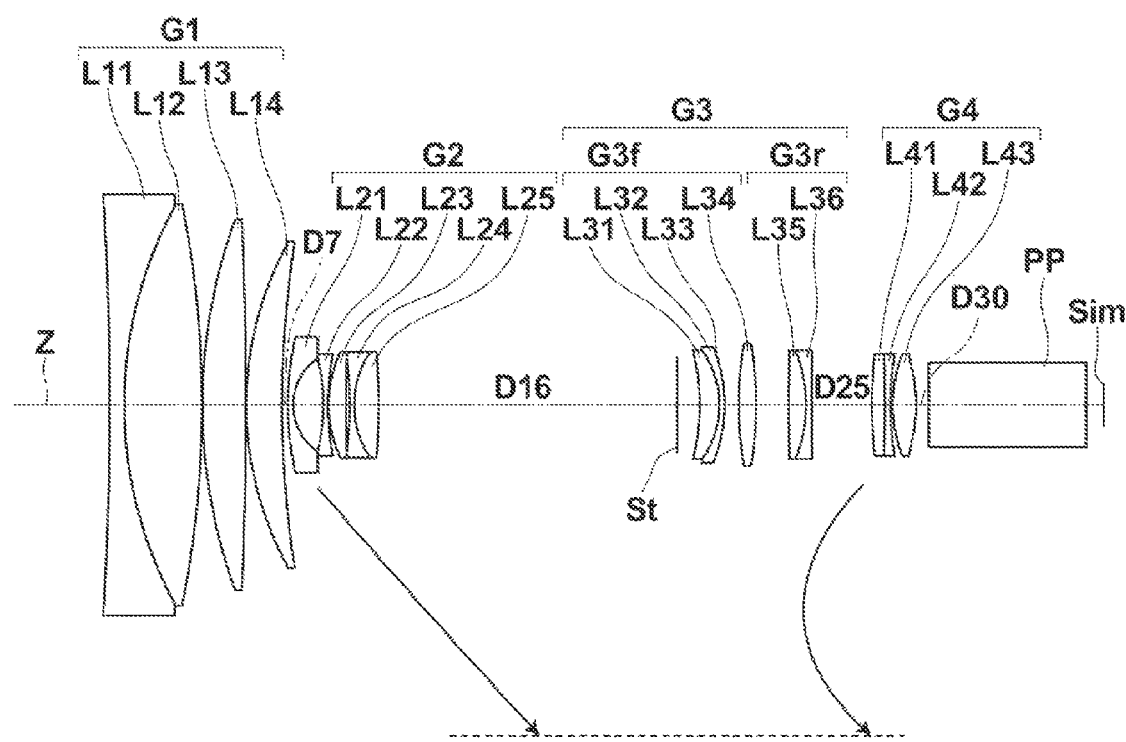
FIG. 11 is a sectional view illustrating the lens configuration of a zoom lens according to Example 11 of the invention.

It should be noted that, while the cemented lens of the rear group G3r in the example shown in FIG. 1 is formed by the negative lens and the positive lens which are arranged in this order from the object side, the order from the object side of the negative lens and the positive lens is not limited to the above-described order, and the cemented lens may be formed by a positive lens and a negative lens which are arranged in this order from the object side, as in the example shown in FIG. 11, for example.

The fourth lens group G4 may have a three-lens configuration consisting of, for example, two lenses each having a positive refractive power, and one lens having a negative refractive power. In the example shown in FIG. 1, for example, it is preferred that the fourth lens group G4 consist of, in order from the object side, a lens L41 having a positive refractive power, a lens L42 having a negative refractive power and cemented to the lens L41, and a lens L43 having a positive refractive power, wherein the positive lens L41 forming the cemented lens is made of a material having a greater Abbe number than that of a material forming the negative lens L42. This contributes to well-balanced correction of chromatic aberration and size reduction of the lens system. Further, it is preferred that the lens L43 include an aspheric surface. This allows successful aberration correction.

It should be noted that, while the cemented lens of the fourth lens group G4 in the example shown in FIG. 1 is formed by the positive lens and the negative lens which are arranged in this order from the object side, the order from the object side of the positive lens and the negative lens is not limited to the above-described order.

It is preferred that the zoom lens of this embodiment satisfy the condition expressions (1) to (3) below:

$$2.0<|f12w/fw|<3.0 \qquad (1),$$

$$2.5<|(Rz1+Rz2)/(Rz1-Rz2)|<5.0 \qquad (2), \text{ and}$$

$$8.6<Mz/fw<12.0 \qquad (3),$$

where f12w is a combined focal length of the first lens group and the second lens group at the wide-angle end, fw is a focal length of the entire system at the wide-angle end, Rz1 and Rz2 are radii of curvature forming the air space in the second lens group, and Mz is an amount of movement of the second lens group during magnification change from the wide-angle end to the telephoto end.

The condition expression (1) is an expression about the ratio of a combined focal length of the first lens group G1 and the second lens group G2 at the wide-angle end relative to a focal length of the entire system at the wide-angle end. If the lower limit of the condition expression (1) is not reached, the negative refractive power of the combined optical system formed by the first lens group G1 and the second lens group G2 at the wide-angle end is strong, making it difficult to correct aberrations. If the upper limit of the condition expression (1) is exceeded, it is difficult to achieve wide angle.

The condition expression (2) is an expression about radii of curvature of the lenses forming the air space in the second lens group G2. It should be noted that the lenses forming the air space in the second lens group G2 are, for example, the lens L22 and the lens L23 shown in FIG. 1. If the condition expression (2) is not satisfied, field curvature on the wide angle side and coma on the telephoto end are worsened.

The condition expression (3) is an expression about the ratio of an amount of movement of the second lens group G2 during magnification change from the wide-angle end to the telephoto end relative to a focal length of the entire system at the wide-angle end. If the lower limit of the condition expression (3) is not reached, it is difficult to achieve high zoom ratio. If the upper limit of the condition expression (3) is exceeded, the size of the lens system increases.

In order to enhance the above-described effects, it is more preferred that at least one of the condition expressions (1-1), (2-1), and (3-1) below be satisfied:

$$2.4 < |f12w/fw| < 3.0 \quad (1\text{-}1),$$

$$2.6 < |(Rz1+Rz2)/(Rz1-Rz2)| < 4.8 \quad (2\text{-}1), \text{ and}$$

$$8.8 < Mz/fw < 11.5 \quad (3\text{-}1).$$

It is preferred that the zoom lens of this embodiment satisfy the condition expression (4) below:

$$0.8 < f3r/f3 < 2.0 \quad (4),$$

where f3r is a focal length of the rear group G3r of the third lens group G3, and f3 is a focal length of the third lens group G3.

The condition expression (4) is an expression about the ratio of a focal length of the rear group G3r of the third lens group relative to a focal length of the third lens group G3. If the lower limit of the condition expression (4) is not reached, spherical aberration and coma are worsened. If the upper limit of the condition expression (4) is exceeded, a large amount of movement is required for correcting for a change of the image plane, resulting in size increase of the lens system.

In order to enhance the above-described effects, it is more preferred that the condition expression below (4-1) be satisfied:

$$0.9 < f3r/f3 < 1.8 \quad (4\text{-}1).$$

According to the zoom lens of this embodiment, a zoom lens that has a high zoom ratio of, for example, around 20×, has high performance, achieves wide angle, size reduction, and cost reduction, and allows obtaining good images can be provided by employing the above-described features, as appropriate.

If it is desired that the zoom lens of this embodiment have environment resistance, it is preferred that the most object-side lens of the entire system be made of a glass material. When the zoom lens is used outdoors with a monitoring camera, or the like, the lens at the most object-side position is always exposed to sun light. In this case, if the most object-side lens is a plastic lens, degradation or deterioration is a concern.

In a case where the room lens of this embodiment is used in a harsh environment, it is preferred that the zoom lens be provided with a protective multi-layer coating. Besides the protective coating, the zoom lens may be provided with an antireflection coating for reducing ghost light, etc., during use.

In the example shown in FIG. 1, the optical member PP is disposed between the lens system and the image plane. However, in place of disposing the various filters, such as a low-pass filter and a filter that cuts off at specific wavelength range, the various filters may be disposed between the lenses, or coatings having the same functions as the various filters may be applied to the lens surfaces of some of the lenses.

EXAMPLES

Next, numerical examples of the zoom lens of the invention are described. FIGS. 1 to 11 show sectional views of the zoom lenses of Examples 1 to 11, respectively.

Table 1 shows basic lens data of the zoom lens of Example 1, Table 2 shows other data of the zoom lens, and Table 3 shows aspheric coefficients of the zoom lens. Similarly, Tables 4 to 33 show basic lens data, other data, and aspheric coefficients of the zoom lenses of Examples 2 to 11. In the following description, meanings of symbols used in the tables are explained with respect to Example 1 as an example. Basically, the same explanations apply to those with respect to Examples 2 to 11. It should be noted that numerical data shown in Tables 1 to 33 are normalized such that values of the focal length at the wide-angle end become 1.

In the basic lens data shown in Table 1, each value in the column of "Si" represents the surface number of the i-th (i=1, 2, 3, ...) surface, where the object-side surface of the most object-side element is the 1st surface and the number is sequentially increased toward the image side, each value in the column of "Ri" represents the radius of curvature of the i-th surface, and each value in the column of "Di" represents the surface distance between the i-th surface and the i+1-th surface along the optical axis Z. It should be noted that the sign with respect to the radius of curvature is provided such that a positive radius of curvature indicates a surface that is convex toward the object side, and a negative radius of curvature indicates a surface that is convex toward the image side.

Further, in the basic lens data, each value in the column of "ndj" represents the refractive index with respect to the d-line (the wavelength of 587.6 nm) of the j-th (j=1, 2, 3, ...) element, where the most object-side lens is the 1st element and the number is sequentially increased toward the image side, and each value in the column of "vdj" represents the Abbe number with respect to the d-line of the j-th element. It should be noted that the basic lens data also includes data of the aperture stop St, and the surface number and the text "(stop)" are shown at the position in the column of the surface number corresponding to the aperture stop St.

In the basic lens data shown in Table 1, D7, D14, D23, and D28 are surface distances that are changed during magnification change, where D7 is a distance between the first lens group G1 and the second lens group G2, D14 is a distance between the second lens group G2 and the aperture stop St, D23 is a distance between the third lens group G3 and the fourth lens group G4, and D28 is a distance between the fourth lens group G4 and the optical member PP. In the basic lens data and the other data, texts "DD[7]", "DD[14]", "DD[23]", and "DD[28]" are shown at the positions in the column of the surface distance corresponding to D7, D14, D23, and D28 to indicate that these surface distances are variable. It should be noted that D25 and D30 are used in Examples 5, 6, and 7 in place of D23 and D28 in the above-described example, respectively, D22 and D27 are used in Example 8 in place of D23 and D28 in the above-described example, respectively, D25 and D30 are used in Example 9 in place of D23 and D28 in the above-described example, respectively, and D16, D25, and D30 are used in Examples 10 and 11 in place of D14, D23 and D28 in the above-described example, respectively. It should be noted that, in FIGS. 1 to 11, only the surface distances that are changed during magnification change are shown.

The other data shown in Table 2 show values of the zoom magnification, the focal length of the entire system (f'), the back focus (equivalent air distance) Bf', the f-number (FNo.), the total angle of view (2ω), and the surface distances that are changed during magnification change at the wide-angle end, at an intermediate range, and at the telephoto end, respectively, when the lens is focused at infinity. It should be noted that, among the values of the surface distances that are changed during magnification change shown in Table 2, those without the index "inf" are surface distances when the lens is focused at a distance of 700 mm.

In the lens data shown in Table 1, each surface number with the symbol "*" added on the left side indicates that the corresponding lens surface has an aspheric shape. In the basic lens data shown in Table 1, a numerical value of the paraxial radius of curvature is shown as the radius of curvature of each aspheric surface.

Table 3 shows aspheric coefficients of the zoom lens according to Example 1, where the surface number of each aspheric surface and aspheric coefficients about the aspheric surface are shown, and where "E−n" (n is an integer) following the numerical value of each aspheric coefficient means "×10$^{-n}$". It should be noted that the aspheric coefficients are values of the coefficients KA and Am in the formula of aspheric surface shown below:

$$Zd = C \cdot h^2 / \{1 + (1 - KA \cdot C^2 \cdot h^2)^{1/2}\} + \Sigma Am \cdot h^m,$$

where Zd is a depth of the aspherical surface (a length of a perpendicular line from a point with a height h on the aspherical surface to a plane tangent to the apex of the aspherical surface and perpendicular to the optical axis), h is the height (a distance from the optical axis to the lens surface), C is a reciprocal of the paraxial curvature, and KA and Am are aspheric coefficients.

Each aspheric surface of the zoom lens according to Example 1 is expressed based on the above-described formula of aspheric surface, where, with respect to the aspheric coefficient Am, orders from A3 to A16 are electively used.

The numerical values shown in the tables below are rounded at predetermined decimal places. With respect to the data shown in the tables below, the unit of angle is degrees, and the unit of length is millimeters; however, any other suitable units may be used since optical systems are usable when they are proportionally enlarged or reduced.

TABLE 1

Example 1- Lens Data

| Si | Ri | Di | ndj | vdj |
|---|---|---|---|---|
| 1 | 37.4461 | 0.53 | 1.80518 | 25.42 |
| 2 | 12.4732 | 2.21 | 1.49700 | 81.54 |
| 3 | −203.9364 | 0.02 | | |
| 4 | 20.2806 | 1.04 | 1.49700 | 81.54 |
| 5 | 150.4948 | 0.02 | | |
| 6 | 10.0240 | 1.22 | 1.80400 | 46.58 |
| 7 | 28.8874 | DD[7] | | |
| 8 | 14.7877 | 0.19 | 1.88300 | 40.76 |
| 9 | 1.8324 | 1.06 | | |
| 10 | −6.4474 | 0.17 | 1.88300 | 40.76 |
| 11 | 8.5990 | 0.02 | | |
| 12 | 3.8927 | 0.91 | 1.80809 | 22.76 |
| 13 | −5.4597 | 0.18 | 1.83481 | 42.73 |
| 14 | 32.5721 | DD[14] | | |

TABLE 1-continued

Example 1- Lens Data

| Si | Ri | Di | ndj | vdj |
|---|---|---|---|---|
| 15 (stop) | ∞ | 1.18 | | |
| 16 | 6.2516 | 0.19 | 1.83481 | 42.73 |
| 17 | 3.1026 | 0.75 | 1.62588 | 35.70 |
| 18 | 16.6745 | 0.70 | | |
| 19 | 6.7904 | 0.43 | 1.73077 | 40.51 |
| 20 | 21.0910 | 0.02 | | |
| 21 | 17.3126 | 0.21 | 1.83481 | 42.73 |
| 22 | 4.2420 | 0.70 | 1.49700 | 81.54 |
| 23 | −211.9787 | DD[23] | | |
| 24 | 4.8115 | 0.63 | 1.54072 | 47.23 |
| 25 | 643.5331 | 0.19 | 1.92286 | 18.90 |
| 26 | 7.5783 | 0.21 | | |
| *27 | 6.5595 | 0.78 | 1.56867 | 58.50 |
| *28 | −5.2566 | DD[28] | | |
| 29 | ∞ | 5.67 | 1.51632 | 64.00 |
| 30 | ∞ | 0.00 | 1.51632 | 64.00 |
| 31 | ∞ | 0.60 | | |

TABLE 2

Example 1- Other Data

| | Wide angle | Intermediate | Telephoto |
|---|---|---|---|
| Zoom ratio | 1.0 | 6.2 | 22.1 |
| f | 1.00 | 6.26 | 22.11 |
| Bf | 0.60 | 0.60 | 0.60 |
| FNo. | 1.66 | 2.52 | 3.12 |
| 2ω[°] | 73.8 | 12.8 | 3.6 |
| DD[7] | 0.21 | 7.25 | 9.59 |
| DD[14] | 9.79 | 2.75 | 0.41 |
| DD[23] | 2.50 | 0.89 | 1.35 |
| DD[23]_inf | 2.50 | 0.94 | 1.95 |
| DD[28] | 0.47 | 2.08 | 1.62 |
| DD[28]_inf | 0.47 | 2.03 | 1.02 |

TABLE 3

Example 1- Aspheric Coefficient

| Surface No. | 27 | 28 |
|---|---|---|
| KA | −1.3510272E+00 | −6.1070852E+00 |
| A3 | 8.8693247E−06 | 9.9670288E−06 |
| A4 | −8.7489948E−03 | −9.0365146E−03 |
| A5 | 1.8569051E−02 | 1.1118542E−02 |
| A6 | −1.7076617E−02 | −1.2723506E−02 |
| A7 | −2.4206617E−03 | 6.4253024E−03 |
| A8 | 8.6860959E−03 | −2.5809830E−03 |
| A9 | 2.2587526E−03 | 9.5510376E−04 |
| A10 | −6.2260022E−03 | 2.7799944E−03 |
| A11 | 1.0822609E−03 | −4.3670154E−03 |
| A12 | 1.1114594E−03 | 2.1576742E−03 |
| A13 | −1.6541243E−05 | −8.3793460E−06 |
| A14 | −4.2768027E−04 | −4.2375007E−04 |
| A15 | 1.6698190E−04 | 1.6928781E−04 |
| A16 | −1.9445114E−05 | −2.2236363E−05 |

TABLE 4

Example 2- Lens Data

| Si | Ri | Di | ndj | vdj |
|---|---|---|---|---|
| 1 | 34.9313 | 0.53 | 1.80518 | 25.42 |
| 2 | 12.2355 | 2.21 | 1.49700 | 81.54 |
| 3 | −307.8411 | 0.02 | | |
| 4 | 21.5205 | 0.99 | 1.49700 | 81.54 |
| 5 | 160.8892 | 0.02 | | |

TABLE 4-continued

Example 2- Lens Data

| Si | Ri | Di | ndj | vdj |
|---|---|---|---|---|
| 6 | 10.0527 | 1.23 | 1.80400 | 46.58 |
| 7 | 29.7501 | DD[7] | | |
| 8 | 14.7192 | 0.19 | 1.88300 | 40.76 |
| 9 | 1.8410 | 1.05 | | |
| 10 | −6.2824 | 0.17 | 1.88300 | 40.76 |
| 11 | 8.7871 | 0.02 | | |
| 12 | 3.9476 | 1.06 | 1.80518 | 25.42 |
| 13 | −3.6193 | 0.18 | 1.83481 | 42.73 |
| 14 | 46.1323 | DD[14] | | |
| 15 (stop) | ∞ | 1.18 | | |
| 16 | 6.0050 | 0.19 | 1.83481 | 42.73 |
| 17 | 3.0344 | 0.76 | 1.62588 | 35.70 |
| 18 | 15.8013 | 0.70 | | |
| 19 | 9.8091 | 0.33 | 1.73077 | 40.51 |
| 20 | 18.9491 | 0.02 | | |
| 21 | 8.6106 | 0.21 | 1.83481 | 42.73 |
| 22 | 4.4395 | 0.63 | 1.49700 | 81.54 |
| 23 | 37.1935 | DD[23] | | |
| 24 | 5.0131 | 0.66 | 1.54072 | 47.23 |
| 25 | −185.6386 | 0.19 | 1.92286 | 18.90 |
| 26 | 7.6413 | 0.19 | | |
| *27 | 6.2265 | 0.77 | 1.56867 | 58.50 |
| *28 | −5.2528 | DD[28] | | |
| 29 | ∞ | 5.67 | 1.51632 | 64.00 |
| 30 | ∞ | 0.00 | 1.51632 | 64.00 |
| 31 | ∞ | 0.61 | | |

TABLE 5

Example 2- Other Data

| | Wide angle | Intermediate | Telephoto |
|---|---|---|---|
| Zoom ratio | 1.0 | 6.2 | 22.1 |
| f | 1.00 | 6.26 | 22.11 |
| Bf | 4.81 | 6.37 | 5.38 |
| FNo. | 1.66 | 2.52 | 3.12 |
| 2ω[°] | 73.8 | 12.8 | 3.6 |
| DD[7] | 0.21 | 7.30 | 9.65 |
| DD[14] | 9.84 | 2.75 | 0.40 |
| DD[23] | 2.51 | 0.90 | 1.33 |
| DD[23]_inf | 2.51 | 0.95 | 1.93 |
| DD[28] | 0.47 | 2.08 | 1.65 |
| DD[28]_inf | 0.47 | 2.03 | 1.05 |

TABLE 6

Example 2- Aspheric Coefficient

| Surface No. | 27 | 28 |
|---|---|---|
| KA | −1.3469852E+00 | −6.1337841E+00 |
| A3 | −4.1842738E−06 | −4.4672777E−05 |
| A4 | −7.1322915E−03 | −7.5080429E−03 |
| A5 | 1.4219953E−02 | 4.7852675E−03 |
| A6 | −1.0345866E−02 | 4.9664059E−03 |
| A7 | −7.1946305E−03 | −2.5233431E−02 |
| A8 | 1.0468983E−02 | 3.2128565E−02 |
| A9 | 1.1055936E−03 | −1.5903494E−02 |
| A10 | −5.3301334E−03 | −4.2481828E−03 |
| A11 | 1.5592912E−03 | 9.9538009E−03 |
| A12 | 1.8406481E−06 | −3.9645171E−03 |
| A13 | 5.1587891E−04 | −1.3832061E−03 |
| A14 | −4.4827065E−04 | 1.8192242E−03 |
| A15 | 1.2059643E−04 | −6.3449385E−04 |
| A16 | −1.0328974E−05 | 7.9408898E−05 |

TABLE 7

Example 3- Lens Data

| Si | Ri | Di | ndj | vdj |
|---|---|---|---|---|
| 1 | 64.8202 | 0.53 | 1.80518 | 25.42 |
| 2 | 13.8147 | 2.31 | 1.49700 | 81.54 |
| 3 | −57.2281 | 0.02 | | |
| 4 | 20.1142 | 1.11 | 1.49700 | 81.54 |
| 5 | 386.6802 | 0.02 | | |
| 6 | 9.3590 | 1.21 | 1.80400 | 46.58 |
| 7 | 23.1055 | DD[7] | | |
| 8 | 14.3450 | 0.19 | 1.88300 | 40.76 |
| 9 | 1.8092 | 1.06 | | |
| 10 | −6.7148 | 0.18 | 1.88300 | 40.76 |
| 11 | 7.5219 | 0.02 | | |
| 12 | 3.8177 | 1.06 | 1.84661 | 23.78 |
| 13 | −3.9583 | 0.18 | 1.83481 | 42.73 |
| 14 | 20.3817 | DD[14] | | |
| 15 (stop) | ∞ | 1.38 | | |
| 16 | 5.1693 | 0.19 | 1.83481 | 42.73 |
| 17 | 2.8172 | 0.65 | 1.69895 | 30.05 |
| 18 | 6.0125 | 0.70 | | |
| 19 | 9.8956 | 0.39 | 1.77250 | 49.60 |
| 20 | 46.4722 | 0.02 | | |
| 21 | 5.8492 | 0.22 | 1.85026 | 32.27 |
| 22 | 3.4996 | 0.66 | 1.49700 | 81.54 |
| 23 | 13.2420 | DD[23] | | |
| 24 | 4.0653 | 0.80 | 1.59522 | 67.74 |
| 25 | −31.3643 | 0.22 | 1.90366 | 31.32 |
| 26 | 4.2312 | 0.20 | | |
| *27 | 3.9829 | 0.93 | 1.56867 | 58.50 |
| *28 | −4.9492 | DD[28] | | |
| 29 | ∞ | 5.68 | 1.51632 | 64.00 |
| 30 | ∞ | 0.00 | 1.51632 | 64.00 |
| 31 | ∞ | 0.59 | | |

TABLE 8

Example 3- Other Data

| | Wide angle | Intermediate | Telephoto |
|---|---|---|---|
| Zoom ratio | 1.0 | 6.2 | 22.1 |
| f | 1.00 | 6.24 | 22.11 |
| Bf | 4.80 | 6.39 | 5.34 |
| FNo. | 1.66 | 2.52 | 3.12 |
| 2ω[°] | 73.8 | 13.0 | 3.6 |
| DD[7] | 0.21 | 7.11 | 9.38 |
| DD[14] | 9.63 | 2.73 | 0.46 |
| DD[23] | 2.54 | 0.89 | 1.38 |
| DD[23]_inf | 2.54 | 0.94 | 1.99 |
| DD[28] | 0.47 | 2.12 | 1.63 |
| DD[28]_inf | 0.47 | 2.07 | 1.02 |

TABLE 9

Example 3- Aspheric Coefficient

| Surface No. | 27 | 28 |
|---|---|---|
| KA | −3.0636790E−04 | −2.7894834E+00 |
| A3 | 3.3832736E−06 | −2.0438637E−06 |
| A4 | −5.6020869E−03 | −6.5951899E−03 |
| A5 | 1.1859045E−02 | 1.3655379E−02 |
| A6 | −8.5650363E−03 | −1.2332668E−02 |
| A7 | −3.0543784E−03 | −9.3227163E−04 |
| A8 | 2.9994031E−03 | 5.4432805E−03 |
| A9 | 2.6210423E−03 | −1.0105157E−03 |
| A10 | −1.5184333E−03 | −6.4998332E−04 |
| A11 | −1.0617370E−03 | −4.1442270E−04 |
| A12 | 7.4192271E−04 | 8.7074286E−04 |

TABLE 9-continued

Example 3- Aspheric Coefficient

| Surface No. | 27 | 28 |
|---|---|---|
| A13 | 8.3312618E−05 | −6.2219528E−04 |
| A14 | −1.9207207E−04 | 2.6019545E−04 |
| A15 | 6.6614554E−05 | −6.0703558E−05 |
| A16 | −8.3572704E−06 | 6.0464478E−06 |

TABLE 10

Example 4- Lens Data

| Si | Ri | Di | ndj | νdj |
|---|---|---|---|---|
| 1 | 47.2200 | 0.53 | 1.80518 | 25.42 |
| 2 | 13.0662 | 2.24 | 1.49700 | 81.54 |
| 3 | −102.9249 | 0.02 | | |
| 4 | 23.1743 | 1.05 | 1.49700 | 81.54 |
| 5 | ∞ | 0.02 | | |
| 6 | 9.6718 | 1.23 | 1.80400 | 46.58 |
| 7 | 25.9274 | DD[7] | | |
| 8 | 14.3814 | 0.19 | 1.88300 | 40.76 |
| 9 | 1.8503 | 1.08 | | |
| 10 | −6.1706 | 0.17 | 1.88300 | 40.76 |
| 11 | 8.3947 | 0.02 | | |
| 12 | 4.0702 | 1.02 | 1.84661 | 23.78 |
| 13 | −4.0702 | 0.18 | 1.83481 | 42.73 |
| 14 | 29.3006 | DD[14] | | |
| 15 (stop) | ∞ | 1.22 | | |
| 16 | 17.8940 | 0.97 | 1.74950 | 35.04 |
| 17 | −3.1743 | 0.19 | 1.83481 | 42.73 |
| 18 | 58.0256 | 0.47 | | |
| 19 | 7.3951 | 0.61 | 1.56384 | 60.67 |
| 20 | −23.3916 | 0.02 | | |
| 21 | 6.9577 | 0.21 | 1.83481 | 42.73 |
| 22 | 3.3776 | 0.67 | 1.49700 | 81.54 |
| 23 | 10.9290 | DD[23] | | |
| 24 | 5.3015 | 0.64 | 1.51633 | 64.14 |
| 25 | ∞ | 0.22 | 1.92286 | 18.90 |
| 26 | 8.8832 | 0.16 | | |
| *27 | 6.4120 | 0.78 | 1.56867 | 58.50 |
| *28 | −5.9674 | DD[28] | | |
| 29 | ∞ | 5.67 | 1.51632 | 64.00 |
| 30 | ∞ | 0.00 | 1.51632 | 64.00 |
| 31 | ∞ | 0.60 | | |

TABLE 11

Example 4- Other Data

| | Wide angle | Intermediate | Telephoto |
|---|---|---|---|
| Zoom ratio | 1.0 | 6.2 | 22.1 |
| f | 1.00 | 6.24 | 33.11 |
| Bf | 4.80 | 6.37 | 5.38 |
| FNo. | 1.66 | 2.52 | 3.12 |
| 2ω[°] | 73.8 | 13.0 | 3.6 |
| DD[7] | 0.21 | 7.32 | 9.66 |
| DD[14] | 9.89 | 2.78 | 0.44 |
| DD[23] | 2.49 | 0.87 | 1.30 |
| DD[23]_inf | 2.49 | 0.92 | 1.90 |
| DD[28] | 0.47 | 2.09 | 1.66 |
| DD[28]_inf | 0.47 | 2.04 | 1.06 |

TABLE 12

Example 4- Aspheric Coefficient

| Surface No. | 27 | 28 |
|---|---|---|
| KA | −7.6540125E+00 | −5.6981136E+00 |
| A3 | −6.4178651E−06 | 9.4276825E−08 |

TABLE 12-continued

Example 4- Aspheric Coefficient

| Surface No. | 27 | 28 |
|---|---|---|
| A4 | −2.6351006E−04 | −1.7985625E−03 |
| A5 | 7.5606811E−03 | −6.4244277E−04 |
| A6 | −8.1919998E−03 | 1.1832281E−04 |
| A7 | 3.5680364E−03 | 2.4212499E−04 |
| A8 | −8.3752169E−03 | −2.4810497E−04 |
| A9 | 2.0795948E−02 | 2.5508364E−04 |
| A10 | −2.1792266E−02 | −1.6610001E−04 |
| A11 | 7.1252734E−03 | 6.2959514E−05 |
| A12 | 7.0510373E−03 | −1.4187394E−05 |
| A13 | −9.5621324E−03 | 6.3019562E−06 |
| A14 | 5.0547434E−03 | −4.9797631E−06 |
| A15 | −1.3400539E−03 | 1.9293054E−06 |
| A16 | 1.4656479E−04 | −2.7345557E−07 |

TABLE 13

Example 5- Lens Data

| Si | Ri | Di | ndj | νdj |
|---|---|---|---|---|
| 1 | 37.8997 | 0.53 | 1.80518 | 25.42 |
| 2 | 12.2542 | 2.26 | 1.49700 | 81.54 |
| 3 | −161.0099 | 0.02 | | |
| 4 | 21.8370 | 1.01 | 1.49700 | 81.54 |
| 5 | 213.9649 | 0.02 | | |
| 6 | 9.8751 | 1.25 | 1.80400 | 46.58 |
| 7 | 29.3203 | DD[7] | | |
| 8 | 16.4363 | 0.19 | 1.88300 | 40.76 |
| 9 | 1.8430 | 1.03 | | |
| 10 | −6.9124 | 0.17 | 1.88300 | 40.76 |
| 11 | 7.9198 | 0.02 | | |
| 12 | 3.8093 | 0.91 | 1.84666 | 23.78 |
| 13 | −5.2712 | 0.18 | 1.83481 | 42.73 |
| 14 | 18.1887 | DD[14] | | |
| 15 (stop) | ∞ | 1.18 | | |
| 16 | 15.0718 | 0.55 | 1.74400 | 44.78 |
| 17 | −8.9574 | 0.07 | | |
| 18 | −7.1761 | 0.19 | 1.83400 | 37.16 |
| 19 | 4.3190 | 0.69 | 1.76182 | 26.52 |
| 20 | −95.3957 | 0.70 | | |
| 21 | 7.7976 | 0.53 | 1.60311 | 60.64 |
| 22 | −71.7491 | 0.02 | | |
| 23 | 6.9894 | 0.21 | 1.83481 | 42.73 |
| 24 | 3.5499 | 0.64 | 1.49700 | 81.54 |
| 25 | 11.1341 | DD[25] | | |
| 26 | 4.2762 | 0.62 | 1.51633 | 64.14 |
| 27 | 15.3212 | 0.22 | 1.92286 | 18.90 |
| 28 | 5.4361 | 0.21 | | |
| *29 | 5.4900 | 0.75 | 1.56867 | 58.50 |
| *30 | −6.0266 | DD[30] | | |
| 31 | ∞ | 5.67 | 1.51632 | 64.00 |
| 32 | ∞ | 0.00 | 1.51632 | 64.00 |
| 33 | ∞ | 0.63 | | |

TABLE 14

Example 5- Other Data

| | Wide angle | Intermediate | Telephoto |
|---|---|---|---|
| Zoom ratio | 1.0 | 6.2 | 22.1 |
| f | 1.00 | 6.24 | 22.11 |
| Bf | 4.83 | 6.35 | 5.31 |
| FNo. | 1.67 | 2.52 | 3.12 |
| 2ω[°] | 73.8 | 12.8 | 3.6 |
| DD[7] | 0.21 | 7.19 | 9.47 |
| DD[14] | 9.73 | 2.75 | 0.47 |
| DD[25] | 2.37 | 0.79 | 1.28 |

TABLE 14-continued

Example 5- Other Data

|  | Wide angle | Intermediate | Telephoto |
|---|---|---|---|
| DD[25]_inf | 2.37 | 0.84 | 1.88 |
| DD[30] | 0.47 | 2.05 | 1.56 |
| DD[30]_inf | 0.47 | 2.00 | 0.96 |

TABLE 15

Example 5- Aspheric Coefficient

| Surface No. | 29 | 30 |
|---|---|---|
| KA | −1.8454883E−03 | −2.8141835E+00 |
| A3 | −7.9898975E−07 | 5.8556502E−08 |
| A4 | −1.4525817E−03 | −7.2279272E−04 |
| A5 | −4.9321637E−04 | −1.8563796E−04 |
| A6 | 5.4605707E−04 | 1.1090776E−04 |
| A7 | −1.3514024E−04 | −9.6438483E−06 |
| A8 | −3.7802685E−05 | −7.1315497E−05 |
| A9 | −2.3686218E−04 | 7.3475709E−05 |
| A10 | 1.9468326E−04 | −4.9461437E−05 |
| A11 | 2.8049223E−05 | 1.2304938E−05 |
| A12 | −1.9156070E−05 | 1.2749181E−05 |
| A13 | −6.1061492E−05 | −1.5739952E−05 |
| A14 | 5.1877463E−05 | 7.9999950E−06 |
| A15 | −1.6139247E−05 | −2.0762595E−06 |
| A16 | 1.8717212E−06 | 2.2460564E−07 |

TABLE 16

Example 6- Lens Data

| Si | Ri | Di | ndj | vdj |
|---|---|---|---|---|
| 1 | 37.6028 | 0.53 | 1.80518 | 25.42 |
| 2 | 12.2043 | 2.26 | 1.49700 | 81.54 |
| 3 | −164.5636 | 0.02 | | |
| 4 | 21.2369 | 1.02 | 1.49700 | 81.54 |
| 5 | 188.4839 | 0.02 | | |
| 6 | 9.8695 | 1.26 | 1.80400 | 46.58 |
| 7 | 29.4262 | DD[7] | | |
| 8 | 16.8984 | 0.19 | 1.88300 | 40.76 |
| 9 | 1.8437 | 1.03 | | |
| 10 | −7.0520 | 0.17 | 1.88300 | 40.76 |
| 11 | 7.7192 | 0.02 | | |
| 12 | 3.7795 | 0.92 | 1.84666 | 23.78 |
| 13 | −5.2329 | 0.18 | 1.83481 | 42.73 |
| 14 | 17.7963 | DD[14] | | |
| 15 (stop) | ∞ | 1.18 | | |
| 16 | 14.7731 | 0.54 | 1.74400 | 44.78 |
| 17 | −9.3626 | 0.07 | | |
| 18 | −7.3685 | 0.19 | 1.83400 | 37.16 |
| 19 | 4.2270 | 0.69 | 1.76182 | 26.52 |
| 20 | −140.2344 | 0.70 | | |
| 21 | 7.6263 | 0.54 | 1.60311 | 60.64 |
| 22 | −66.1522 | 0.02 | | |
| 23 | 7.1050 | 0.21 | 1.83481 | 42.73 |
| 24 | 3.5339 | 0.64 | 1.49700 | 81.54 |
| 25 | 11.2876 | DD[25] | | |
| 26 | 4.0559 | 0.64 | 1.51823 | 58.90 |
| 27 | 14.3808 | 0.22 | 1.92286 | 18.90 |
| 28 | 5.2229 | 0.22 | | |
| *29 | 5.5417 | 0.75 | 1.56867 | 58.50 |
| *30 | −5.9903 | DD[30] | | |
| 31 | ∞ | 5.67 | 1.51632 | 64.00 |
| 32 | ∞ | 0.00 | 1.51632 | 64.00 |
| 33 | ∞ | 0.63 | | |

TABLE 17

Example 6- Other Data

|  | Wide angle | Intermediate | Telephoto |
|---|---|---|---|
| Zoom ratio | 1.0 | 6.2 | 22.1 |
| f | 1.00 | 6.26 | 22.11 |
| Bf | 4.83 | 6.34 | 5.27 |
| FNo. | 1.66 | 2.52 | 3.12 |
| 2ω[°] | 73.8 | 12.8 | 3.6 |
| DD[7] | 0.21 | 7.13 | 9.39 |
| DD[14] | 9.66 | 2.74 | 0.48 |
| DD[25] | 2.34 | 0.78 | 1.29 |
| DD[25]_inf | 2.34 | 0.83 | 1.89 |
| DD[30] | 0.47 | 2.03 | 1.52 |
| DD[30]_inf | 0.47 | 1.98 | 0.92 |

TABLE 18

Example 6- Aspheric Coefficient

| Surface No. | 29 | 30 |
|---|---|---|
| KA | 9.3870872E−06 | −2.9006145E+00 |
| A3 | 4.0602673E−06 | −2.3871967E−07 |
| A4 | −1.9918561E−03 | −7.3271270E−04 |
| A5 | 1.5122346E−03 | −4.4313445E−04 |
| A6 | −4.1260157E−03 | 2.7892765E−04 |
| A7 | 5.0146249E−03 | −2.3190880E−04 |
| A8 | −3.5481493E−03 | 2.5927516E−04 |
| A9 | 1.8575444E−03 | −2.0777987E−04 |
| A10 | −7.6031198E−04 | 6.5366034E−05 |
| A11 | −1.3974542E−05 | 2.2881816E−05 |
| A12 | 7.1829337E−05 | −2.0773936E−05 |
| A13 | 2.3358498E−04 | −4.6805116E−06 |
| A14 | −2.4882095E−04 | 9.6185356E−06 |
| A15 | 9.0704109E−05 | −3.7564942E−06 |
| A16 | −1.1769108E−05 | 5.0385021E−07 |

TABLE 19

Example 7- Lens Data

| Si | Ri | Di | ndj | vdj |
|---|---|---|---|---|
| 1 | 38.4085 | 0.53 | 1.80518 | 25.42 |
| 2 | 12.3447 | 2.25 | 1.49700 | 81.54 |
| 3 | −154.7220 | 0.02 | | |
| 4 | 20.9748 | 1.02 | 1.49700 | 81.54 |
| 5 | 179.6717 | 0.02 | | |
| 6 | 9.9113 | 1.25 | 1.80400 | 46.58 |
| 7 | 29.1991 | DD[7] | | |
| 8 | 16.4794 | 0.19 | 1.88300 | 40.76 |
| 9 | 1.8390 | 1.03 | | |
| 10 | −7.1303 | 0.17 | 1.88300 | 40.76 |
| 11 | 7.7431 | 0.02 | | |
| 12 | 3.7535 | 0.92 | 1.84666 | 23.78 |
| 13 | −5.2515 | 0.18 | 1.83481 | 42.73 |
| 14 | 16.8294 | DD[14] | | |
| 15 (stop) | ∞ | 1.18 | | |
| 16 | 22.1268 | 0.54 | 1.74100 | 52.64 |
| 17 | −7.8813 | 0.07 | | |
| 18 | −6.4514 | 0.19 | 1.83400 | 37.16 |
| 19 | 4.6151 | 0.70 | 1.78472 | 25.68 |
| 20 | −38.7637 | 0.70 | | |
| 21 | 7.3985 | 0.55 | 1.56883 | 56.36 |
| 22 | −70.4960 | 0.02 | | |
| 23 | 7.3593 | 0.21 | 1.83481 | 42.73 |
| 24 | 3.5580 | 0.67 | 1.49700 | 81.54 |
| 25 | 13.1778 | DD[25] | | |
| 26 | 4.0948 | 0.65 | 1.51823 | 58.90 |
| 27 | 16.6695 | 0.22 | 1.92286 | 18.90 |
| 28 | 5.4883 | 0.23 | | |
| *29 | 5.9360 | 0.73 | 1.56867 | 58.50 |
| *30 | −6.0065 | DD[30] | | |
| 31 | ∞ | 5.67 | 1.51632 | 64.00 |

TABLE 19-continued

Example 7- Lens Data

| Si | Ri | Di | ndj | νdj |
|---|---|---|---|---|
| 32 | ∞ | 0.00 | 1.51632 | 64.00 |
| 33 | ∞ | 0.62 | | |

TABLE 20

Example 7- Other Data

| | Wide angle | Intermediate | Telephoto |
|---|---|---|---|
| Zoom ratio | 1.0 | 6.2 | 22.1 |
| f | 1.00 | 6.26 | 22.11 |
| Bf | 4.83 | 6.35 | 5.31 |
| FNo. | 1.66 | 2.52 | 3.12 |
| 2ω[°] | 73.8 | 12.8 | 3.6 |
| DD[7] | 0.21 | 7.18 | 9.44 |
| DD[14] | 9.68 | 2.71 | 0.45 |
| DD[25] | 2.37 | 0.79 | 1.28 |
| DD[25]_inf | 2.37 | 0.84 | 1.88 |
| DD[30] | 0.47 | 2.05 | 1.56 |
| DD[30]_inf | 0.47 | 2.00 | 0.96 |

TABLE 21

Example 7- Aspheric Coefficient

| Surface No. | 29 | 30 |
|---|---|---|
| KA | −2.0895828E−01 | −3.0223671E+00 |
| A3 | −8.2765792E−07 | 1.5342956E−07 |
| A4 | −1.3638235E−03 | −7.4284911E−04 |
| A5 | −1.0557892E−03 | −4.4908174E−04 |
| A6 | 9.6470620E−04 | 1.4117445E−04 |
| A7 | −4.1887769E−04 | 6.5618848E−05 |
| A8 | 2.5653949E−04 | −1.0485769E−04 |
| A9 | −5.4786519E−04 | 6.0761606E−05 |
| A10 | 3.2133979E−04 | −1.4697983E−05 |
| A11 | 1.8261514E−04 | −4.1525354E−06 |
| A12 | −2.8360660E−04 | −2.6408108E−06 |
| A13 | 1.1998898E−04 | 8.5067455E−06 |
| A14 | −1.6599649E−05 | −5.6603900E−06 |
| A15 | −1.9853609E−06 | 1.6641413E−06 |
| A16 | 6.1184924E−07 | −1.9088242E−07 |

TABLE 22

Example 8- Lens Data

| Si | Ri | Di | ndj | νdj |
|---|---|---|---|---|
| 1 | 38.4160 | 0.53 | 1.80518 | 25.42 |
| 2 | 12.7044 | 2.20 | 1.49700 | 81.54 |
| 3 | −164.3937 | 0.02 | | |
| 4 | 19.0286 | 1.06 | 1.49700 | 81.54 |
| 5 | 114.2640 | 0.02 | | |
| 6 | 10.1215 | 1.21 | 1.80400 | 46.58 |
| 7 | 28.7809 | DD[7] | | |
| 8 | 15.2759 | 0.19 | 1.88300 | 40.76 |
| 9 | 1.8340 | 1.04 | | |
| 10 | −7.0068 | 0.17 | 1.88300 | 40.76 |
| 11 | 7.8169 | 0.02 | | |
| 12 | 3.7159 | 1.06 | 1.80518 | 25.42 |
| 13 | −3.7179 | 0.18 | 1.83481 | 42.73 |
| 14 | 26.5474 | DD[14] | | |
| 15 (stop) | ∞ | 1.18 | | |
| 16 | −463.6927 | 0.75 | 1.67270 | 32.10 |
| 17 | −3.7072 | 0.21 | 1.83481 | 42.73 |
| 18 | −16.2478 | 0.70 | | |
| *19 | 3.9473 | 1.00 | 1.56867 | 58.50 |
| *20 | −8.5526 | 0.02 | | |
| 21 | 34.9414 | 0.21 | 1.83400 | 37.16 |
| 22 | 4.8037 | DD[22] | | |
| 23 | 4.5674 | 0.54 | 1.51633 | 64.14 |
| 24 | 25.7394 | 0.19 | 1.84666 | 23.78 |
| 25 | 4.4219 | 0.18 | | |
| *26 | 4.0272 | 0.88 | 1.56867 | 58.50 |
| *27 | −5.5677 | DD[27] | | |
| 28 | ∞ | 5.67 | 1.51632 | 64.00 |
| 29 | ∞ | 0.00 | 1.51632 | 64.00 |
| 30 | ∞ | 0.60 | | |

TABLE 23

Example 8- Other Data

| | Wide angle | Intermediate | Telephoto |
|---|---|---|---|
| Zoom ratio | 1.0 | 6.2 | 22.1 |
| f | 1.00 | 6.26 | 22.11 |
| Bf | 4.81 | 6.38 | 5.39 |
| FNo. | 1.66 | 2.52 | 3.12 |
| 2ω[°] | 73.8 | 12.8 | 3.6 |
| DD[7] | 0.21 | 7.21 | 9.54 |
| DD[14] | 9.71 | 2.71 | 0.38 |
| DD[22] | 2.53 | 0.90 | 1.33 |
| DD[22]_inf | 2.53 | 0.96 | 1.93 |
| DD[27] | 0.47 | 2.10 | 1.67 |
| DD[27]_inf | 0.47 | 2.04 | 1.07 |

TABLE 24

Example 8- Aspheric Coefficient

| Surface No. | 19 | 20 | 26 | 27 |
|---|---|---|---|---|
| KA | 1.0000000E+00 | 1.0000000E+00 | −8.5178961E−01 | −6.3646316E+00 |
| A3 | | | 1.9880521E−06 | −7.5338403E−07 |
| A4 | −2.4848872E−03 | 9.0076193E−04 | −8.5125540E−04 | −5.1743912E−03 |
| A5 | | | 4.3901998E−03 | 1.6408468E−03 |
| A6 | 3.0987922E−04 | 4.0931106E−04 | −5.6857156E−03 | −2.1789718E−04 |
| A7 | | | 3.5530431E−03 | −6.1691270E−04 |
| A8 | −1.1323444E−04 | −1.4165430E−04 | −1.1881410E−04 | 2.1333159E−03 |
| A9 | | | −1.1054397E−03 | −4.5312653E−03 |
| A10 | 7.8908636E−06 | 1.2698033E−05 | 7.0430208E−04 | 5.4476751E−03 |
| A11 | | | −7.8473477E−04 | −3.3917236E−03 |
| A12 | 2.8108691E−12 | 3.8081001E−12 | 8.7362003E−04 | 3.7234078E−04 |
| A13 | | | −4.7696635E−04 | 1.0033595E−03 |
| A14 | | | 1.2253096E−04 | −7.4622440E−04 |
| A15 | | | −1.2921438E−05 | 2.2784696E−04 |
| A16 | | | 2.3236569E−07 | −2.7037077E−05 |

TABLE 25

Example 9- Lens Data

| Si | Ri | Di | ndj | vdj |
|---|---|---|---|---|
| 1 | 2487.4354 | 0.55 | 1.84666 | 23.78 |
| 2 | 13.3326 | 2.59 | 1.49700 | 81.54 |
| 3 | −57.3944 | 0.02 | | |
| 4 | 21.7720 | 1.09 | 1.83400 | 37.16 |
| 5 | 159.5909 | 0.02 | | |
| 6 | 10.9492 | 1.29 | 1.83481 | 42.73 |
| 7 | 35.8126 | DD[7] | | |
| 8 | 9.5935 | 0.20 | 1.83481 | 42.73 |
| 9 | 1.7889 | 1.26 | | |
| 10 | −6.7526 | 0.18 | 1.83481 | 42.73 |
| 11 | 7.3130 | 0.03 | | |
| 12 | 3.5815 | 1.03 | 1.84666 | 23.78 |
| 13 | −4.9605 | 0.18 | 1.83481 | 42.73 |
| 14 | 9.6273 | DD[14] | | |
| 15 (stop) | ∞ | 1.24 | | |
| 16 | 11.6014 | 0.64 | 1.65160 | 58.55 |
| 17 | −9.8113 | 0.07 | | |
| 18 | −8.0972 | 0.20 | 1.83481 | 42.73 |
| 19 | 4.8976 | 0.78 | 1.74000 | 28.30 |
| 20 | −31.4393 | 0.74 | | |
| 21 | 6.9839 | 0.62 | 1.49700 | 81.54 |
| 22 | −103.0520 | 0.02 | | |
| 23 | 7.0647 | 0.22 | 1.83481 | 42.73 |
| 24 | 3.5862 | 0.71 | 1.49700 | 81.54 |
| 25 | 11.5212 | DD[25] | | |
| 26 | 5.0488 | 0.67 | 1.49700 | 81.54 |
| 27 | −24.2779 | 0.20 | 1.90366 | 31.32 |
| 28 | 4.9176 | 0.11 | | |
| *29 | 3.8730 | 1.00 | 1.56867 | 58.50 |
| *30 | −5.0315 | DD[30] | | |
| 31 | ∞ | 5.95 | 1.51632 | 64.00 |
| 32 | ∞ | 0.00 | 1.51632 | 64.00 |
| 33 | ∞ | 0.65 | | |

TABLE 26

Example 9- Other Data

| | Wide angle | Intermediate | Telephoto |
|---|---|---|---|
| Zoom ratio | 1.0 | 6.2 | 22.1 |
| f | 1.00 | 6.24 | 22.11 |
| Bf | 5.05 | 6.88 | 6.06 |
| FNo. | 1.67 | 2.52 | 3.12 |
| 2ω[°] | 76.4 | 13.6 | 3.8 |
| DD[7] | 0.22 | 7.64 | 9.99 |
| DD[14] | 10.32 | 2.90 | 0.55 |
| DD[25] | 2.82 | 0.93 | 1.20 |
| DD[25]_inf | 2.82 | 0.99 | 1.81 |
| DD[30] | 0.49 | 2.38 | 2.11 |
| DD[30]_inf | 0.49 | 2.32 | 1.50 |

TABLE 27

Example 9- Aspheric Coefficient

| Surface No. | 29 | 30 |
|---|---|---|
| KA | −1.5195347E−01 | −2.6729173E+00 |
| A3 | 4.1590738E−06 | −8.8896478E−08 |
| A4 | −7.9759801E−04 | −9.4290407E−04 |
| A5 | 1.8385139E−03 | −1.1365123E−03 |
| A6 | −3.7327100E−03 | 4.5699901E−04 |
| A7 | 3.7234697E−03 | 4.4474607E−05 |
| A8 | −2.7756367E−03 | 1.2328148E−05 |
| A9 | 2.4190330E−03 | −6.1872238E−05 |
| A10 | −1.9316270E−03 | 3.7844232E−05 |
| A11 | 1.1289251E−03 | −1.7144329E−05 |
| A12 | −7.1096327E−04 | −6.9488377E−06 |
| A13 | 5.1791254E−04 | 1.5163615E−05 |
| A14 | −2.5816534E−04 | −8.9789804E−06 |

TABLE 27-continued

Example 9- Aspheric Coefficient

| Surface No. | 29 | 30 |
|---|---|---|
| A15 | 6.7230097E−05 | 2.5042247E−06 |
| A16 | −7.0580591E−06 | −2.8028124E−07 |

TABLE 28

Example 10- Lens Data

| Si | Ri | Di | ndj | vdj |
|---|---|---|---|---|
| 1 | 2463.9383 | 0.55 | 1.84666 | 23.78 |
| 2 | 12.6248 | 2.74 | 1.49700 | 81.54 |
| 3 | −54.5868 | 0.02 | | |
| 4 | 15.7172 | 1.43 | 1.85135 | 40.10 |
| 5 | 125.3790 | 0.02 | | |
| 6 | 10.8816 | 1.17 | 1.83481 | 42.73 |
| 7 | 26.4713 | DD[7] | | |
| 8 | 14.4629 | 0.20 | 1.83481 | 42.73 |
| 9 | 1.8758 | 1.26 | | |
| 10 | −6.9358 | 0.18 | 1.83481 | 42.73 |
| 11 | 7.1652 | 0.29 | | |
| 12 | 4.6115 | 1.11 | 1.75520 | 27.51 |
| 13 | −4.6554 | 0.02 | | |
| 14 | −7.1235 | 0.18 | 1.83481 | 42.73 |
| 15 | 5.6071 | 0.54 | 1.84666 | 23.78 |
| 16 | 14.6307 | DD[16] | | |
| 17 (stop) | ∞ | 1.23 | | |
| 18 | 5.6821 | 1.31 | 1.74950 | 35.04 |
| 19 | −2.7400 | 0.20 | 1.77250 | 49.60 |
| 20 | 5.4384 | 0.72 | | |
| 21 | 6.0460 | 0.40 | 1.85026 | 32.27 |
| 22 | 11.6973 | 0.02 | | |
| 23 | 8.9605 | 0.22 | 1.84666 | 23.78 |
| 24 | 3.2332 | 0.77 | 1.59522 | 67.74 |
| 25 | 16.9347 | DD[25] | | |
| 26 | 4.1758 | 0.72 | 1.61772 | 49.81 |
| 27 | −66.7876 | 0.20 | 1.84666 | 23.78 |
| 28 | 5.3276 | 0.22 | | |
| *29 | 4.8676 | 0.87 | 1.56867 | 58.50 |
| *30 | −5.4878 | DD[30] | | |
| 31 | ∞ | 5.95 | 1.51632 | 64.00 |
| 32 | ∞ | 0.00 | 1.51632 | 64.00 |
| 33 | ∞ | 0.63 | | |

TABLE 29

Example 10- Other Data

| | Wide angle | Intermediate | Telephoto |
|---|---|---|---|
| Zoom ratio | 1.0 | 6.2 | 22.1 |
| f | 1.00 | 6.25 | 22.10 |
| Bf | 5.04 | 6.32 | 4.76 |
| FNo. | 1.66 | 2.52 | 3.12 |
| 2ω[°] | 76.4 | 13.6 | 3.8 |
| DD[7] | 0.22 | 6.94 | 9.10 |
| DD[16] | 9.41 | 2.69 | 0.53 |
| DD[25] | 1.87 | 0.53 | 1.55 |
| DD[25]_inf | 1.87 | 0.59 | 2.16 |
| DD[30] | 0.49 | 1.83 | 0.81 |
| DD[30]_inf | 0.49 | 1.77 | 0.20 |

TABLE 30

Example 10- Aspheric Coefficient

| Surface No. | 29 | 30 |
|---|---|---|
| KA | −5.2869077E+00 | −2.5445616E+00 |
| A3 | −1.0844255E−05 | −3.2772618E−07 |

TABLE 30-continued

Example 10- Aspheric Coefficient

| Surface No. | 29 | 30 |
|---|---|---|
| A4 | 8.2759477E−04 | −1.5184073E−03 |
| A5 | 4.6745622E−03 | −2.5744063E−04 |
| A6 | −2.5983560E−03 | 2.6007514E−04 |
| A7 | −5.0763555E−03 | −2.6921390E−04 |
| A8 | 7.7142091E−03 | 1.4617047E−04 |
| A9 | −3.9933274E−03 | −4.4678779E−05 |
| A10 | −1.3910294E−06 | −4.6826550E−05 |
| A11 | 8.4310867E−04 | 3.7357299E−05 |
| A12 | −9.9767685E−06 | 2.0973727E−05 |
| A13 | −4.7563736E−04 | −4.1913875E−05 |
| A14 | 3.2918184E−04 | 2.4430891E−05 |
| A15 | −9.6845844E−05 | −6.6835189E−06 |
| A16 | 1.1049226E−05 | 7.3108800E−07 |

TABLE 31

Example 11- Lens Data

| Si | Ri | Di | ndj | vdj |
|---|---|---|---|---|
| 1 | −117.4514 | 0.55 | 1.80610 | 33.27 |
| 2 | 14.4104 | 2.95 | 1.49700 | 81.54 |
| 3 | −35.6536 | 0.02 | | |
| 4 | 18.8695 | 1.64 | 1.49700 | 81.54 |
| 5 | −152.9565 | 0.02 | | |
| 6 | 11.7433 | 1.35 | 1.80400 | 46.58 |
| 7 | 36.1158 | DD[7] | | |
| 8 | 10.5034 | 0.20 | 1.90366 | 31.32 |
| 9 | 1.9674 | 1.14 | | |
| 10 | −6.8023 | 0.18 | 1.88300 | 40.76 |
| 11 | 9.4588 | 0.02 | | |
| 12 | 4.2949 | 0.66 | 1.80518 | 25.42 |
| 13 | 81.7028 | 0.13 | | |
| 14 | −14.0765 | 0.18 | 1.83481 | 42.73 |
| 15 | 3.3906 | 0.93 | 1.84661 | 23.78 |
| 16 | −18.7327 | DD[16] | | |
| 17 (stop) | ∞ | 0.86 | | |
| 18 | −7.5959 | 0.74 | 1.51742 | 52.43 |
| 19 | −3.2831 | 0.20 | 1.83481 | 42.73 |
| 20 | −5.2589 | 0.53 | | |
| 21 | 12.1178 | 0.66 | 1.80518 | 25.42 |
| 22 | −13.0562 | 1.23 | | |
| 23 | 100.8410 | 0.66 | 1.49700 | 81.54 |
| 24 | −5.0073 | 0.22 | 1.84661 | 23.78 |
| 25 | 102.4188 | DD[25] | | |
| 26 | 15.1863 | 0.49 | 1.59522 | 67.74 |
| 27 | −40.8556 | 0.20 | 1.80518 | 25.42 |
| 28 | 9.4681 | 0.10 | | |
| *29 | 4.7985 | 0.88 | 1.56867 | 58.50 |
| *30 | −5.3500 | DD[30] | | |
| 31 | ∞ | 5.95 | 1.51632 | 64.00 |
| 32 | ∞ | 0.00 | 1.51632 | 64.00 |
| 33 | ∞ | 0.66 | | |

TABLE 32

Example 11- Other Data

| | Wide angle | Intermediate | Telephoto |
|---|---|---|---|
| Zoom ratio | 1.0 | 6.2 | 22.1 |
| f | 1.00 | 6.26 | 22.10 |
| Bf | 5.07 | 6.56 | 5.58 |
| FNo. | 1.68 | 2.52 | 3.10 |
| 2ω[°] | 77.4 | 13.6 | 3.8 |
| DD[7] | 0.22 | 8.61 | 11.32 |
| DD[16] | 11.29 | 2.90 | 0.19 |
| DD[25] | 2.27 | 0.72 | 1.16 |
| DD[25]_inf | 2.27 | 0.77 | 1.75 |
| DD[30] | 0.49 | 2.04 | 1.60 |
| DD[30]_inf | 0.49 | 1.99 | 1.01 |

TABLE 33

Example 11- Aspheric Coefficient

| Surface No. | 29 | 30 |
|---|---|---|
| KA | −2.3113295E−02 | −7.4477570E−01 |
| A3 | −7.6209072E−04 | 1.8396995E−03 |
| A4 | 4.7648836E−04 | −9.6662857E−03 |
| A5 | 3.4854903E−03 | 2.6185462E−02 |
| A6 | 3.0375556E−04 | −2.8464122E−02 |
| A7 | −1.4131534E−02 | 3.1399525E−02 |
| A8 | 1.3967312E−02 | −6.2947970E−02 |
| A9 | −7.4580519E−04 | 7.5217629E−02 |
| A10 | −2.6627225E−03 | −3.1732358E−02 |
| A11 | 1.1831419E−04 | −7.9343525E−03 |
| A12 | −1.0504004E−03 | 7.7023796E−03 |
| A13 | 1.5831751E−03 | 1.8359033E−03 |
| A14 | −4.3246553E−04 | −2.3066516E−03 |
| A15 | −1.0548829E−04 | 4.3854605E−04 |
| A16 | 4.4947219E−05 | 6.5983750E−06 |

Each of the lenses of the above-described Examples 1 to 11 consists of, in order from the object side, a positive first lens group G1, a negative second lens group G2, a positive third lens group G3, and a positive fourth lens group G4, and is configured such that, during magnification change from the wide-angle end to the telephoto end, the first lens group G1 and the third lens group G3 are fixed in the optical axis direction relative to the image plane, the second lens group G2 is moved toward the image side along the optical axis Z relative to the image plane, and the fourth lens group G4 is moved in the optical axis direction relative to the image plane to correct for changes of the image plane during magnification change or when the object distance is changed. Further, in each of the above-described Examples 1 to 11, the second lens group G2 includes an air space formed between a convex surface and a concave surface facing each other, and a cemented surface between a negative lens and a positive lens, and the third lens group G3 consists of, in order from the object side, a fixed front group G3$f$, and a rear group G3$r$ having a positive refractive power and being able to be shifted in directions intersecting with the optical axis Z to thereby shift the image on the image side. Further, the rear group G3$r$ is configured to be moved in directions perpendicular to the optical axis Z to correct for displacement of the image when the zoom lens shakes. The front group G3$f$ of the third lens group G3 has a positive refractive power in Examples 1 to 9, and has a negative refractive power in Examples 10 and 11.

Table 34 shows values corresponding to the condition expressions (1) to (4) with respect to the zoom lens according to each of Examples 1 to 11. As can be seen from Table 34, all the zoom lenses of Examples 1 to 11 satisfy the condition expressions (1) to (4).

TABLE 34

| No. Condition Expression | Example 1 | Example 2 | Example 3 | Example 4 |
|---|---|---|---|---|
| (1) 2.0 < \|f12w/fw\| < 3.0 | 2.66 | 2.67 | 2.59 | 2.66 |
| (2) 2.5 < \|(Rz1 + Rz2)/ (Rz1 − Rz2)\| < 5.0 | 2.65 | 2.63 | 3.06 | 2.88 |

TABLE 34-continued

| No. Condition Expression | | Example 5 | Example 6 | Example 7 | Example 8 |
|---|---|---|---|---|---|
| (3) | $8.6 < |Mz/fw| < 12.0$ | 9.37 | 9.44 | 9.17 | 9.45 |
| (4) | $0.8 < |f3r/f3| < 2.0$ | 1.63 | 1.69 | 1.01 | 1.00 |

| No. Condition Expression | | Example 5 | Example 6 | Example 7 | Example 8 |
|---|---|---|---|---|---|
| (1) | $2.0 < |f12w/fw| < 3.0$ | 2.65 | 2.65 | 2.64 | 2.64 |
| (2) | $2.5 < |(Rz1 + Rz2)/(Rz1 - Rz2)| < 5.0$ | 2.85 | 2.92 | 2.88 | 2.81 |
| (3) | $8.6 < |Mz/fw| < 12.0$ | 9.25 | 9.19 | 9.24 | 9.33 |
| (4) | $0.8 < |f3r/f3| < 2.0$ | 1.11 | 1.07 | 1.12 | 1.10 |

| No. Condition Expression | | Example 9 | Example 10 | Example 11 |
|---|---|---|---|---|
| (1) | $2.0 < |f12w/fw| < 3.0$ | 2.51 | 2.77 | 2.93 |
| (2) | $2.5 < |(Rz1 + Rz2)/(Rz1 - Rz2)| < 5.0$ | 2.92 | 4.61 4.77 | 2.66 |
| (3) | $8.6 < |Mz/fw| < 12.0$ | 9.77 | 8.88 | 11.10 |
| (4) | $0.8 < |f3r/f3| < 2.0$ | 1.38 | 0.87 | 1.03 |

Figure 12:
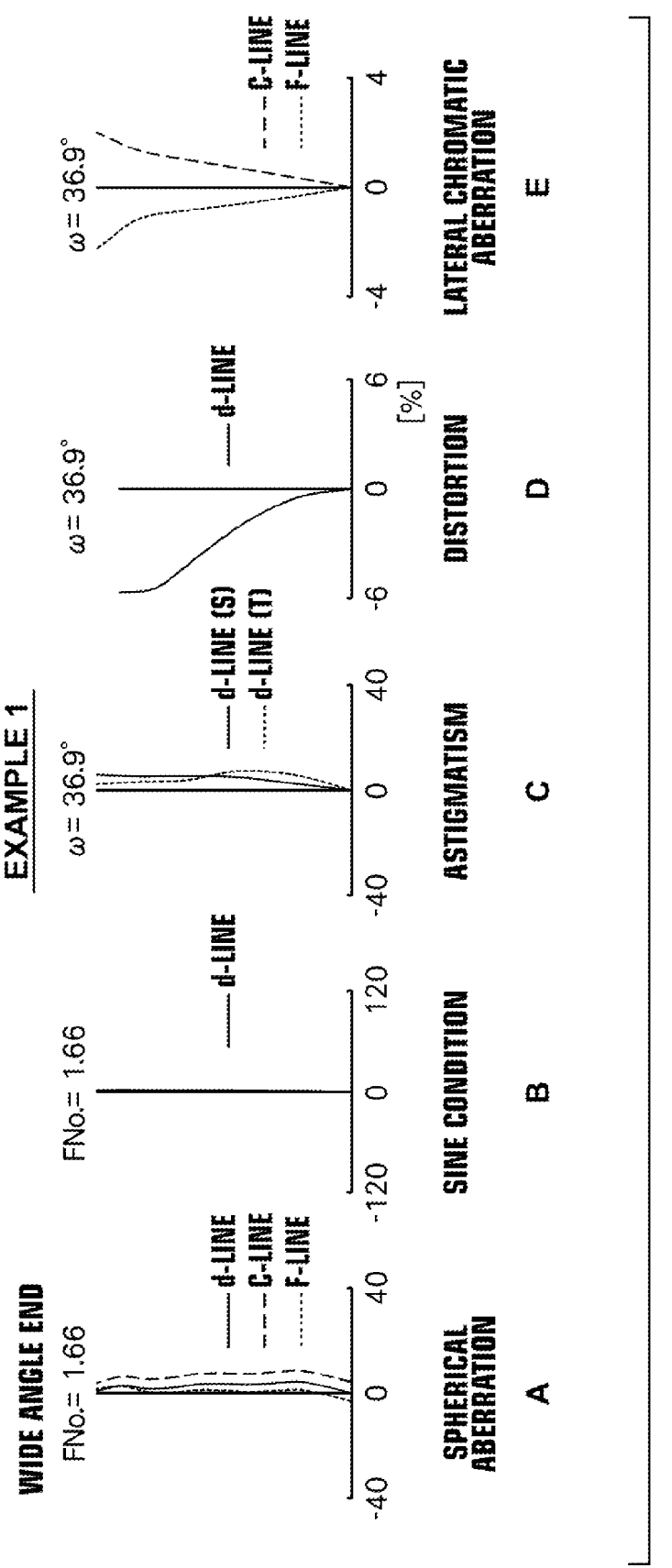
FIG. 12 shows aberration diagrams of the zoom lens according to Example 1 of the invention (wide-angle end)
Figure 13:
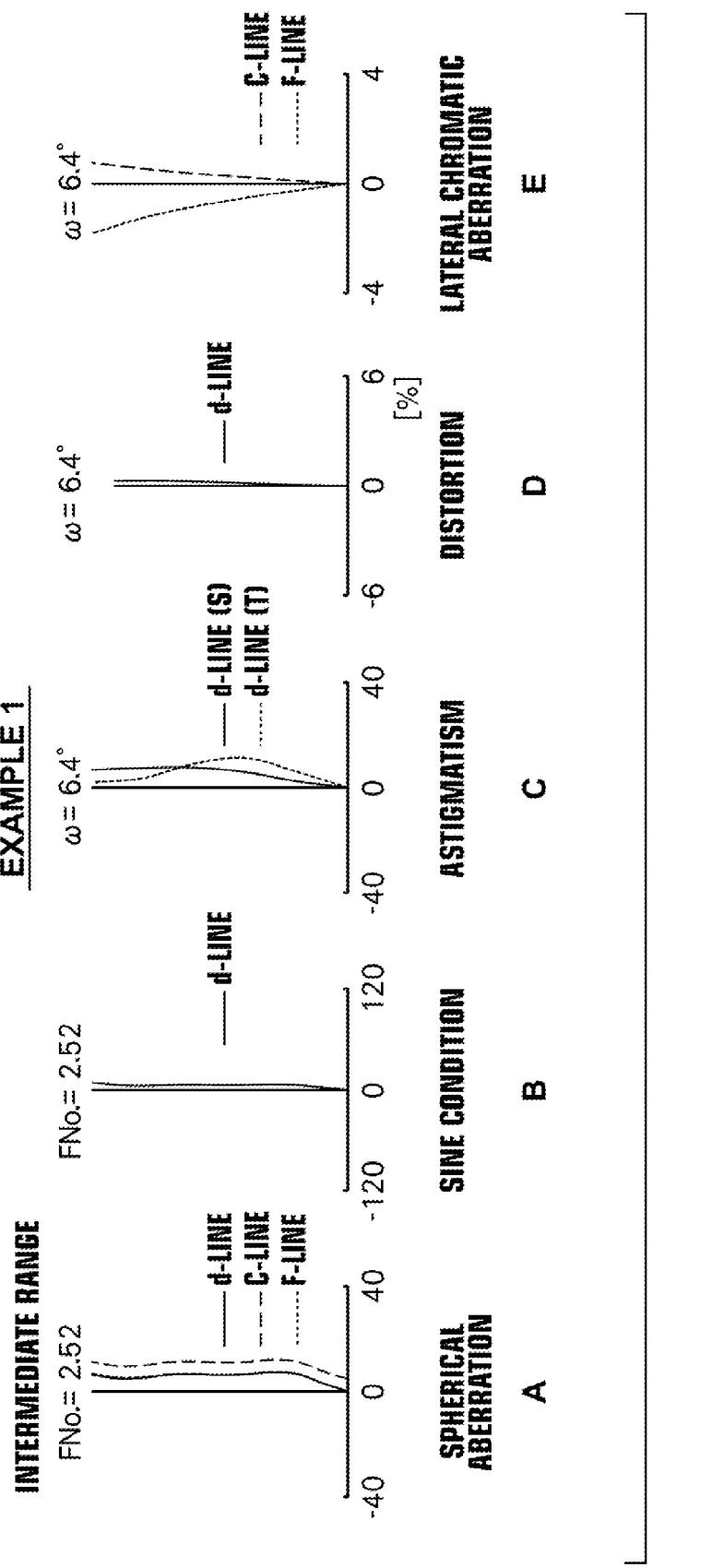
FIG. 13 shows aberration diagrams of the zoom lens according to Example 1 of the invention (intermediate range)
Figure 14:
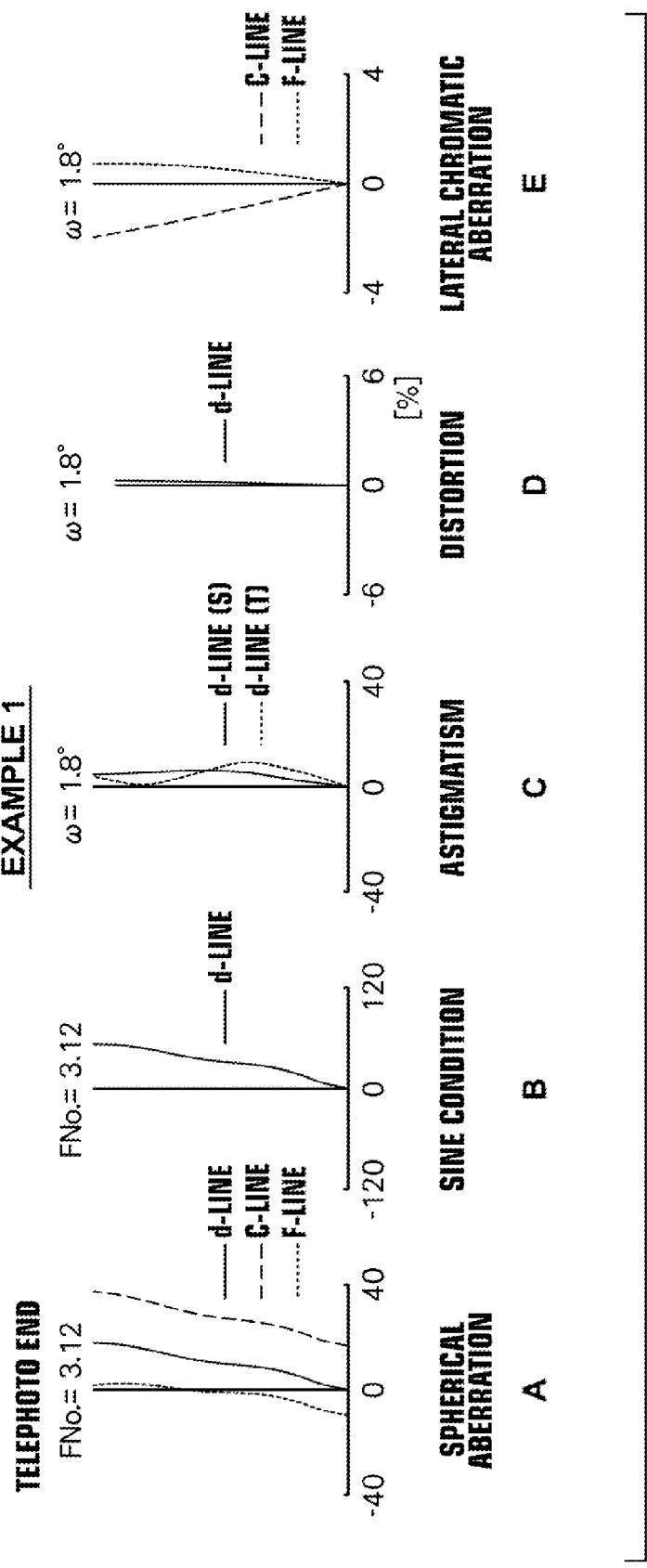
FIG. 14 shows aberration diagrams of the zoom lens according to Example 1 of the invention (telephoto end)
Figure 15:
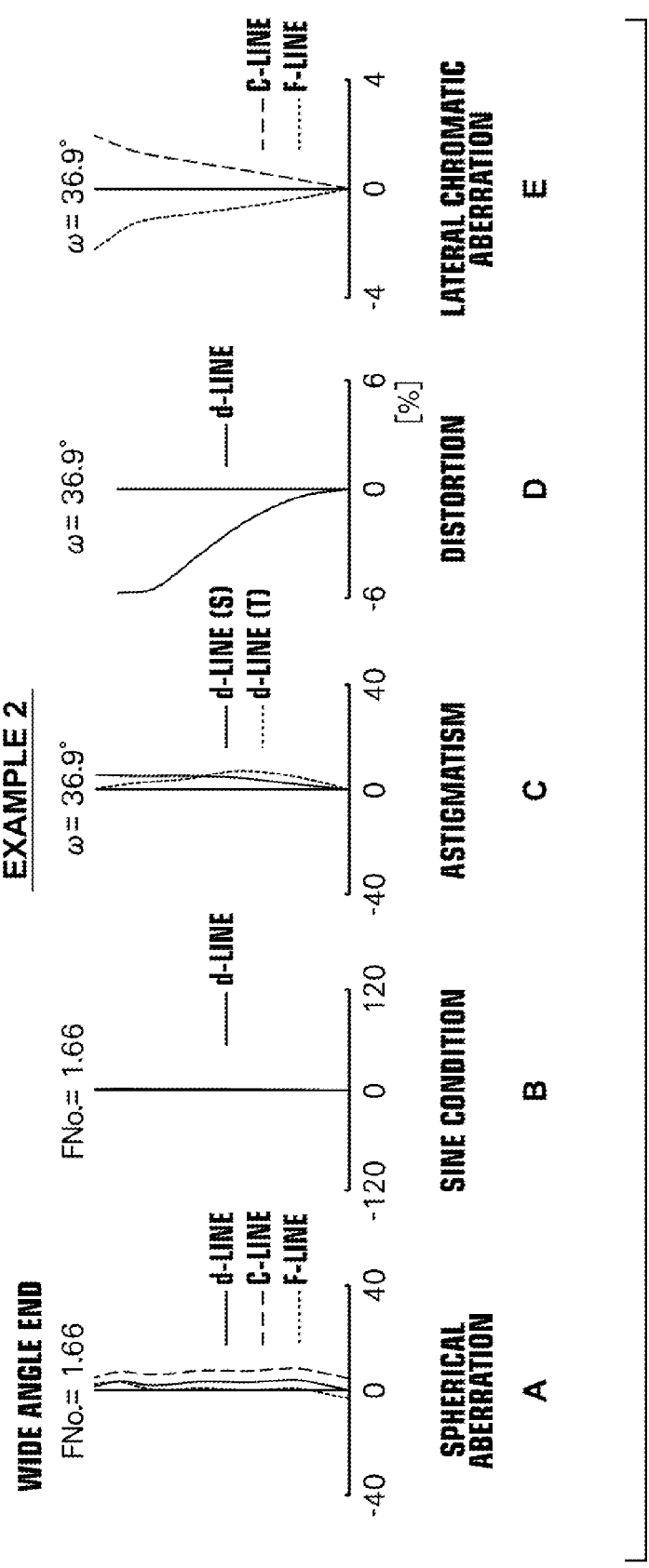
FIG. 15 shows aberration diagrams of the zoom lens according to Example 2 of the invention (wide-angle end)
Figure 16:
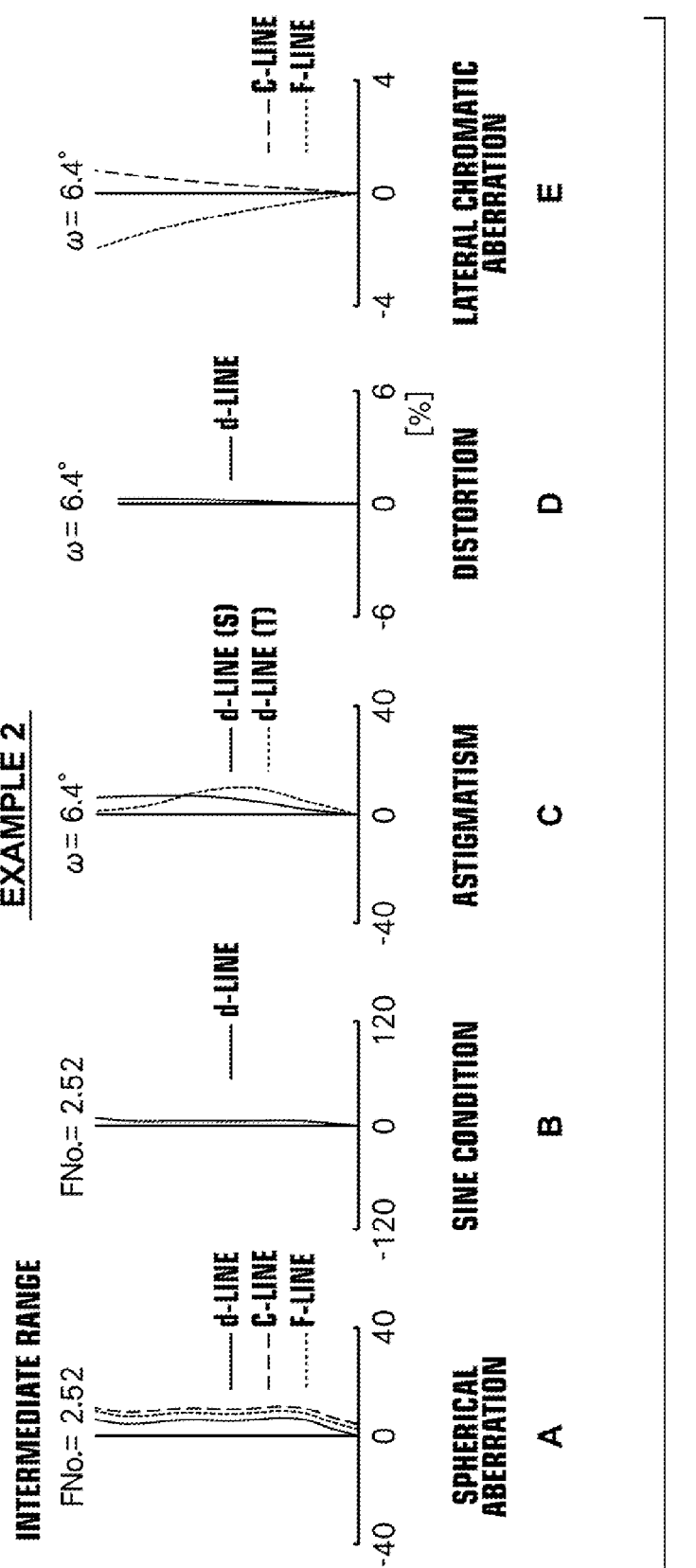
FIG. 16 shows aberration diagrams of the zoom lens according to Example 2 of the invention (intermediate range)
Figure 17:
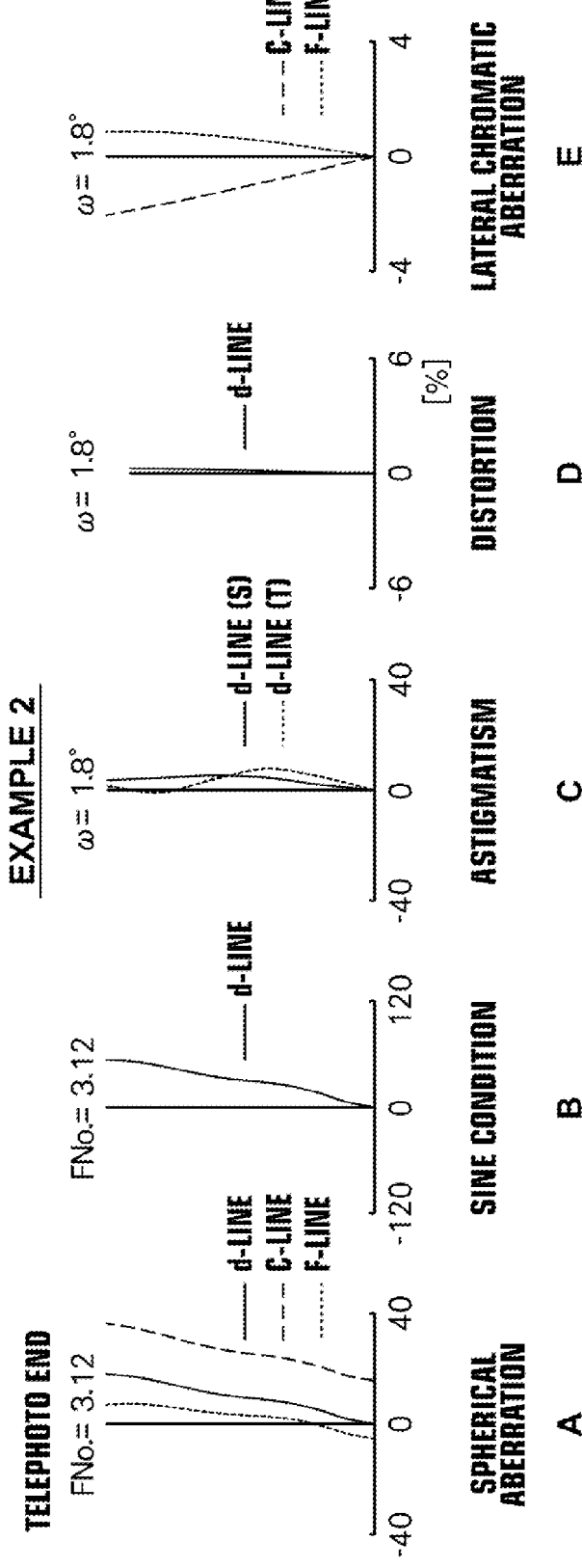
FIG. 17 shows aberration diagrams of the zoom lens according to Example 2 of the invention (telephoto end)
Figure 18:
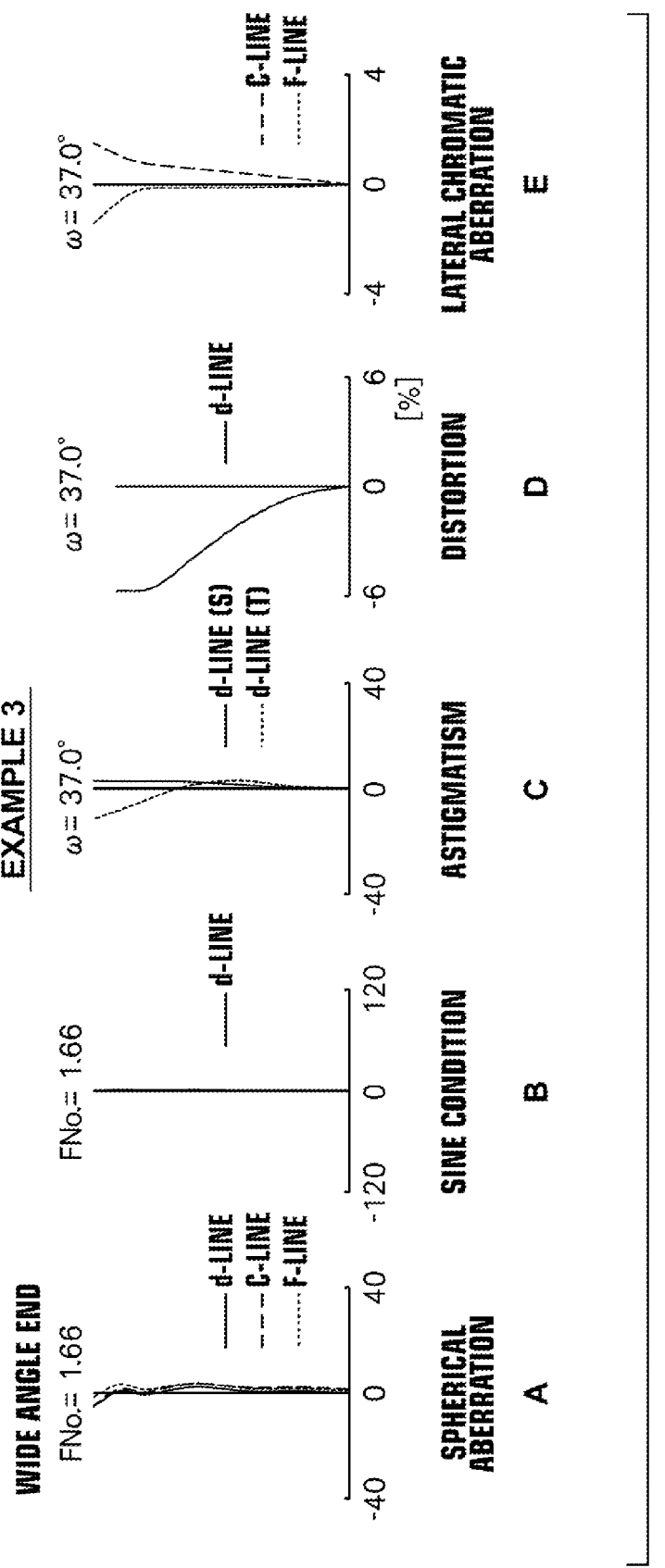
FIG. 18 shows aberration diagrams of the zoom lens according to Example 3 of the invention (wide-angle end)
Figure 19:
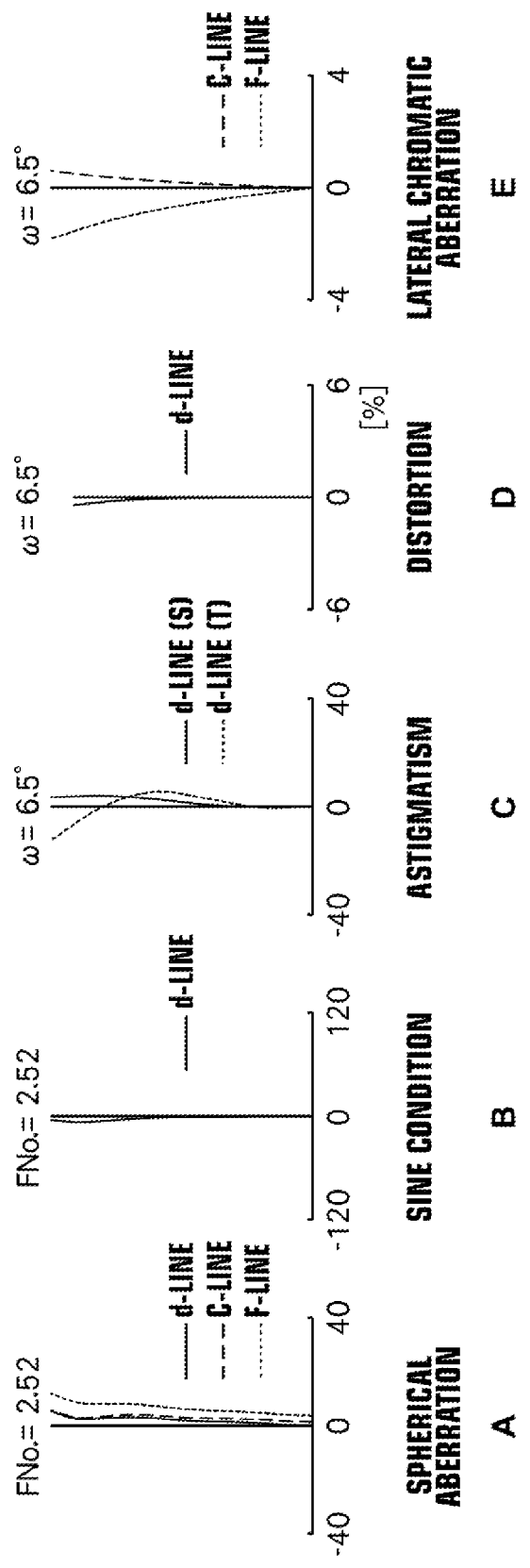
FIG. 19 shows aberration diagrams of the zoom lens according to Example 3 of the invention (intermediate range)
Figure 20:
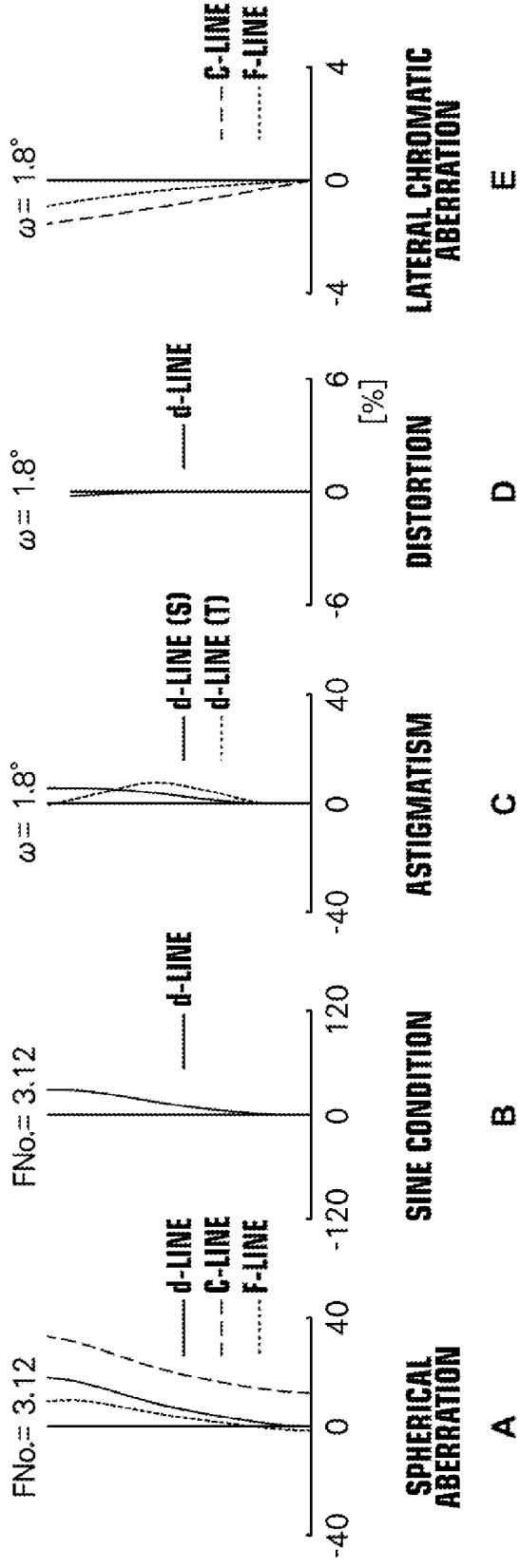
FIG. 20 shows aberration diagrams of the zoom lens according to Example 3 of the invention (telephoto end)
Figure 21:
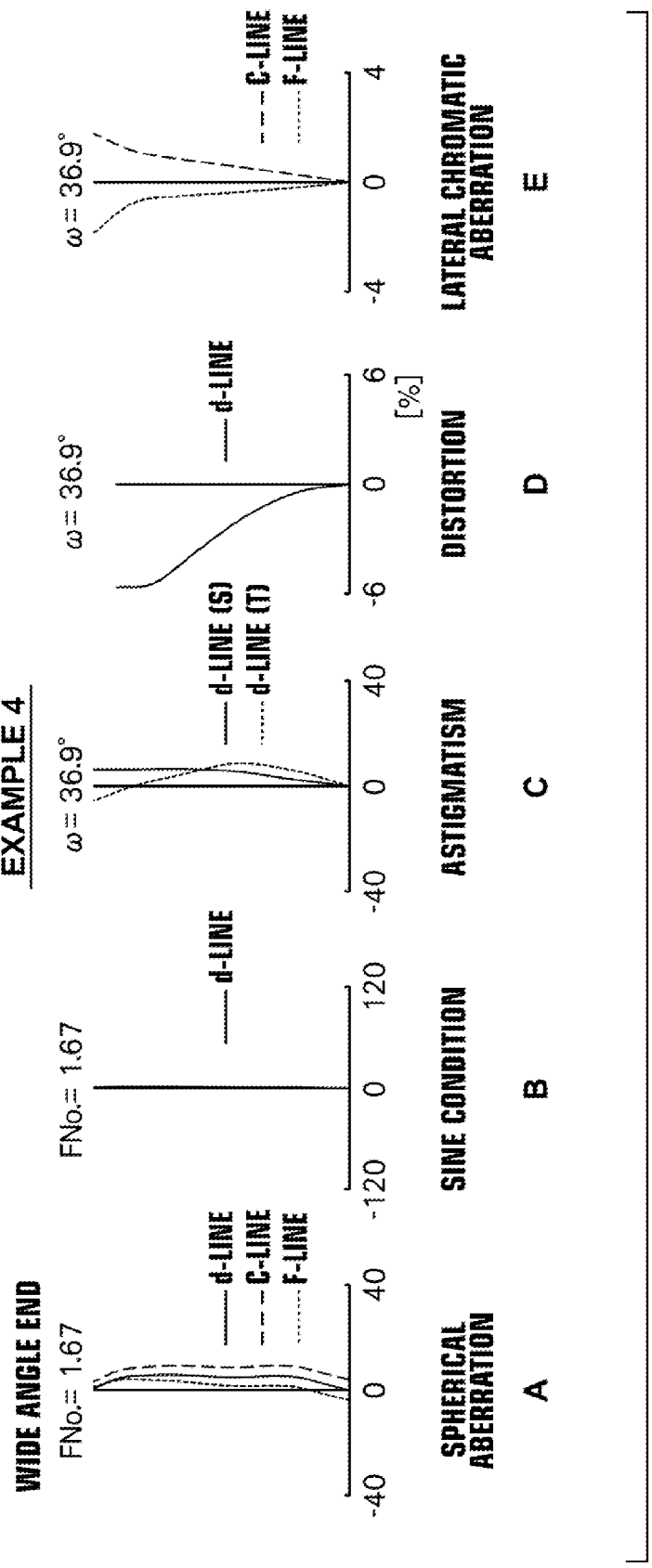
FIG. 21 shows aberration diagrams of the zoom lens according to Example 4 of the invention (wide-angle end)
Figure 22:
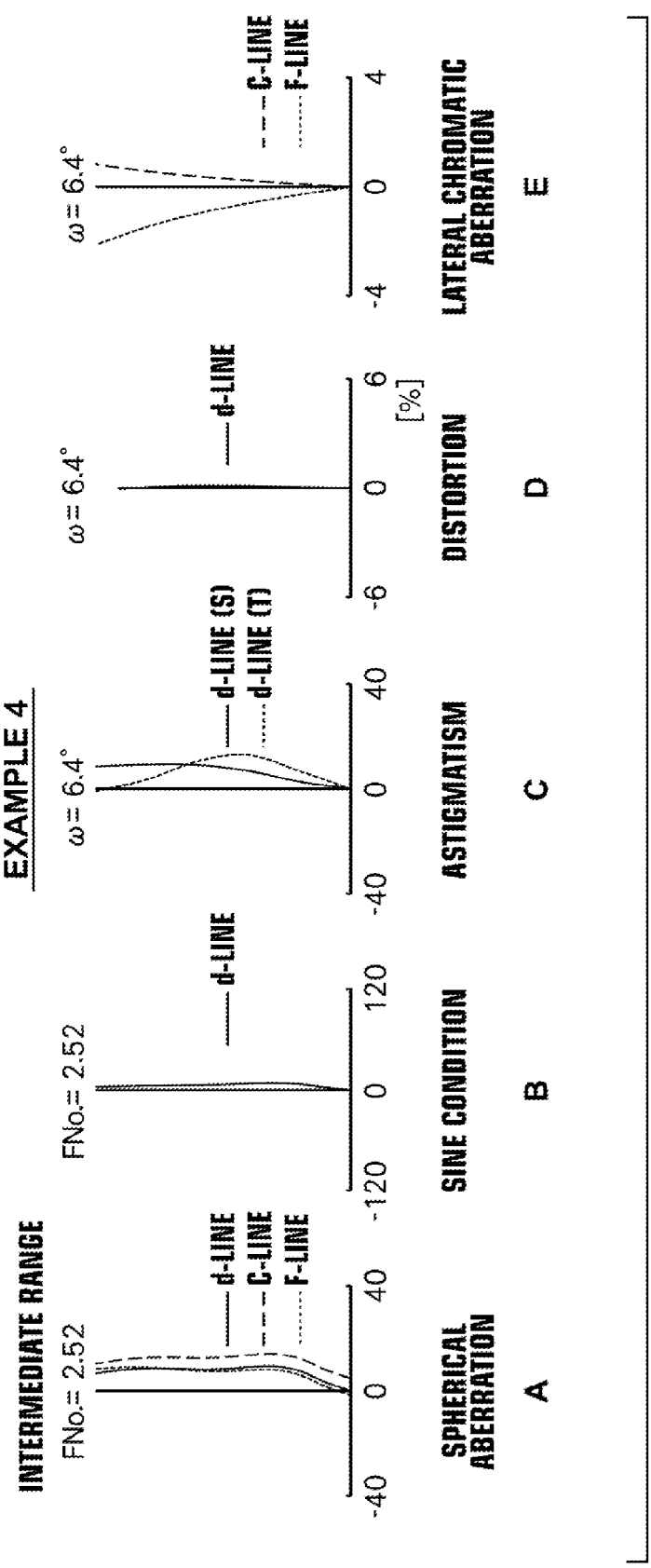
FIG. 22 shows aberration diagrams of the zoom lens according to Example 4 of the invention (intermediate range)
Figure 23:
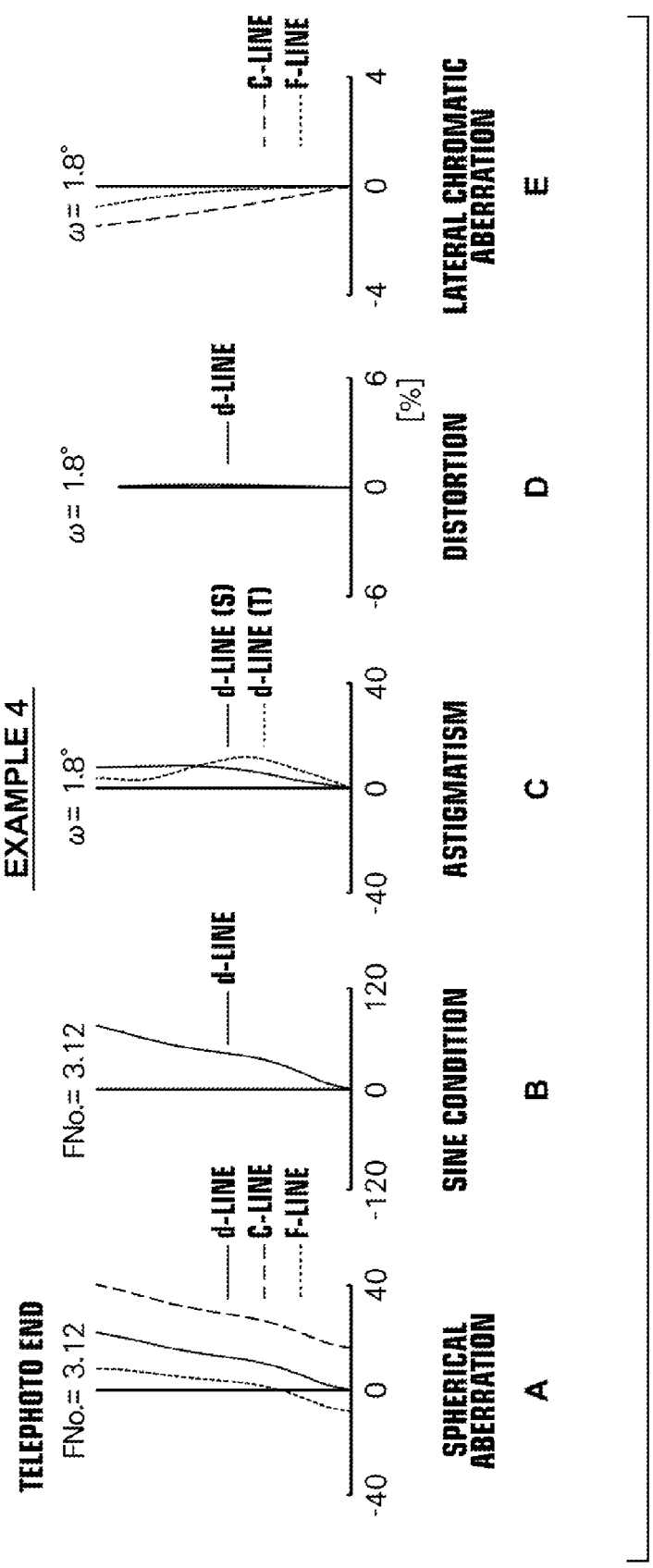
FIG. 23 shows aberration diagrams of the zoom lens according to Example 4 of the invention (telephoto end)
Figure 24:
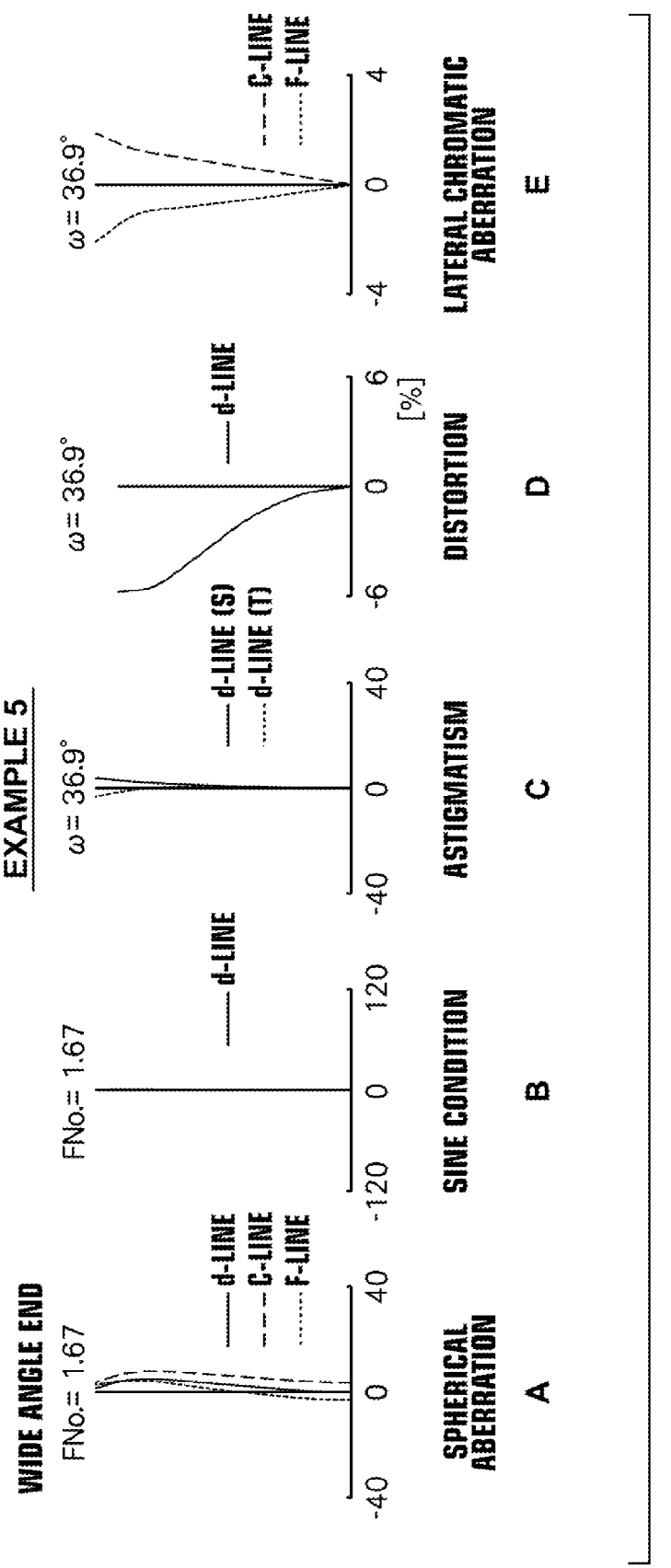
FIG. 24 shows aberration diagrams of the zoom lens according to Example 5 of the invention (wide-angle end)
Figure 25:
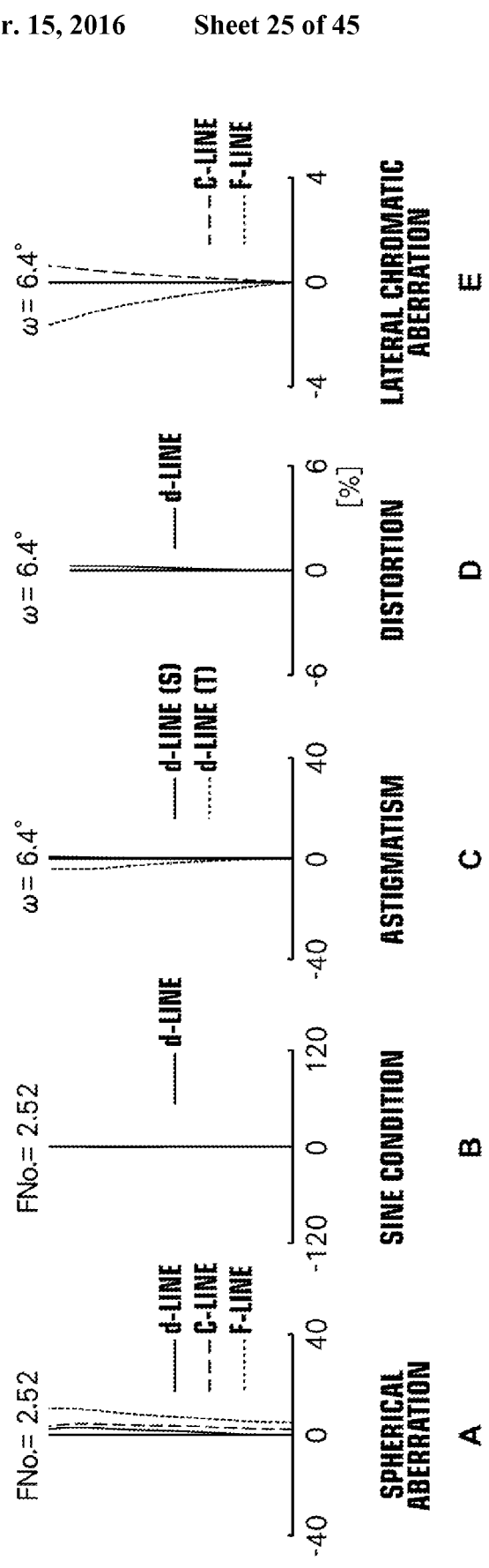
FIG. 25 shows aberration diagrams of the zoom lens according to Example 5 of the invention (intermediate range)
Figure 26:
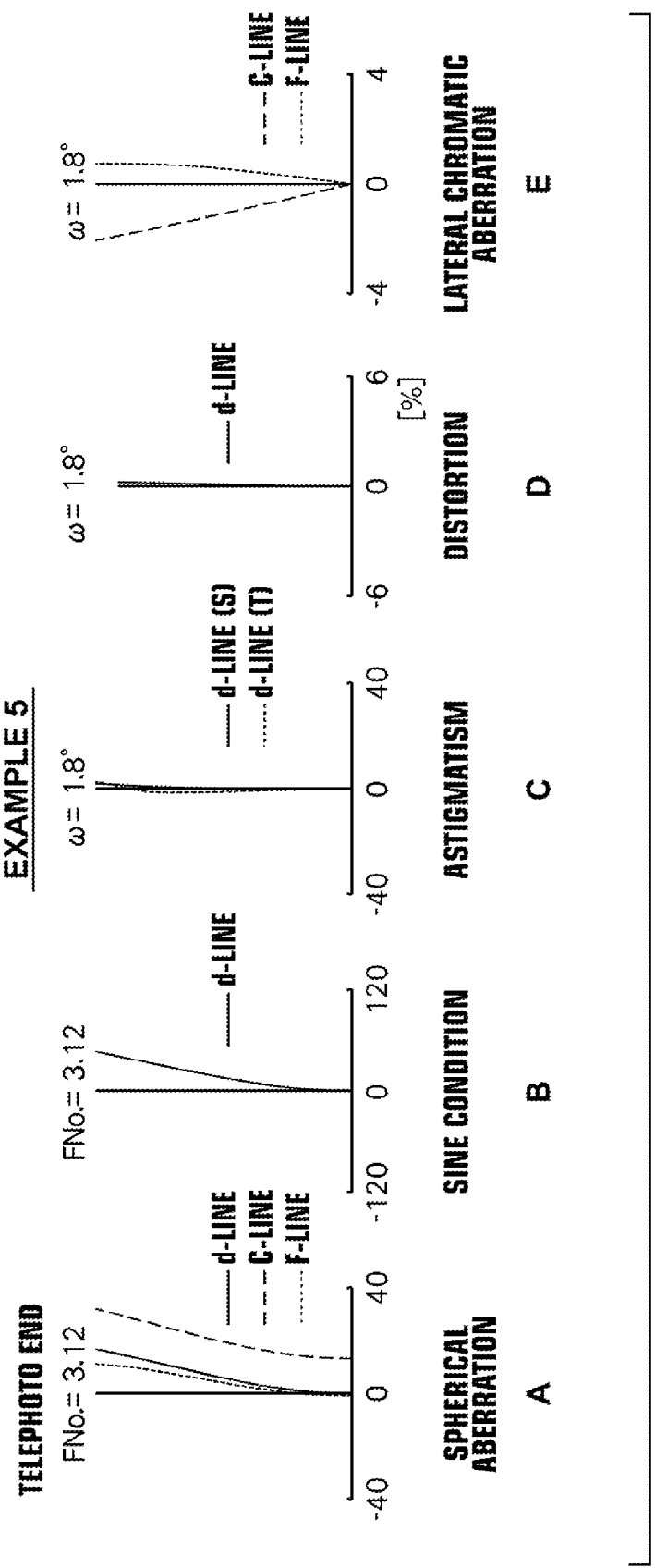
FIG. 26 shows aberration diagrams of the zoom lens according to Example 5 of the invention (telephoto end)
Figure 27:
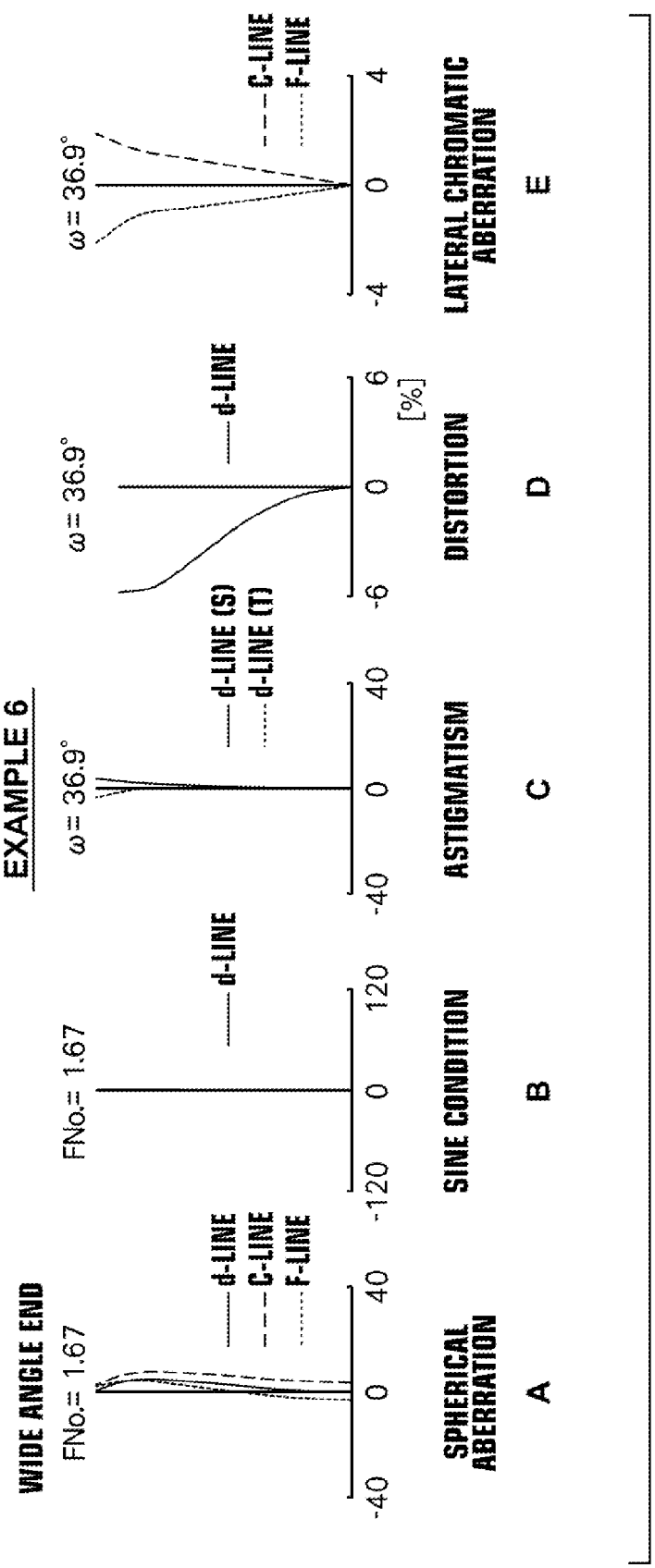
FIG. 27 shows aberration diagrams of the zoom lens according to Example 6 of the invention (wide-angle end)
Figure 28:
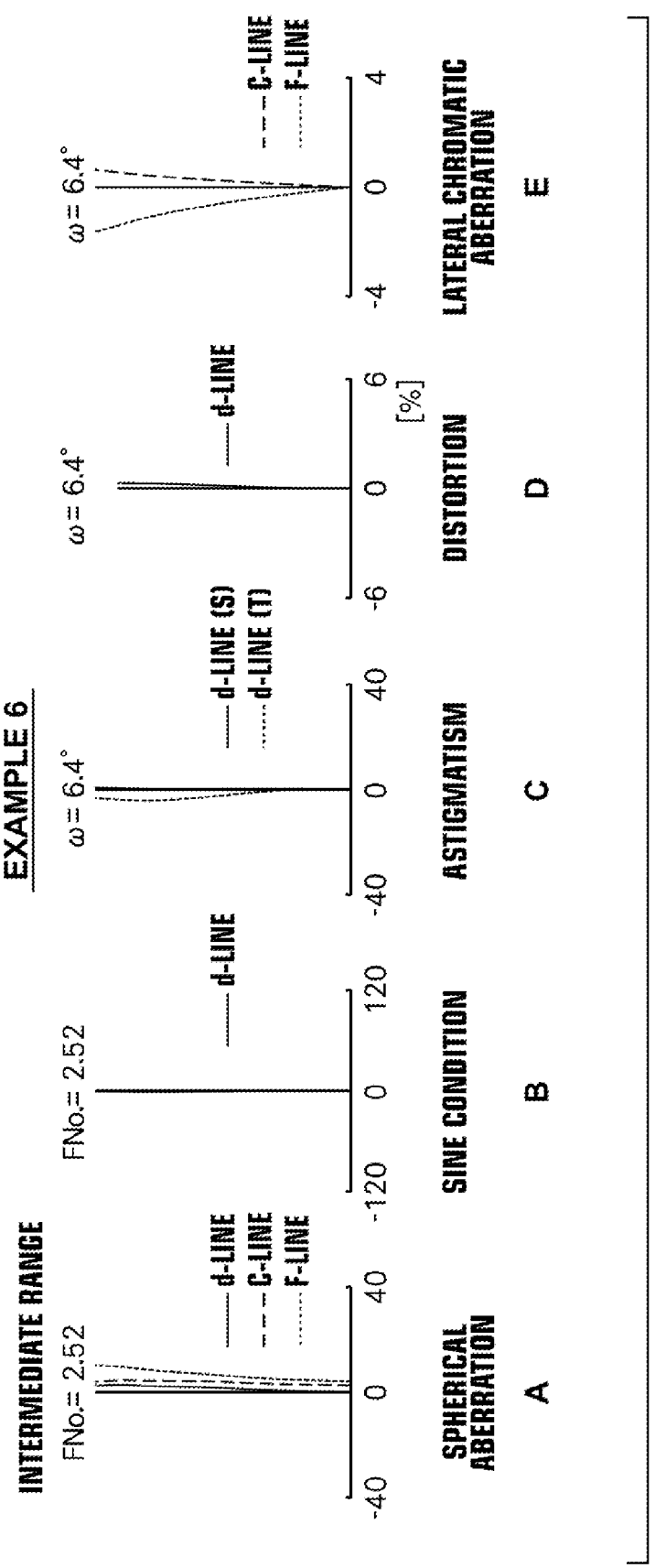
FIG. 28 shows aberration diagrams of the zoom lens according to Example 6 of the invention (intermediate range)
Figure 29:
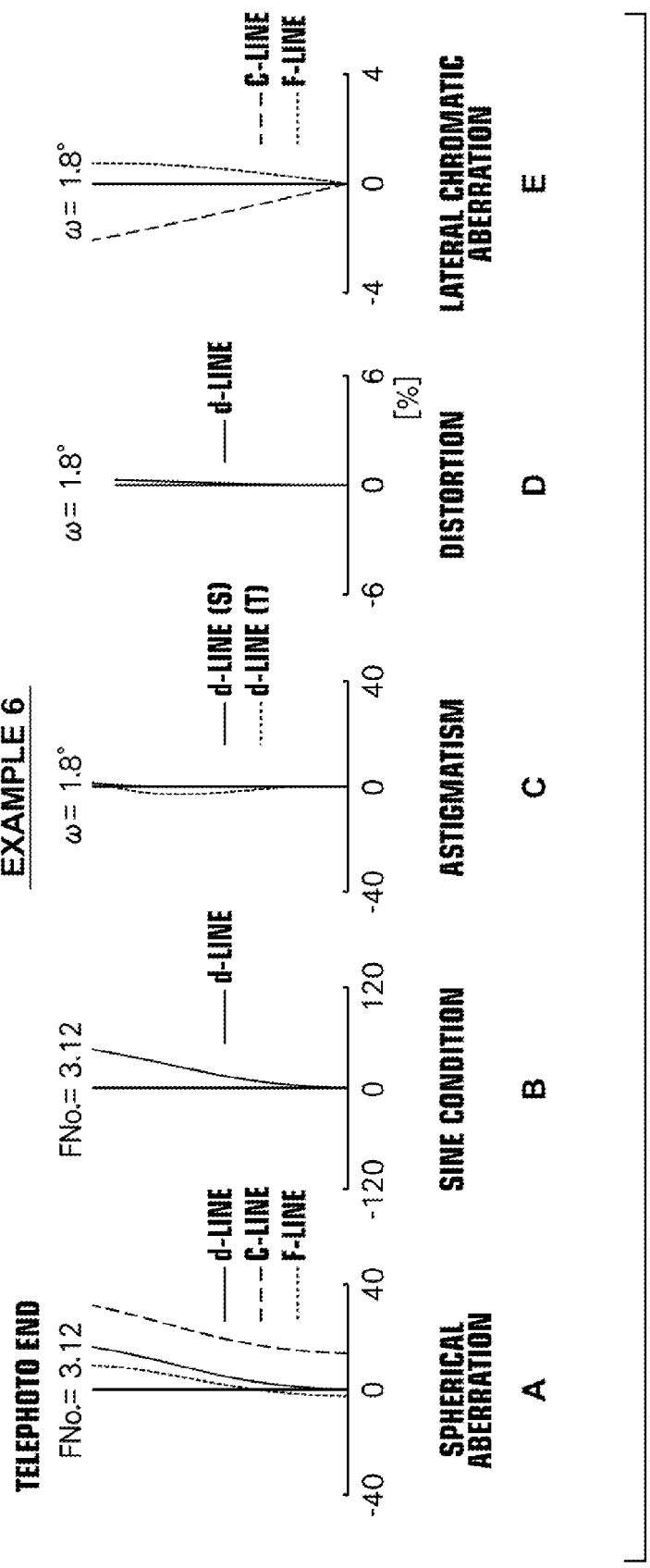
FIG. 29 shows aberration diagrams of the zoom lens according to Example 6 of the invention (telephoto end)
Figure 30:
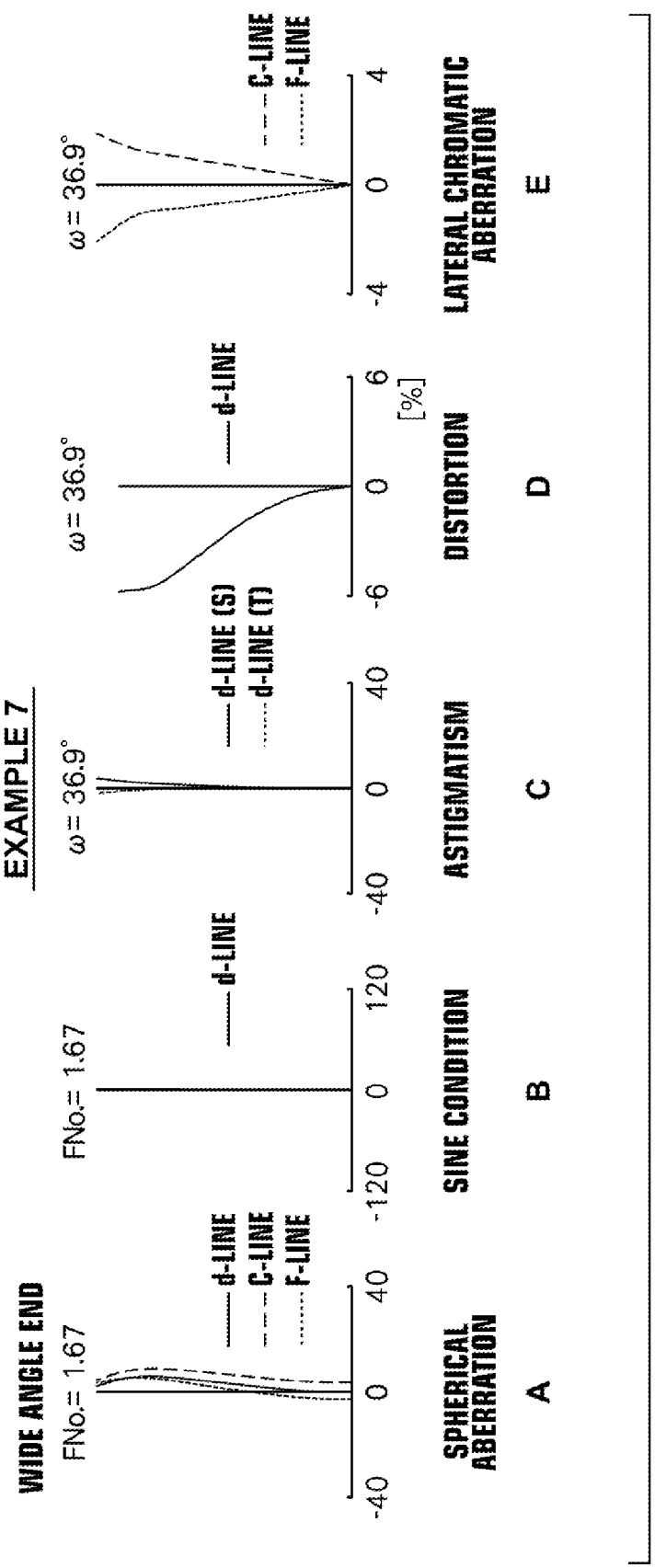
FIG. 30 shows aberration diagrams of the zoom lens according to Example 7 of the invention (wide-angle end)
Figure 31:
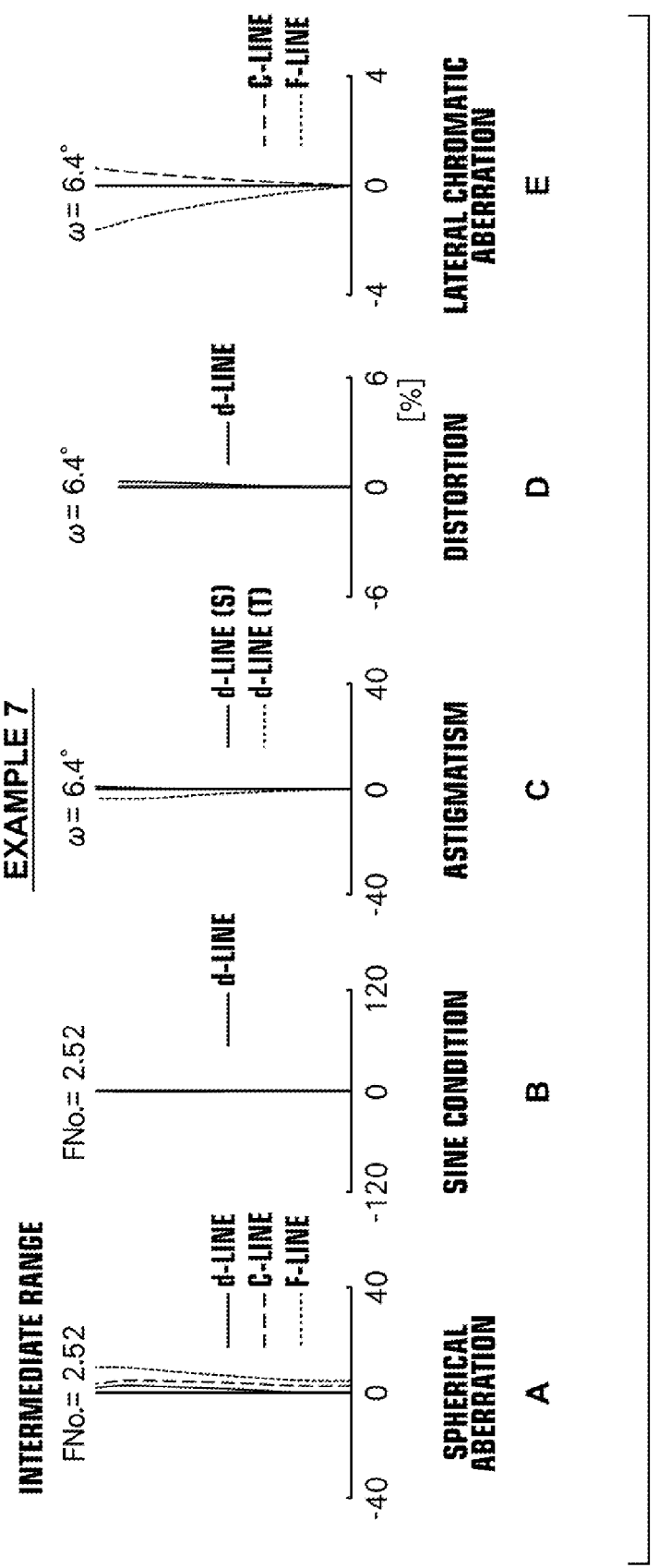
FIG. 31 shows aberration diagrams of the zoom lens according to Example 7 of the invention (intermediate range)
Figure 32:
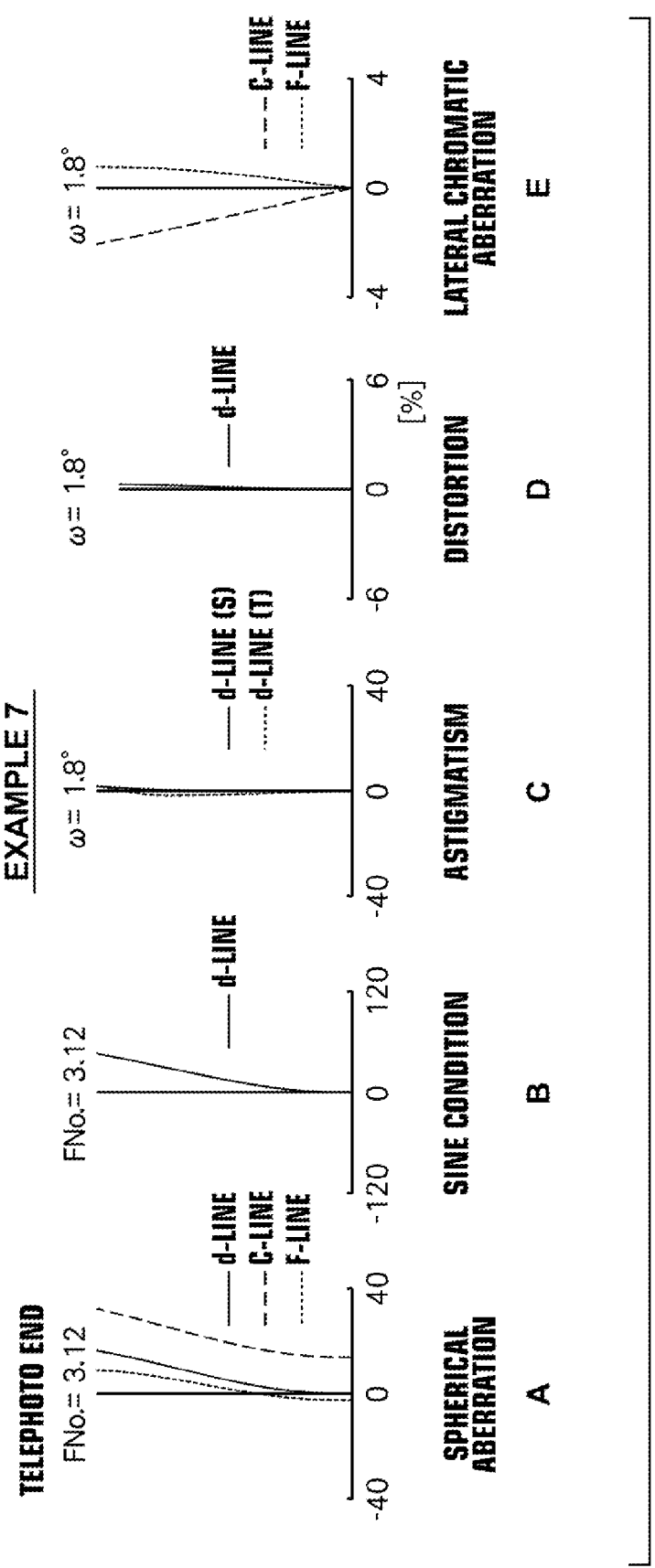
FIG. 32 shows aberration diagrams of the zoom lens according to Example 7 of the invention (telephoto end)
Figure 33:
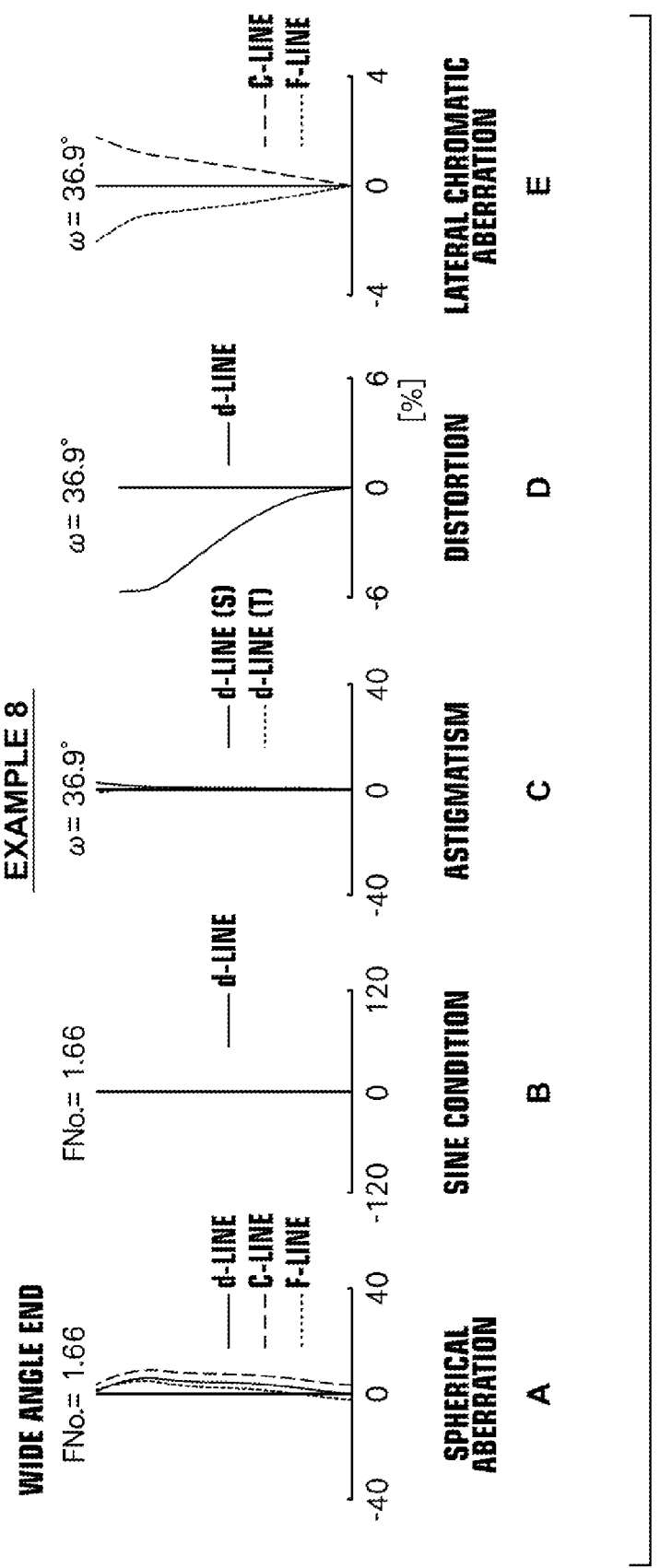
FIG. 33 shows aberration diagrams of the zoom lens according to Example 8 of the invention (wide-angle end)
Figure 34:
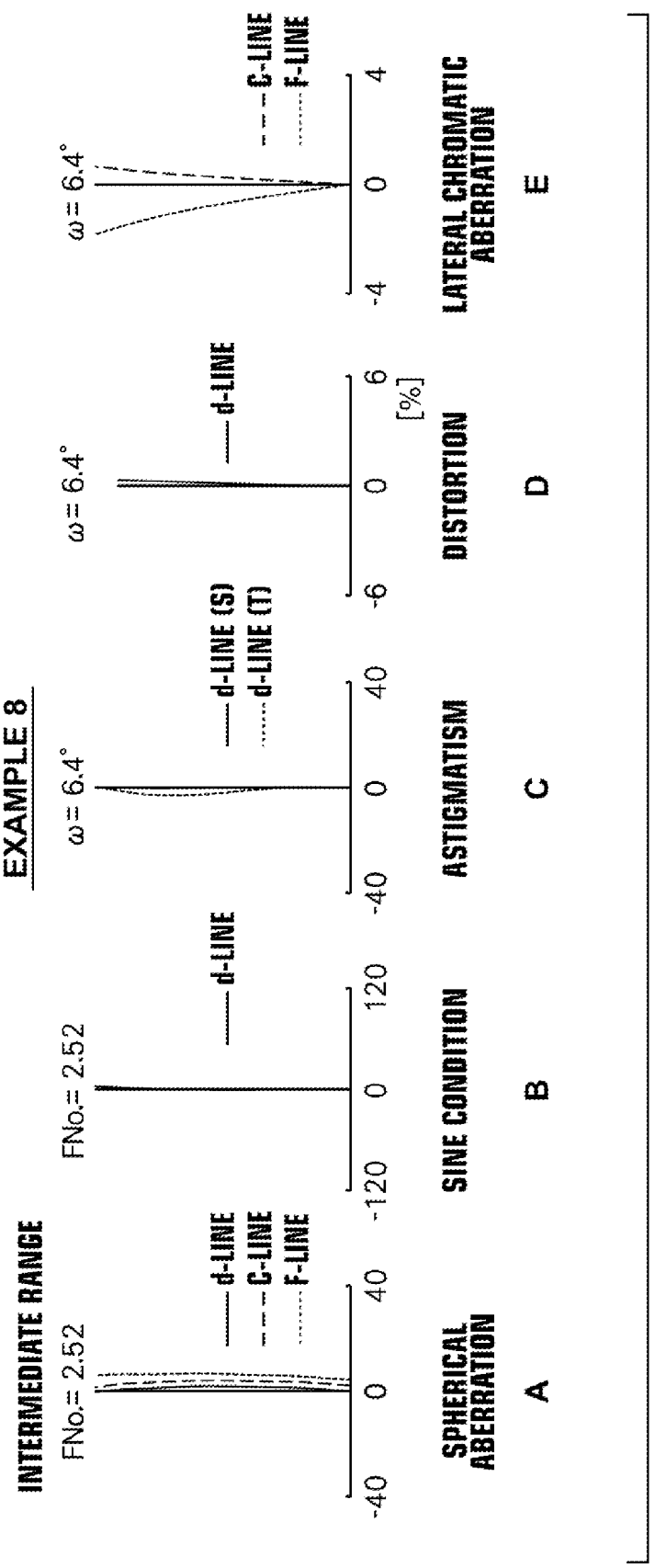
FIG. 34 shows aberration diagrams of the zoom lens according to Example 8 of the invention (intermediate range)
Figure 35:
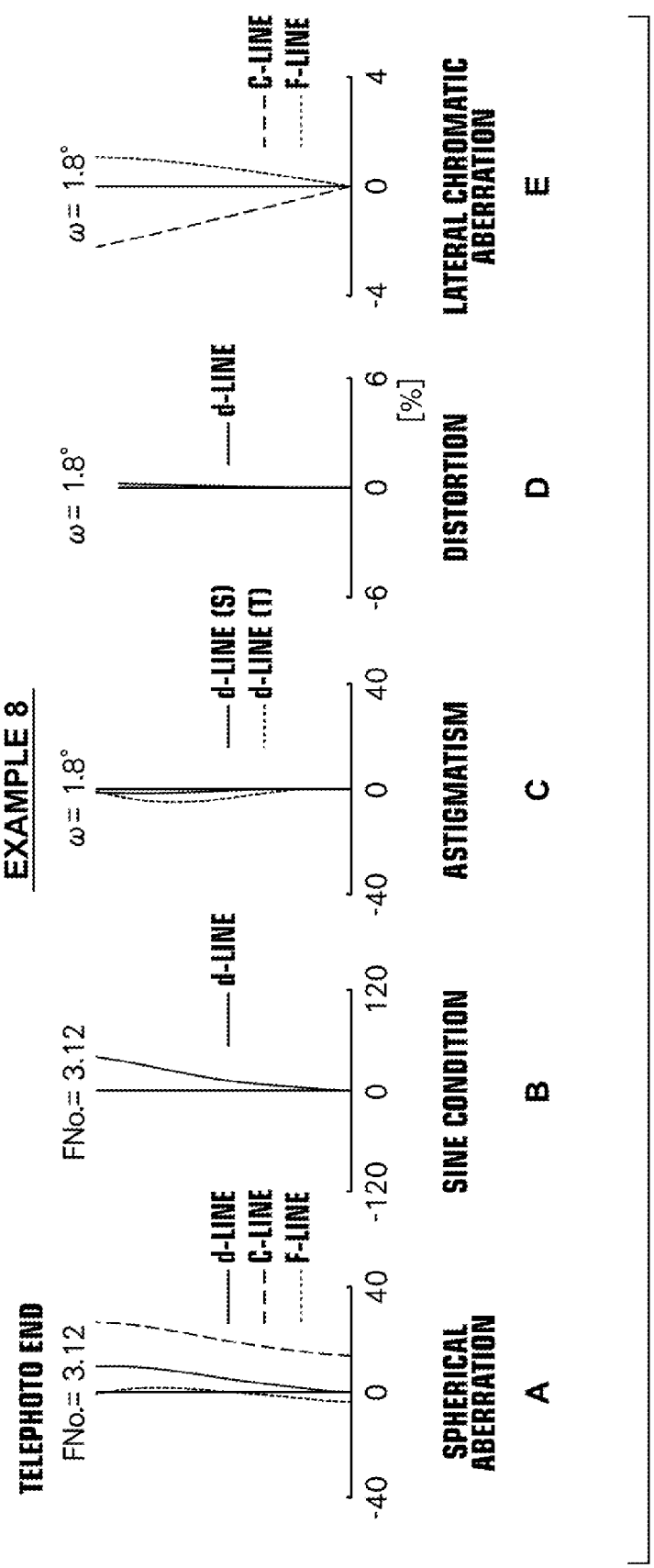
FIG. 35 shows aberration diagrams of the zoom lens according to Example 8 of the invention (telephoto end)
Figure 36:
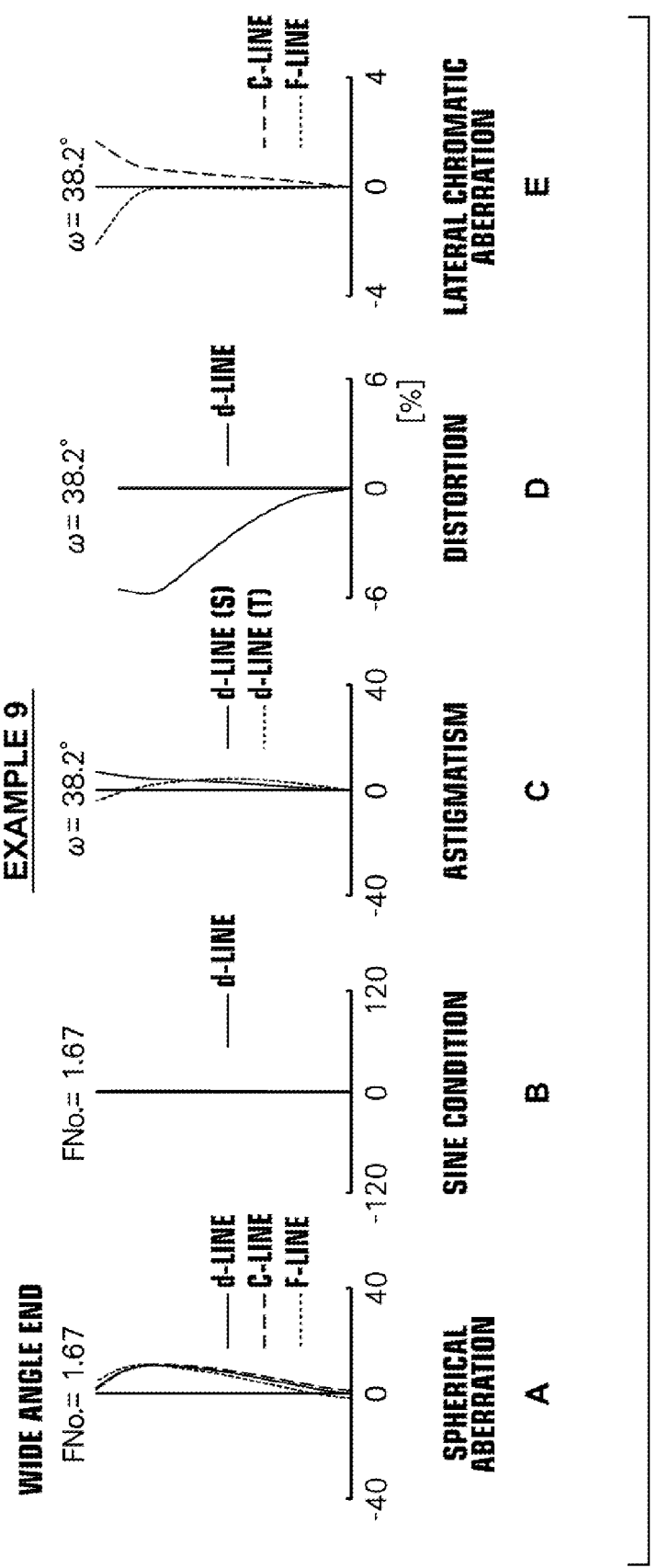
FIG. 36 shows aberration diagrams of the zoom lens according to Example 9 of the invention (wide-angle end)
Figure 37:
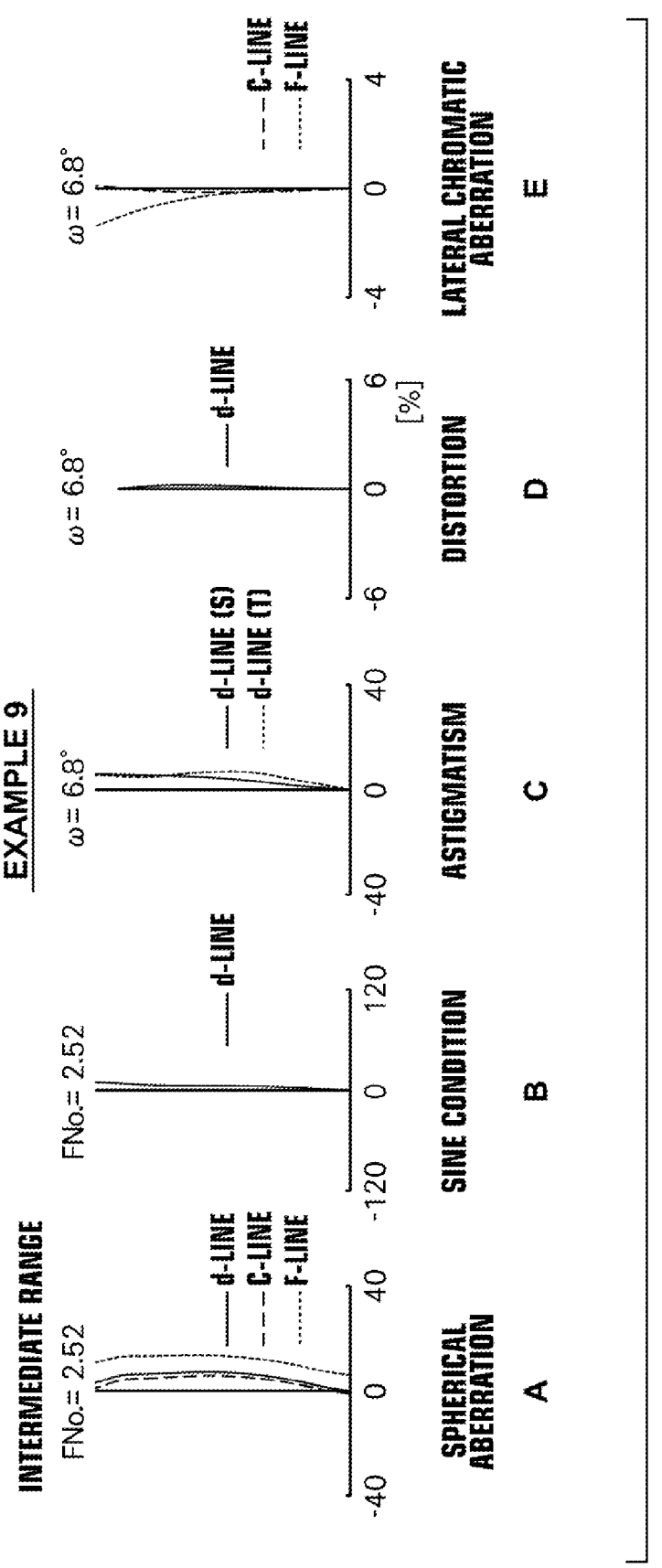
FIG. 37 shows aberration diagrams of the zoom lens according to Example 9 of the invention (intermediate range)
Figure 38:
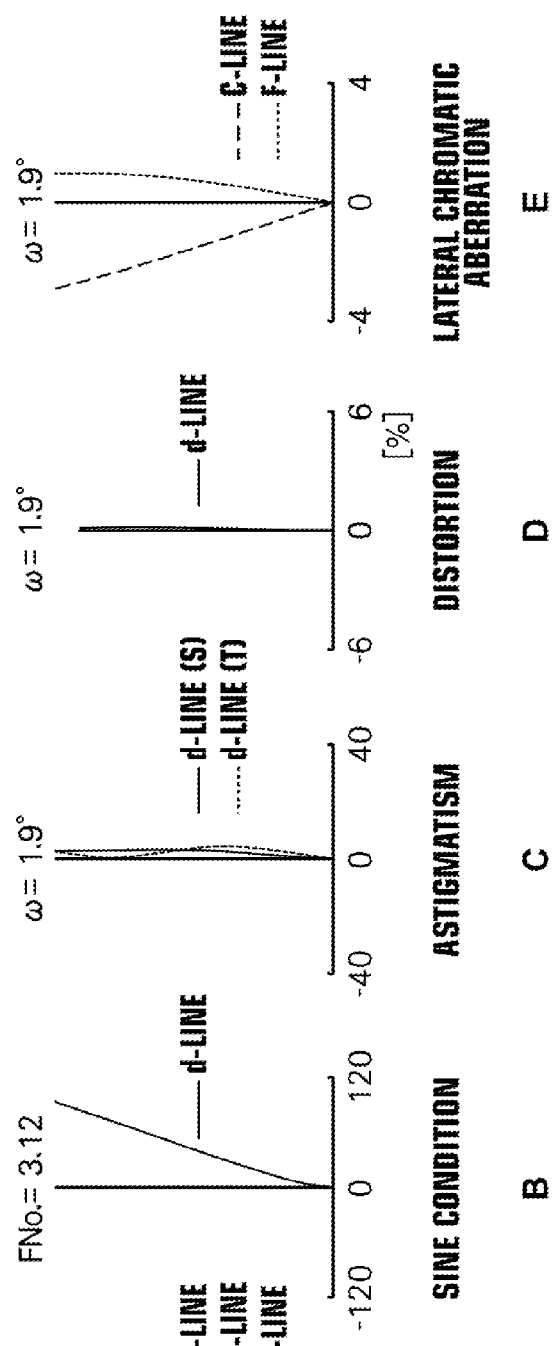
FIG. 38 shows aberration diagrams of the zoom lens according to Example 9 of the invention (telephoto end)
Figure 39:
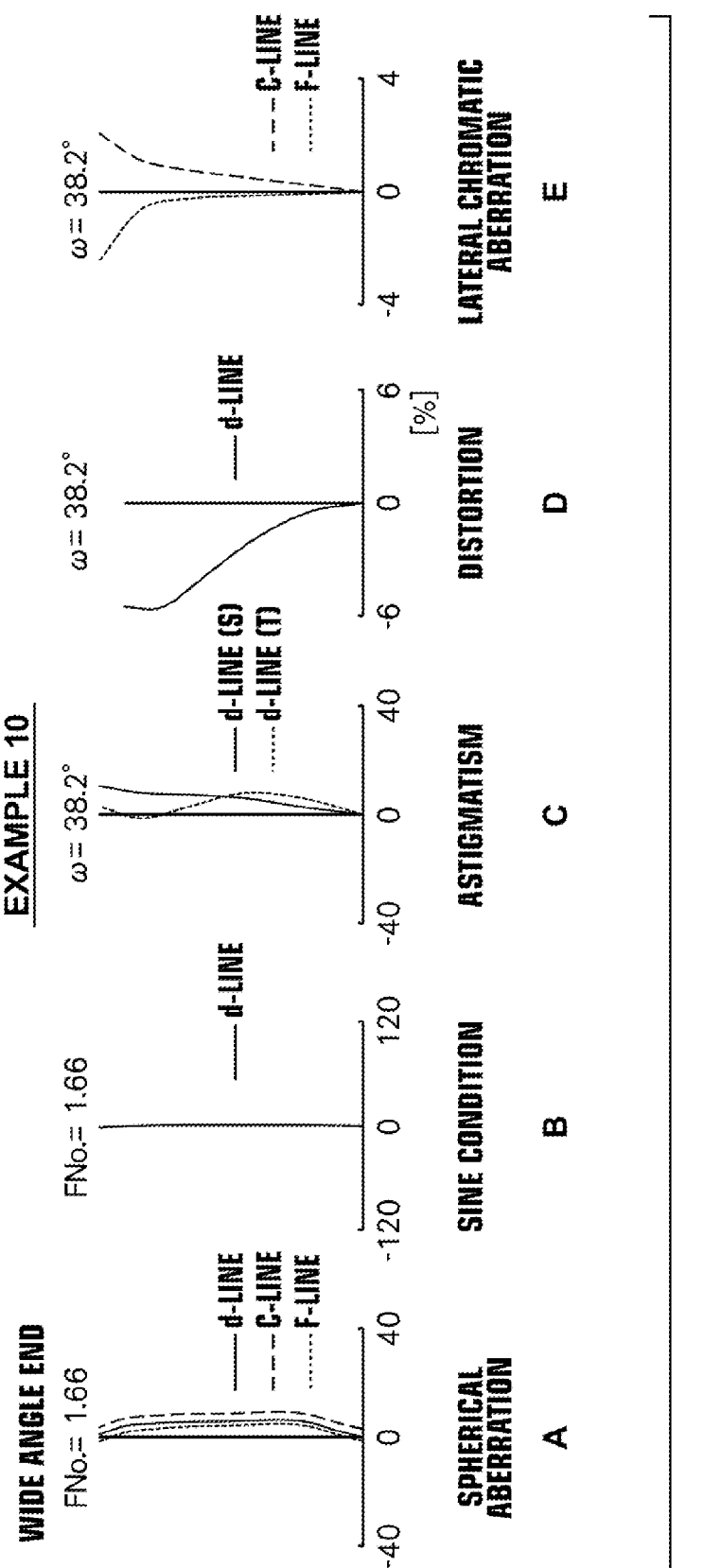
FIG. 39 shows aberration diagrams of the zoom lens according to Example 10 of the invention (wide-angle end)
Figure 40:
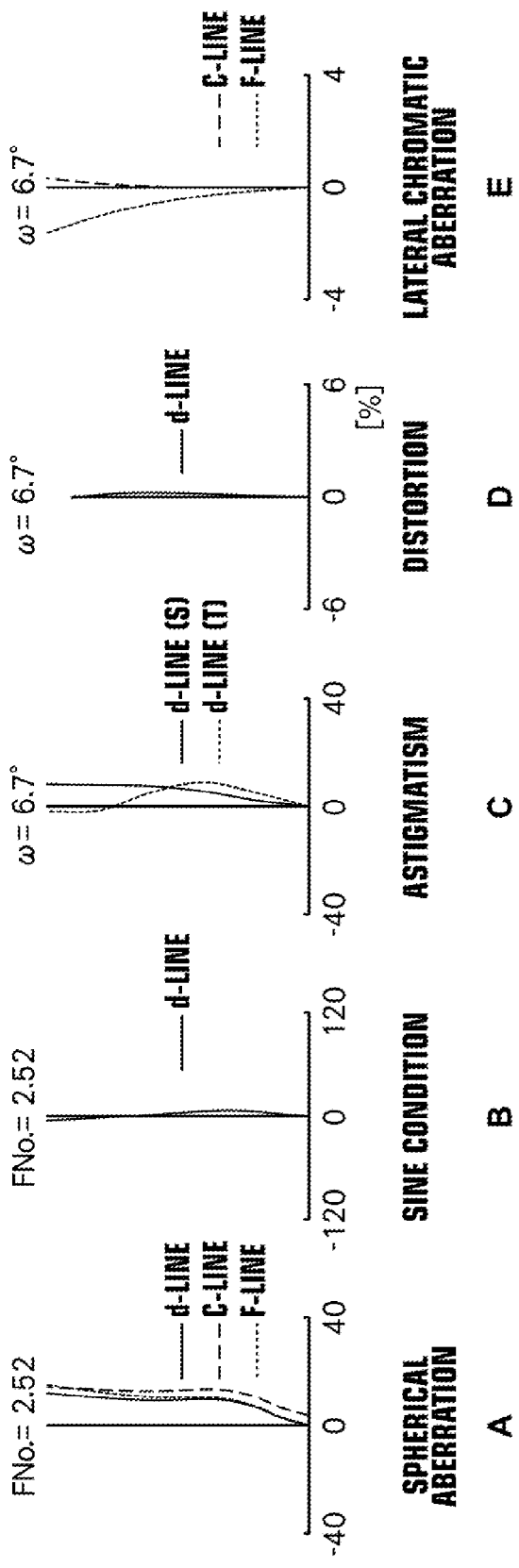
FIG. 40 shows aberration diagrams of the zoom lens according to Example 10 of the invention (intermediate range)
Figure 41:
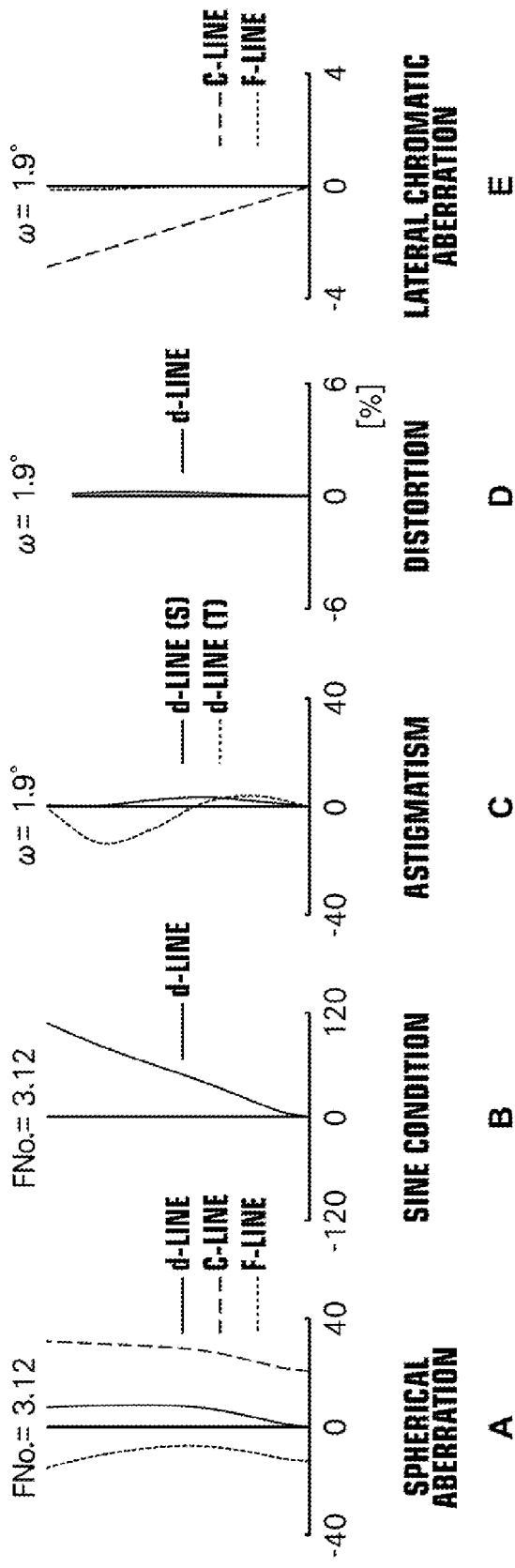
FIG. 41 shows aberration diagrams of the zoom lens according to Example 10 of the invention (telephoto end)
Figure 42:
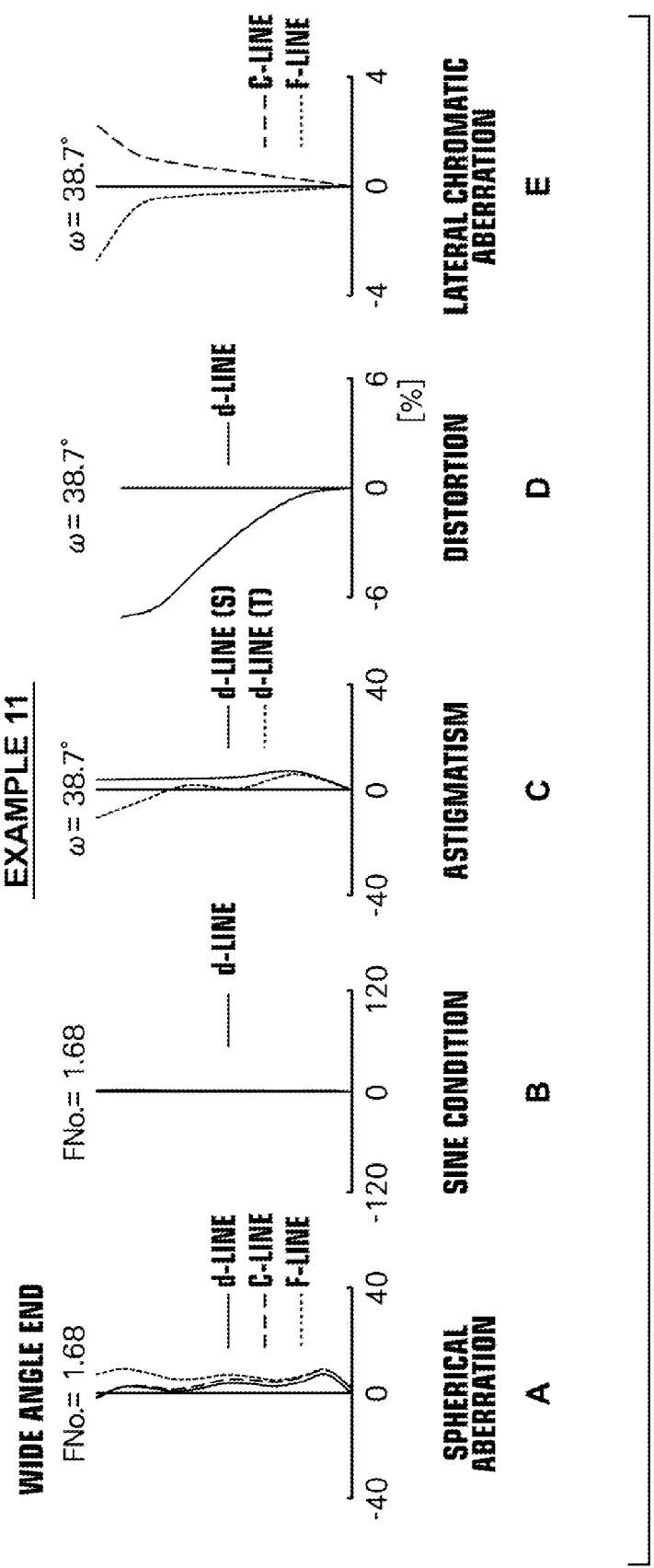
FIG. 42 shows aberration diagrams of the zoom lens according to Example 11 of the invention (wide-angle end)
Figure 43:
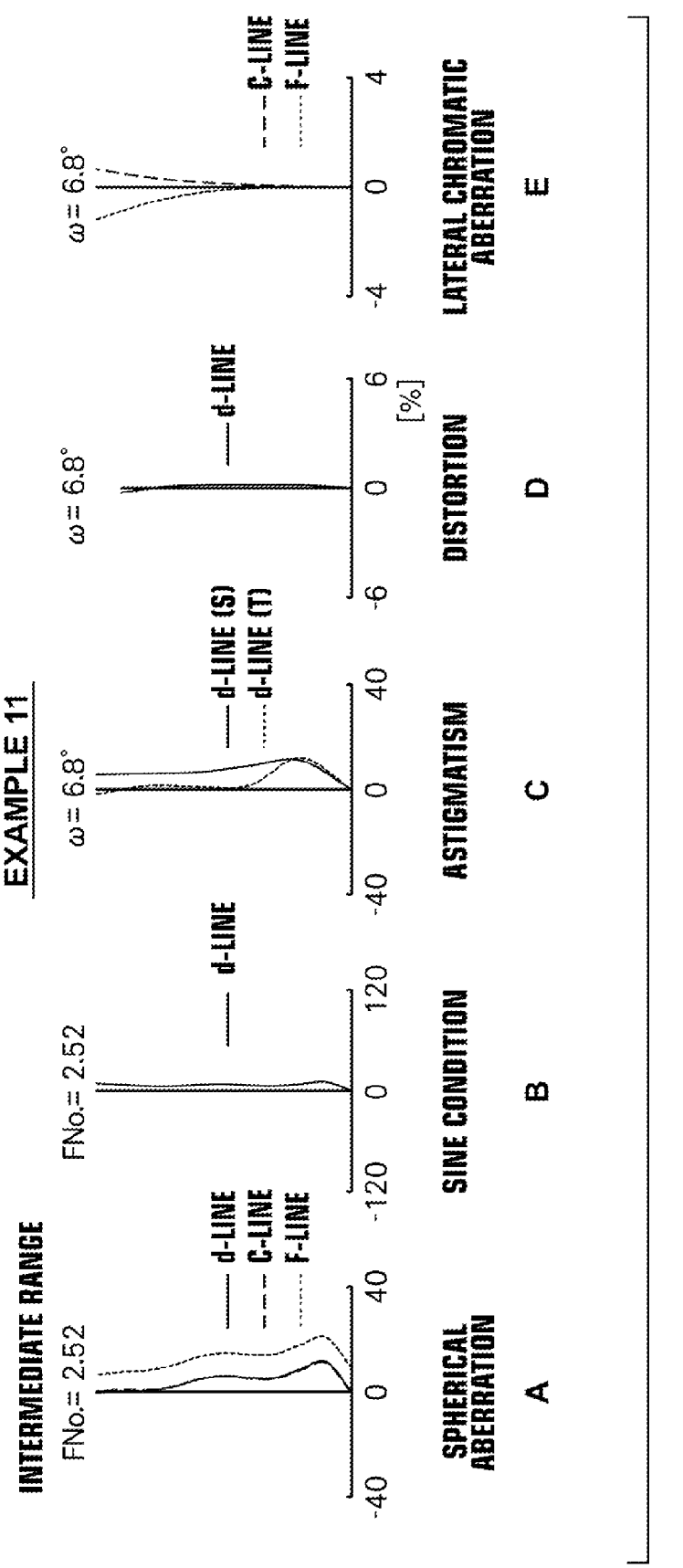
FIG. 43 shows aberration diagrams of the zoom lens according to Example 11 of the invention (intermediate range)
Figure 44:
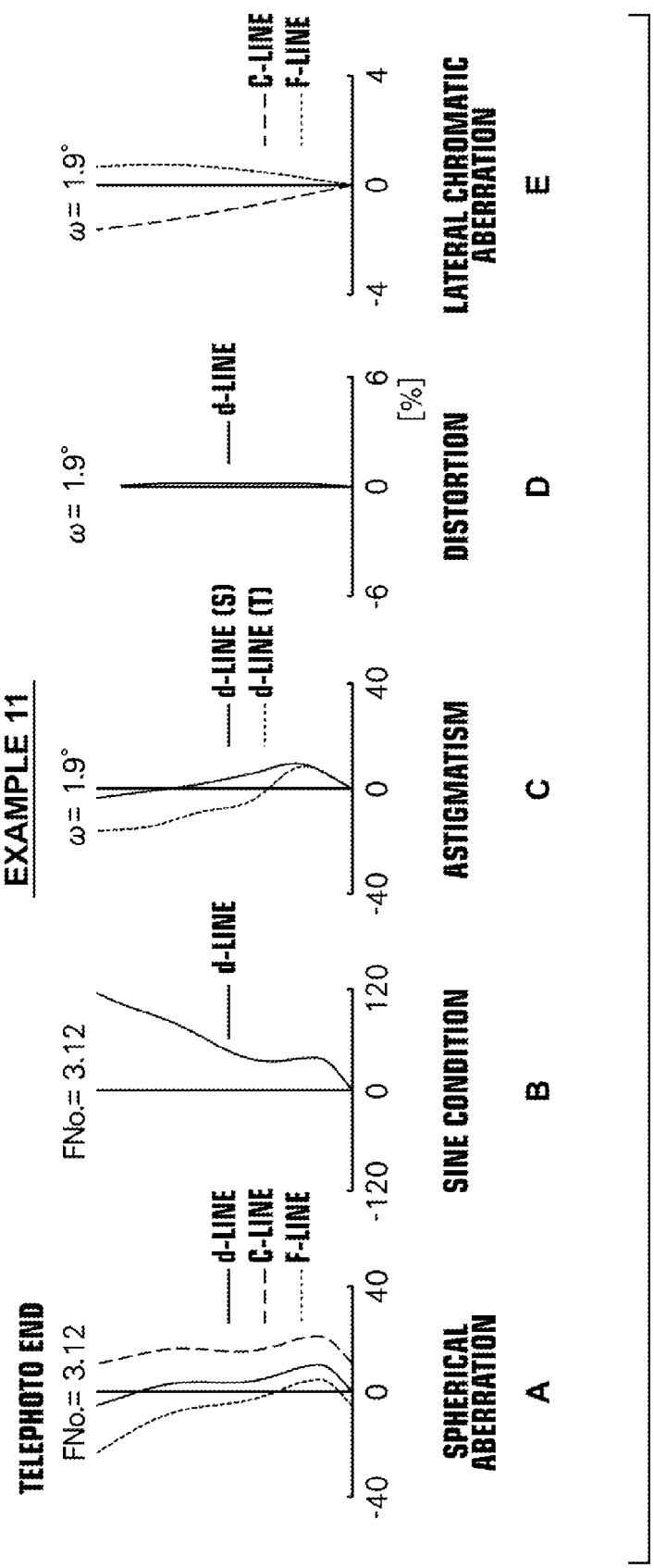
FIG. 44 shows aberration diagrams of the zoom lens according to Example 11 of the invention (telephoto end)

FIG. 12 shows, at A to E, spherical aberration, offense against the sine condition, astigmatism, distortion, and lateral chromatic aberration (chromatic aberration of magnification), respectively, of the zoom lens of Example 1 at the wide-angle end, FIG. 13 shows, at A to E, spherical aberration, offense against the sine condition, astigmatism, distortion, and lateral chromatic aberration (chromatic aberration of magnification), respectively, of the zoom lens of Example 1 at an intermediate range, and FIG. 14 shows, at A to E, spherical aberration, offense against the sine condition, astigmatism, distortion, and lateral chromatic aberration (chromatic aberration of magnification), respectively, of the zoom lens of Example 1 at the telephoto end. The aberrations shown in FIGS. 12 to 14 are those when the lens is focused at a distance of 700 mm. Since the numerical data are normalized such that values of the focal length at the wide-angle end become 1, units of the spherical aberration, the offense against the sine condition and the astigmatism are omitted.

The aberrations shown in the aberration diagrams are those with respect to the d-line (the wavelength of 587.6 nm), which is used as a reference wavelength. Each aberration diagram of spherical aberration also shows spherical aberrations with respect to the wavelength of 656.3 nm (C-line) and with respect to the wavelength of 486.1 nm (F-line). Each aberration diagram of astigmatism shows an astigmatism in the sagittal direction in the solid line and an astigmatism in the tangential direction in the dotted line. Each aberration diagram of lateral chromatic aberration shows lateral chromatic aberrations with respect to the C-line and with respect to the F-line. The symbol "Fno." means f-number, and the symbol "ω" means half angle of view.

Similarly, aberration diagrams of the zoom lenses of Examples 2 to 11 at the wide-angle end, at an intermediate range and at the telephoto end are shown at A to E in FIGS. 15 to 17, FIGS. 18 to 20, FIGS. 21 to 23, FIGS. 24 to 26, FIGS. 27 to 29, FIGS. 30 to 32, FIGS. 33 to 35, FIGS. 36 to 38, FIGS. 39 to 41, and FIGS. 42 to 44, respectively.

As can be seen from the numerical data and the aberration diagrams described above, the zoom lens according to each of Examples 1 to 11 has high zoom ratio, achieves a wide angle of view of 73.8 to 77.4° at the wide-angle end, and is a bright lens system having an f-number of 1.66 to 1.68 at the wide-angle end, while achieving size reduction. It can also be seen that the aberrations are successfully corrected.

Figure 45:
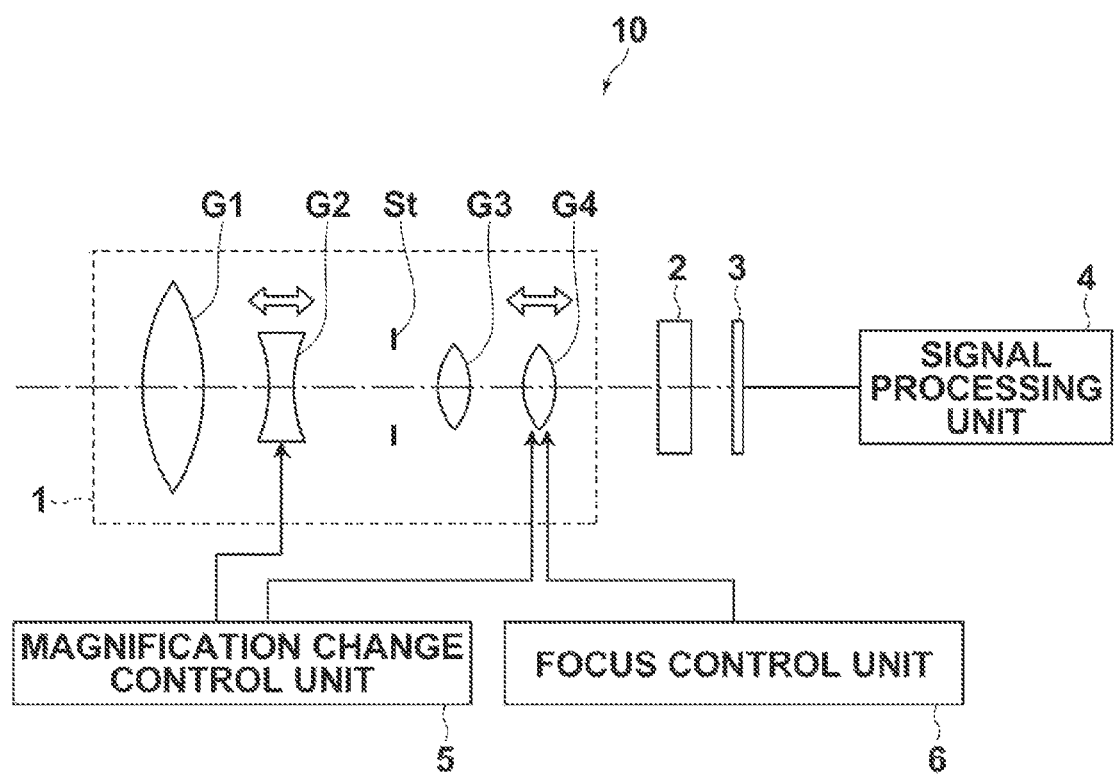
FIG. 45 is a schematic configuration diagram of an imaging device according to an embodiment of the invention.

Next, an imaging device according to an embodiment of the invention is described. FIG. 45 shows, as one example of the imaging device of the embodiment of the invention, a schematic configuration diagram of an imaging device 10 employing the zoom lens 1 of the embodiment of the invention. Examples of the imaging device may include a video camera, an electronic still camera, a monitoring camera, etc.

The imaging device 10 shown in FIG. 45 includes: a zoom lens 1; a filter 2 disposed on the image side of the zoom lens 1; an image sensor 3, which images an image of a subject formed by the zoom lens 1; a signal processing unit 4, which processes a signal outputted from the image sensor 3; a magnification change control unit 5, which controls magnification change of the zoom lens 1; and a focus control unit 6, which controls focusing.

The zoom lens 1 includes a positive first lens group G1, which is fixed during magnification change, a negative second lens group G2, which is moved along the optical axis Z during magnification change, an aperture stop St, a positive third lens group G3, which is fixed during magnification change, and a positive fourth lens group G4, which is moved along the optical axis Z during magnification change to effect focusing. It should be noted that the lens groups are schematically shown in FIG. 45. The image sensor 3 images an optical image formed by the zoom lens 1 and outputs an electric signal. The imaging surface of the image sensor 3 is positioned in the same position as the image plane of the zoom lens 1. As the image sensor 3, a CCD or CMOS, for example, may be used.

Although not shown in FIG. 45, the imaging device 10 further includes a blur correction control unit, which corrects for image blurring due to vibration or camera shake by moving the rear group G3r having a positive refractive power and forming a part of the third lens group G3 in directions perpendicular to the optical axis Z.

The present invention has been described with reference to the embodiments and the examples. However, the invention is not limited to the above-described embodiments and examples, and various modifications may be made to the invention. For example, the values of the radius of curvature, the surface interval, the refractive index, the Abbe number, the aspheric coefficients, etc., of each lens component are not limited to the values shown in the above-described numerical examples and may take different values.

What is claimed is:
1. A zoom lens consisting of, in order from an object side:
a first lens group having a positive refractive power;
a second lens group having a negative refractive power;
a third lens group having a positive refractive power; and
a fourth lens group having a positive refractive power,
wherein, during magnification change from a wide-angle end to a telephoto end, the first lens group and the third lens group are fixed in an optical axis direction relative to an image plane, the second lens group is moved toward an image side along the optical axis relative to the image plane, and the fourth lens group is moved in the optical axis direction relative to the image plane,
the second lens group comprises an air space formed between a convex surface and a concave surface facing each other, and a cemented surface between a negative lens and a positive lens,
the third lens group consists of, in order from the object side, a front group that is fixed, and a rear group that has a positive refractive power and is able to be shifted in directions intersecting with the optical axis to thereby shift an image formed on the image side, and the condition expressions (1) to (3) below are satisfied:

$$2.0<|f12w/fw|<3.0 \quad (1),$$

$$2.5<|(Rz1+Rz2)/(Rz1-Rz2)|<5.0 \quad (2),\text{ and}$$

$$8.6<Mz/fw<12.0 \quad (3),$$

where f12w is a combined focal length of the first lens group and the second lens group at the wide-angle end, fw is a focal length of the entire system at the wide-angle end, Rz1 and Rz2 are radii of curvature forming the air space in the second lens group, and Mz is an amount of movement of the second lens group during magnification change from the wide-angle end to the telephoto end.

2. The zoom lens as claimed in claim 1, wherein the condition expression (1-1) below is satisfied:

$$2.4<|f12w/fw|<3.0 \quad (1\text{-}1),$$

where f12w is a combined focal length of the first lens group and the second lens group at the wide-angle end, and fw is a focal length of the entire system at the wide-angle end.

3. The zoom lens as claimed in claim 1, wherein the condition expression (2-1) below is satisfied:

$$2.6<|(Rz1+Rz2)/(Rz1-Rz2)|<4.8 \quad (2\text{-}1),$$

where Rz1 and Rz2 are radii of curvature forming the air space in the second lens group.

4. The zoom lens as claimed in claim 1, wherein the condition expression (3-1) below is satisfied:

$$8.8<Mz/fw<11.5 \quad (3\text{-}1),$$

where fw is a focal length of the entire system at the wide-angle end, and Mz is an amount of movement of the second lens group during magnification change from the wide-angle end to the telephoto end.

5. The zoom lens as claimed in claim 1, wherein the condition expression (4) below is satisfied:

$$0.8<f3r/f3<2.0 \quad (4),$$

where f3r is a focal length of the rear group of the third lens group, and f3 is a focal length of the third lens group.

6. The zoom lens as claimed in claim 5, wherein the condition expression (4-1) below is satisfied:

$$0.9<f3r/f3<1.8 \quad (4\text{-}1),$$

where f3r is a focal length of the rear group of the third lens group, and f3 is a focal length of the third lens group.

7. The zoom lens as claimed in claim 1, wherein the first lens group consists of, in order from the object side, a cemented lens formed by a negative lens and a positive lens cemented together, and two positive lenses.

8. The zoom lens as claimed in claim 1, wherein the front group of the third lens group comprises a cemented lens formed by a positive lens and a negative lens cemented together.

9. The zoom lens as claimed in claim 1, wherein the rear group of the third lens group consists of, in order from the object side, a positive lens, and a cemented lens formed by a positive lens and a negative lens cemented together, wherein the positive lens forming the cemented lens is made of a material having a greater Abbe number than that of a material of the negative lens forming the cemented lens.

10. The zoom lens as claimed in claim 1, wherein the fourth lens group comprises a cemented lens formed by a positive lens and a negative lens cemented together, wherein the positive lens forming the cemented lens is made of a material having a greater Abbe number than that of a material of the negative lens forming the cemented lens.

11. The zoom lens as claimed in claim 1, wherein the fourth lens group consists of, in order from the object side, a cemented lens formed by a positive lens and a negative lens cemented together, and a positive lens, wherein the positive lens on the most image side includes an aspheric surface.

12. An imaging device comprising the zoom lens as claimed in claim 1.

* * * * *